United States Patent [19]

Kuriyama et al.

[11] Patent Number: 5,447,034
[45] Date of Patent: Sep. 5, 1995

[54] CRYOGENIC REFRIGERATOR AND REGENERATIVE HEAT EXCHANGE MATERIAL

[75] Inventors: Toru Kuriyama, Yokohama; Masahiko Takahashi, Kawasaki; Hideki Nakagome; Akiko Takahashi, both of Tokyo; Yoichi Tokai, Yokohama, all of Japan

[73] Assignee: Kabushiki Kaisha Toshiba, Kawasaki, Japan

[21] Appl. No.: 146,735

[22] Filed: Nov. 4, 1993

Related U.S. Application Data

[63] Continuation-in-part of Ser. No. 866,823, Apr. 10, 1992, abandoned.

[30] Foreign Application Priority Data

| Apr. 11, 1991 | [JP] | Japan | 3-79028 |
| Apr. 22, 1991 | [JP] | Japan | 3-90847 |
| Aug. 2, 1991 | [JP] | Japan | 3-194141 |
| Jan. 31, 1992 | [JP] | Japan | 4-17027 |
| May 11, 1993 | [JP] | Japan | 5-109420 |

[51] Int. Cl.$^6$ .................. F25B 9/10; H01F 1/053
[52] U.S. Cl. .................. 62/51.1; 62/6; 62/3.1; 148/301; 165/4
[58] Field of Search .......... 62/3.1, 6, 51.1, 3.1, 62/6, 51.1; 165/4; 148/301

[56] References Cited

U.S. PATENT DOCUMENTS

| 4,082,138 | 4/1978 | Miedema et al. | 165/4 |
| 4,829,770 | 5/1989 | Hashimoto | 62/3.1 |
| 4,849,017 | 7/1989 | Sahashi et al. | 148/301 X |
| 5,060,478 | 10/1991 | Fukamichi | 62/3.1 |
| 5,092,130 | 3/1992 | Nagao et al. | 62/6 |
| 5,186,765 | 2/1993 | Arai et al. | 148/301 |
| 5,213,630 | 5/1993 | Hashimoto | 148/301 |
| 5,269,854 | 12/1993 | Takahashi et al. | 148/301 |

FOREIGN PATENT DOCUMENTS

| 0327293 | 8/1989 | European Pat. Off. . |
| 0399813 | 11/1990 | European Pat. Off. . |
| 2638823 | 11/1990 | France . |

OTHER PUBLICATIONS

R. Li, M. Ogawa, T. Hashimoto; "Magnetic Intermetallic Compounds for Cryogenic Regenerator", Cryogenics, vol. 30, Jun. 1990, pp. 521–526.

T. Kuriyama, R. Hakamada, H. Nakagome, "High-efficient Two-stage GM Refrigerator with Magnetic Material in the Liquid Helium Region", Adv. Cry. Eng., vol. 33, 1990, pp. 1261–1269.

Kuriyama et al. "Two-stage GM Refrigerator with Er$_3$Ni Regenerator for Helium Liquefaction", Proc. 6th Int. Cryocooler Conf., 1990, pp. 3–13.

Primary Examiner—Christopher Kilner
Attorney, Agent, or Firm—Oblon, Spivak, McClelland, Maier, & Neustadt

[57] ABSTRACT

A cryogenic refrigerator includes a first refrigerant filled in a final refrigerating force storage chamber on a high temperature side thereof and consisting essentially of a composition expressed by (a) $(Er_{(x)}R_{(1-x)})_3Ni_{(y)}Co_{(1-y)}$, or (b) $Er_{(x)}R_{(1-x)}Ni_{(y)}Cu_{(1-y)}$ wherein $0 \leq x \leq 1$, $0 \leq y \leq 1$, and R denotes a rare earth element selected from the group consisting of Y, Pr, Nd, Sm, Eu, Gd, Tb, Dy, Ho, Tm, Yb and Sc, a second refrigerant filled in the final refrigerating force storage chamber on a low temperature side thereof and consisting essentially of a composition expressed by (f) $Er_{(x)}R_{(1-x)}Ni_{(y)}Co_{(1-y)}$, or (g) $(Er_{(x)}R_{(1-x)})_3AlC_{(y)}$ wherein $0 \leq x \leq 1$, $0 \leq y \leq 1$ and R represents a rare earth element selected from the group consisting of Y, Pr, Nd, Sm, Eu, Gd, Tb, Dy, Ho, Tm, Yb and Sc, and a partition member for separating the second refrigerant from the first one so as to not be mixed in the refrigerating force storage chamber.

30 Claims, 43 Drawing Sheets

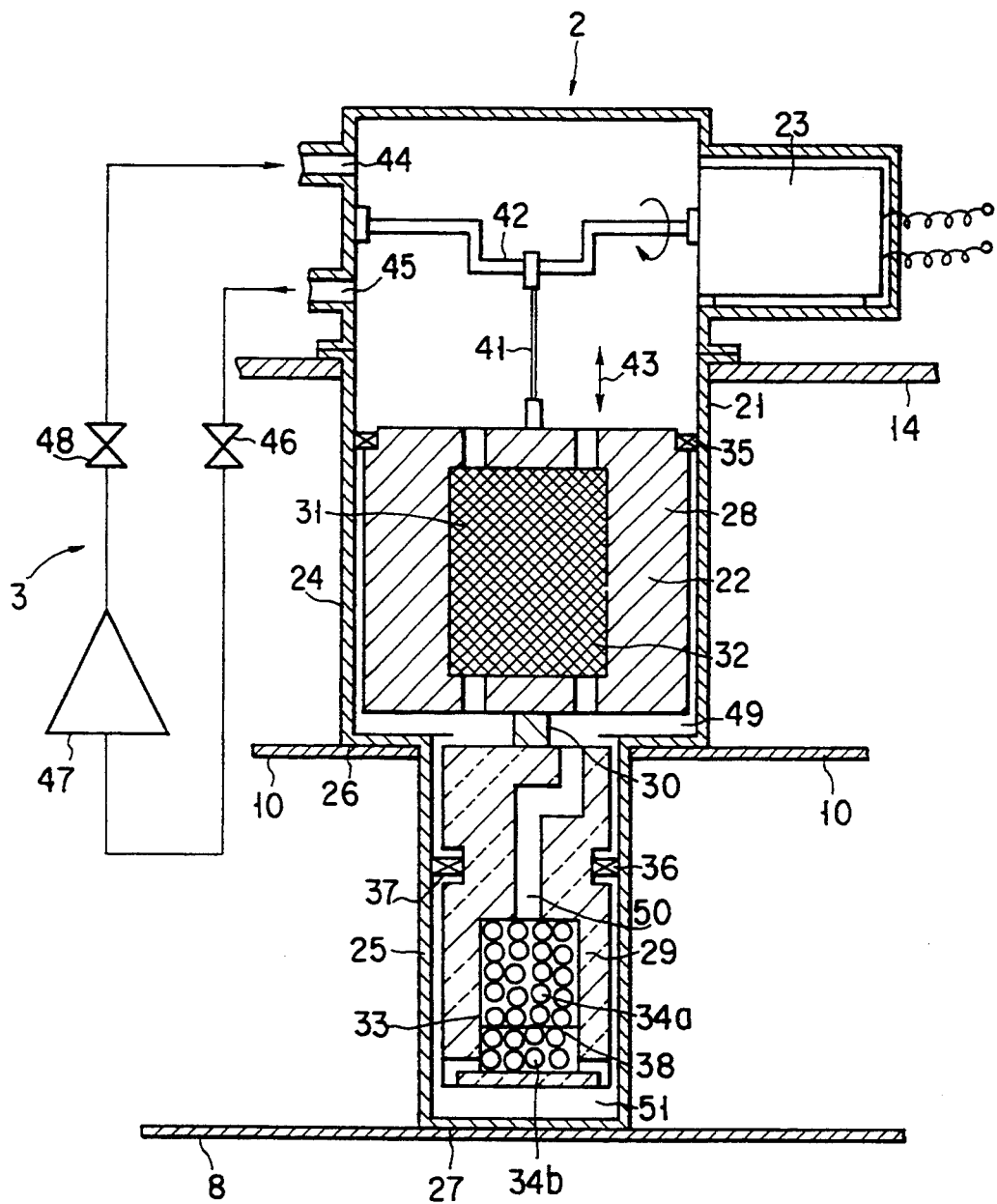
F I G. 2

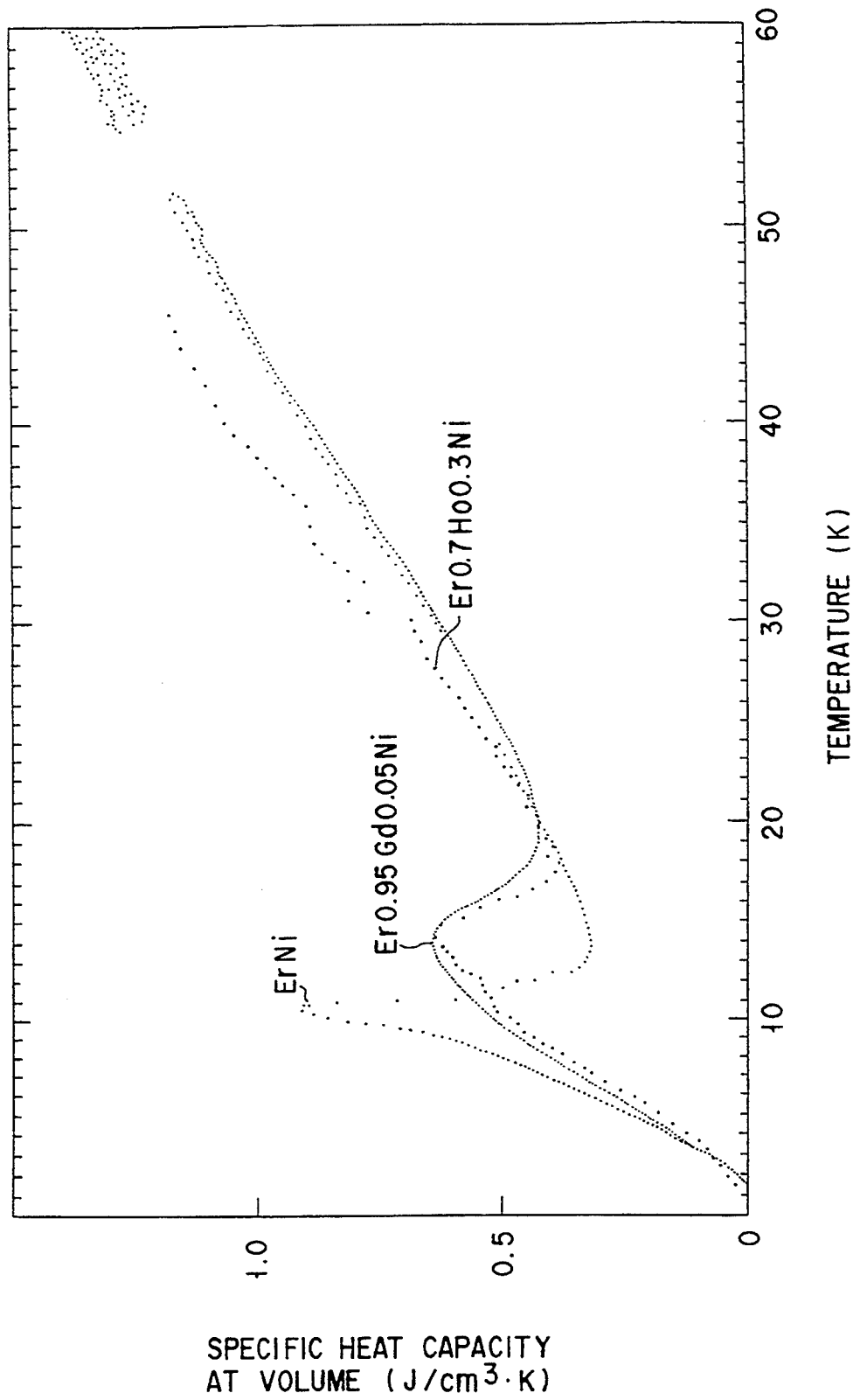

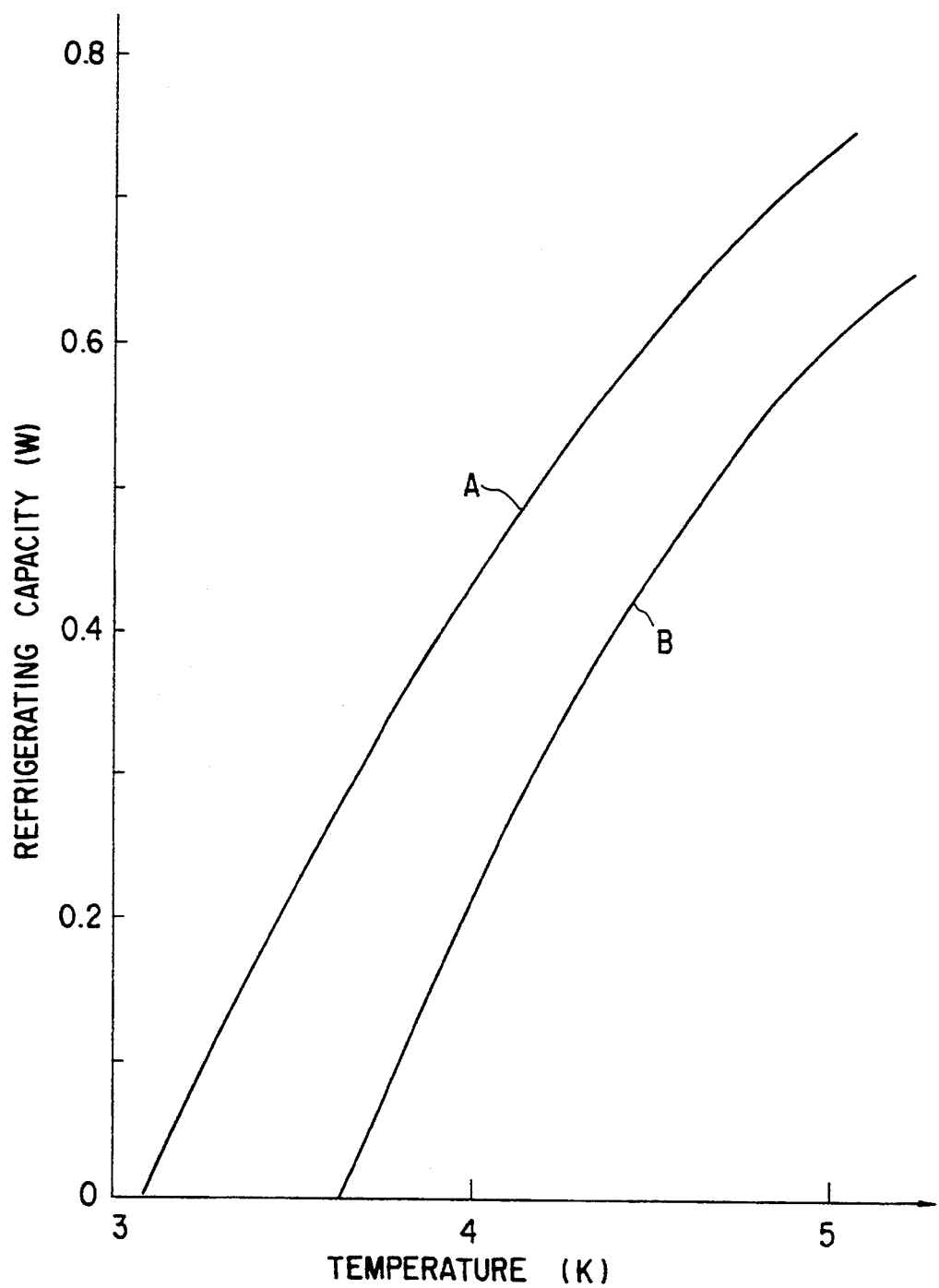
F I G. 6

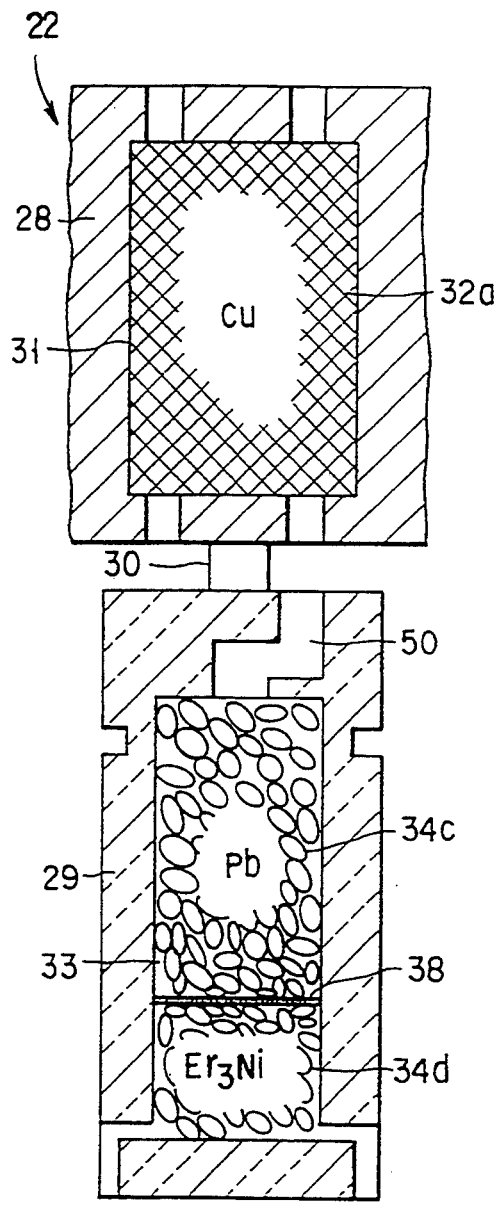
F I G. 7
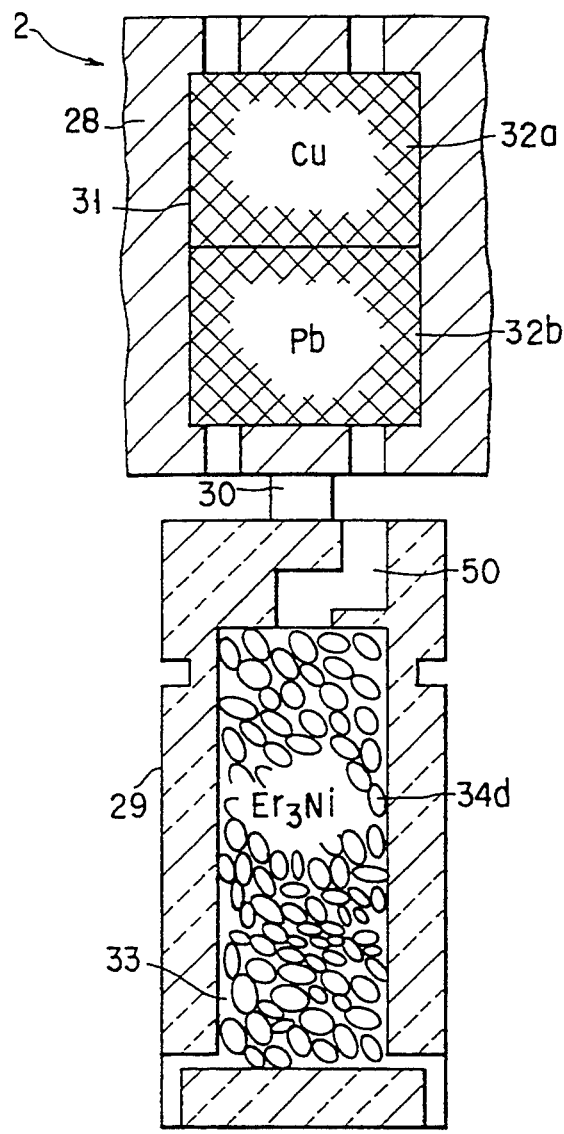
F I G. 8

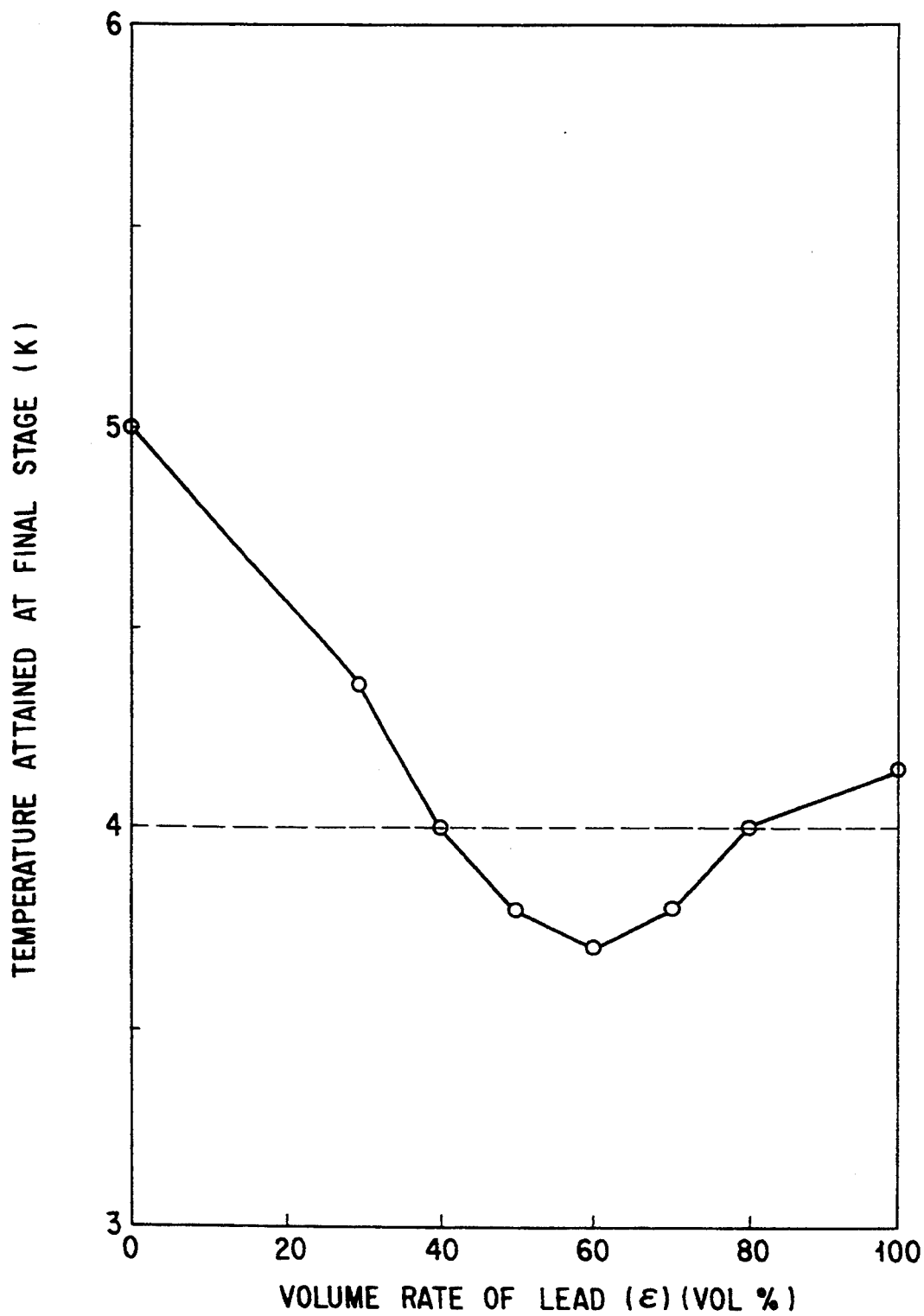
F I G. 10A

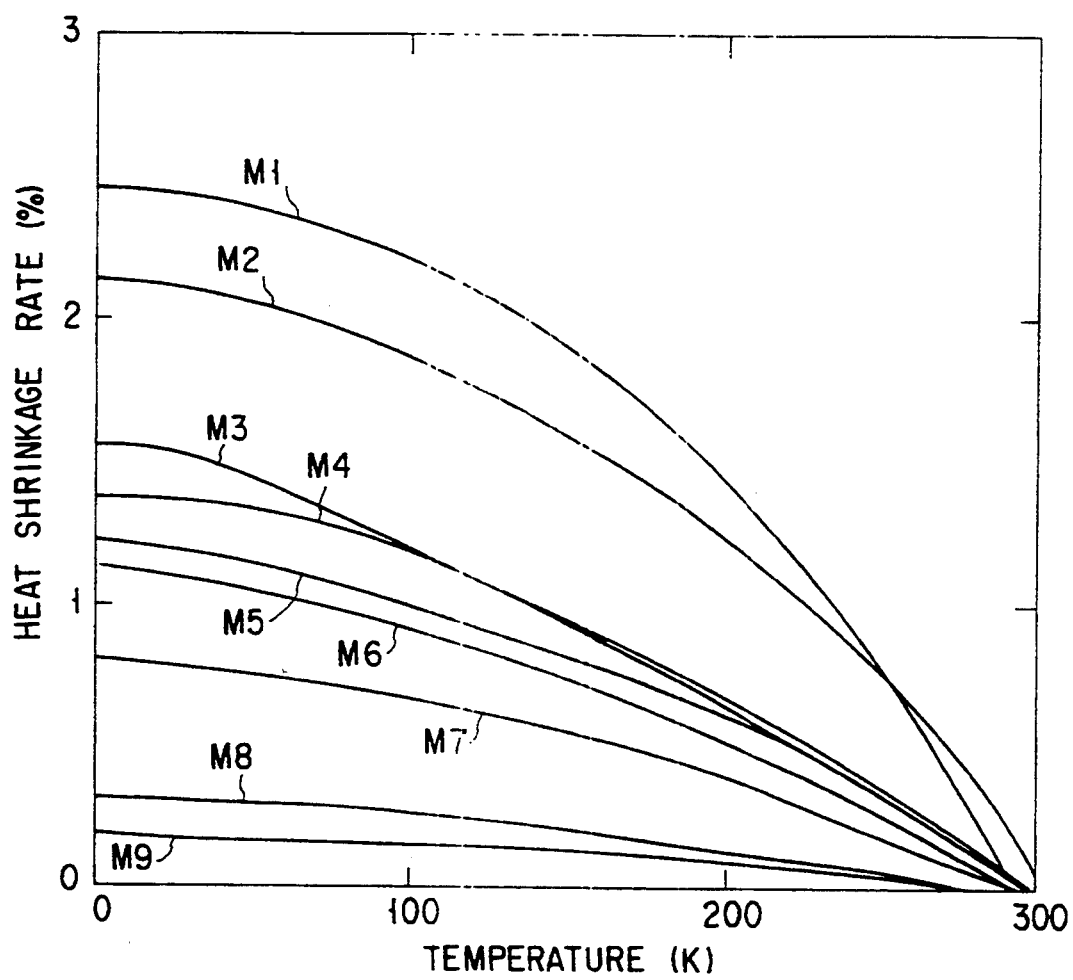
F I G. 18

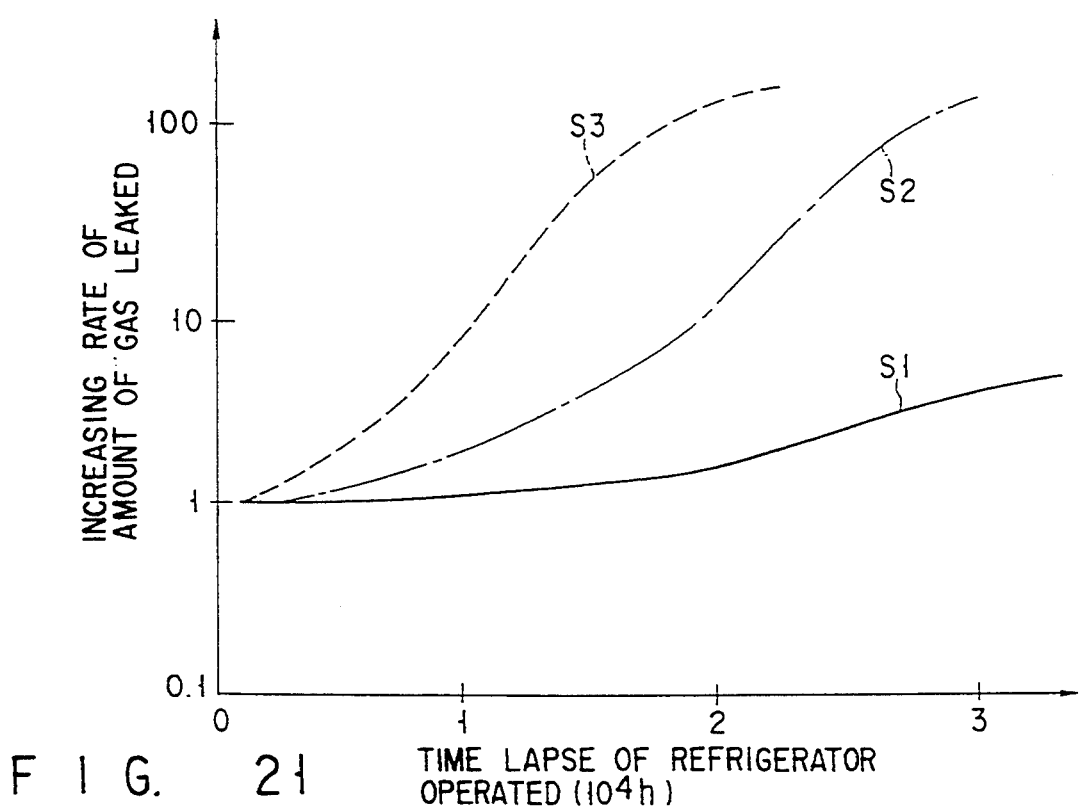
F I G. 21
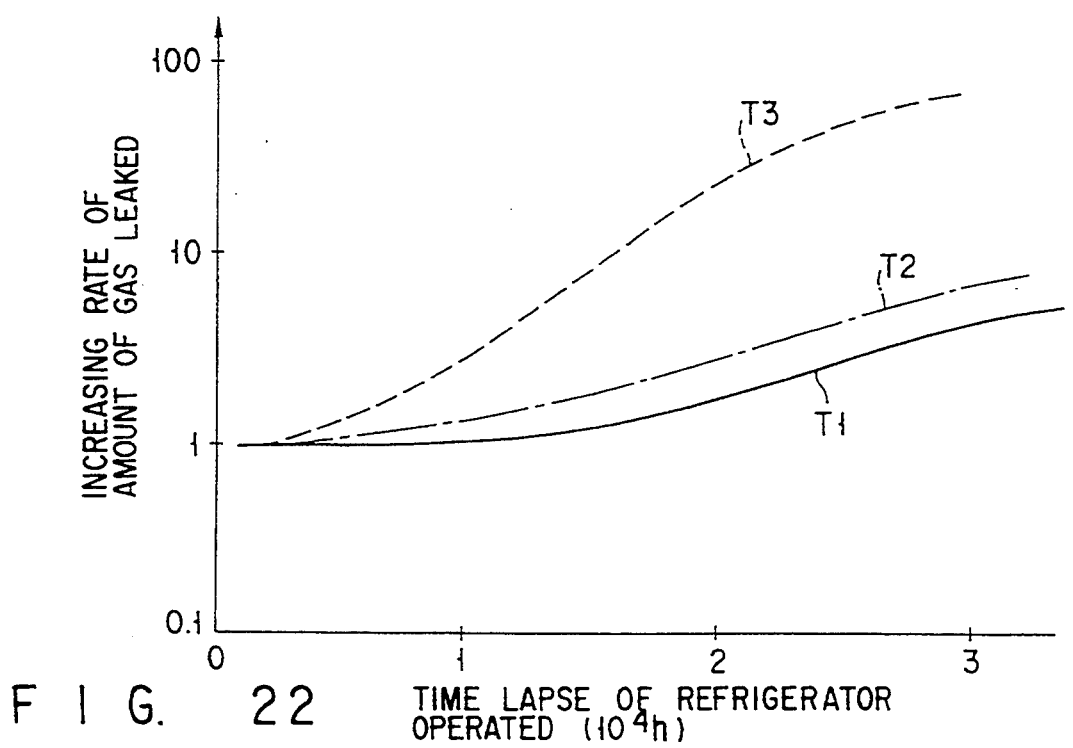
F I G. 22

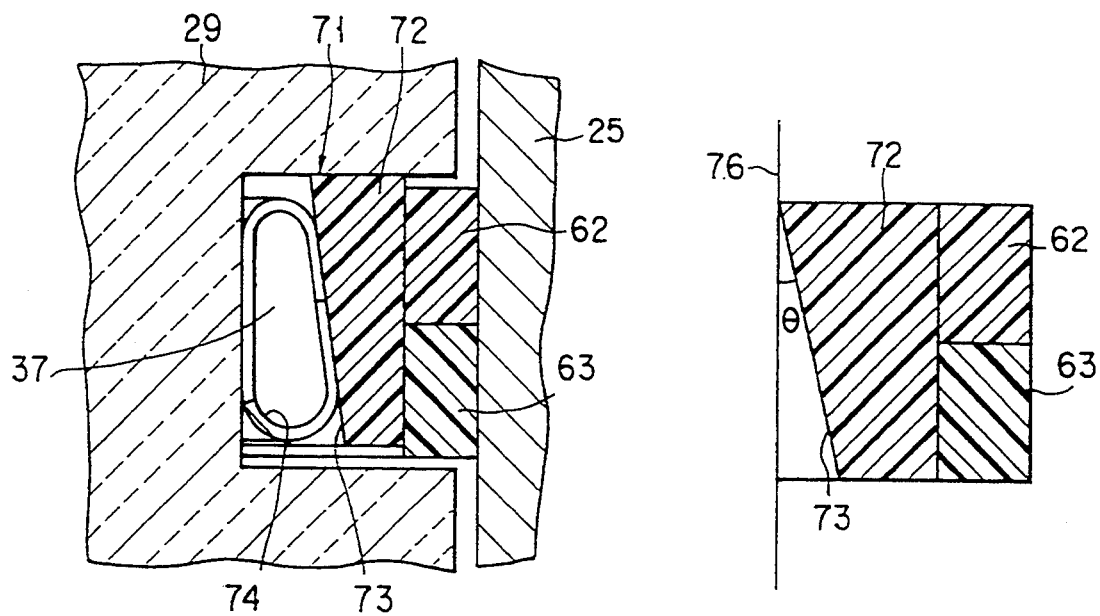
F I G. 23
F I G. 24
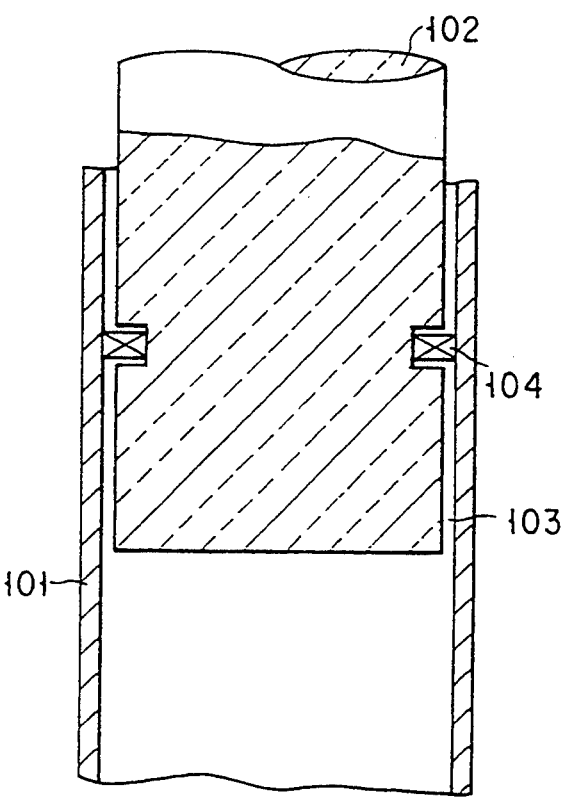
PRIOR ART
F I G. 25

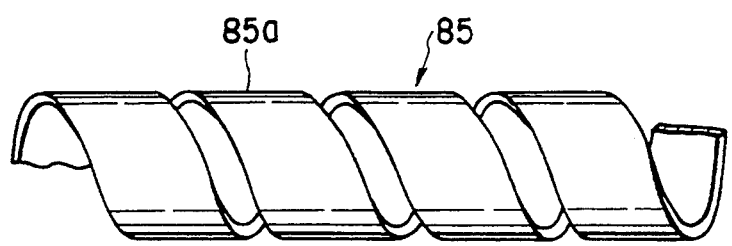
F I G. 32
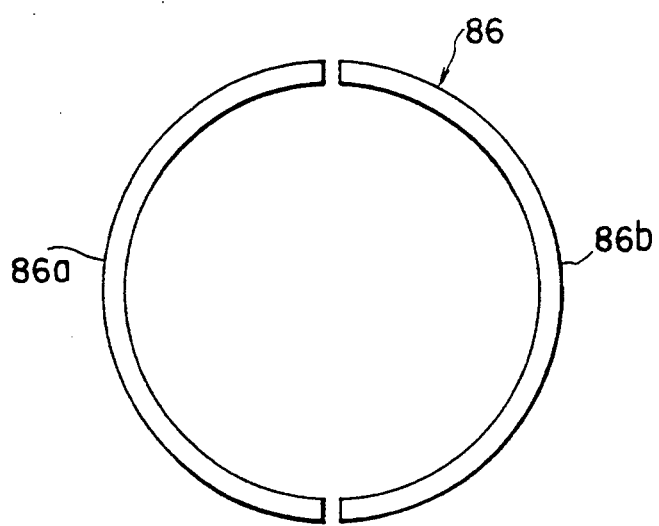
F I G. 33

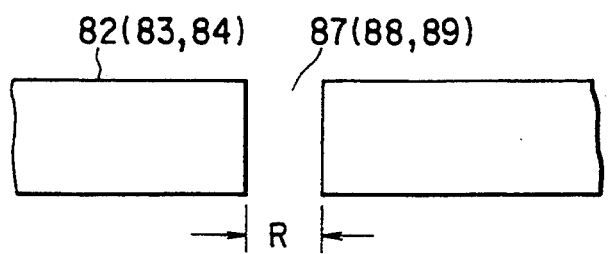
F I G. 34
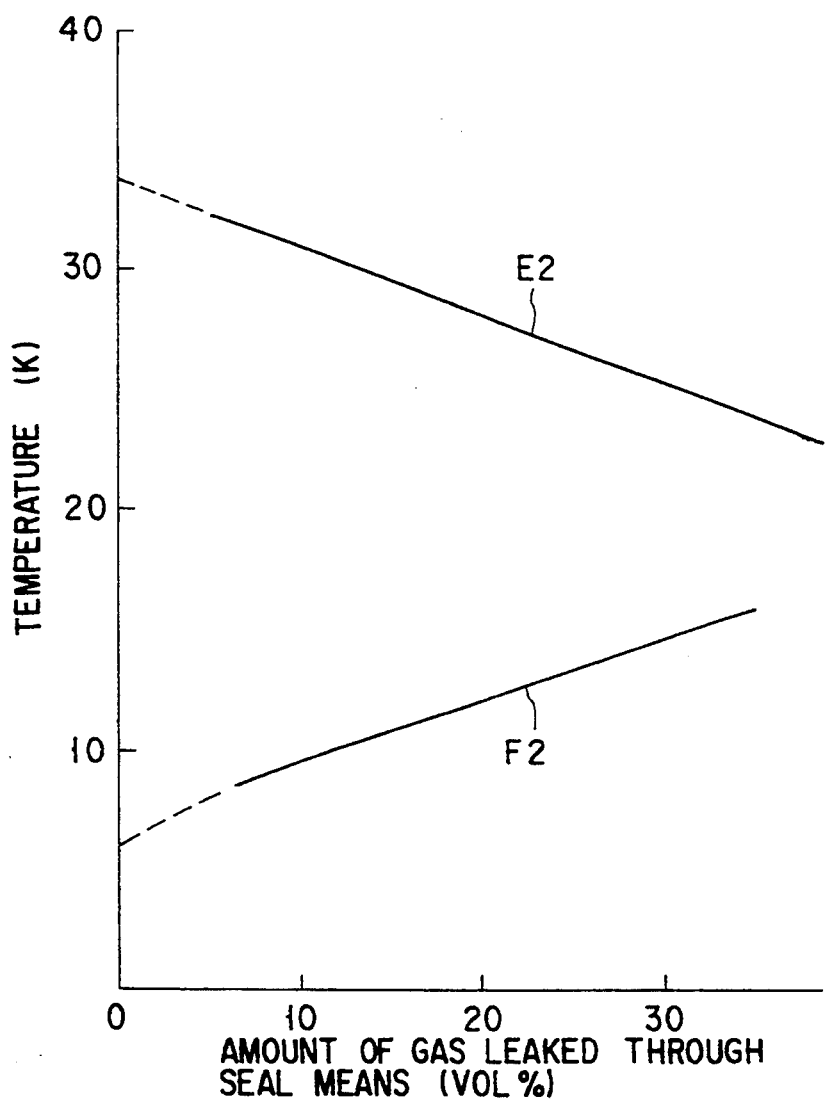
F I G. 35

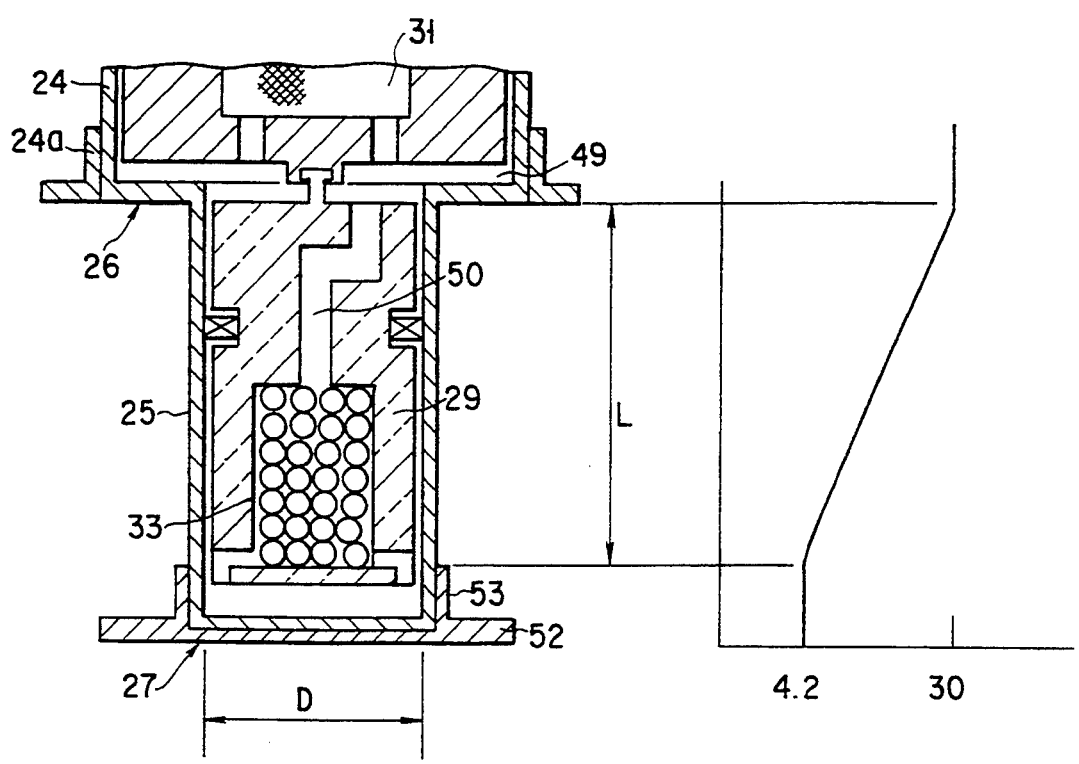
F I G. 40

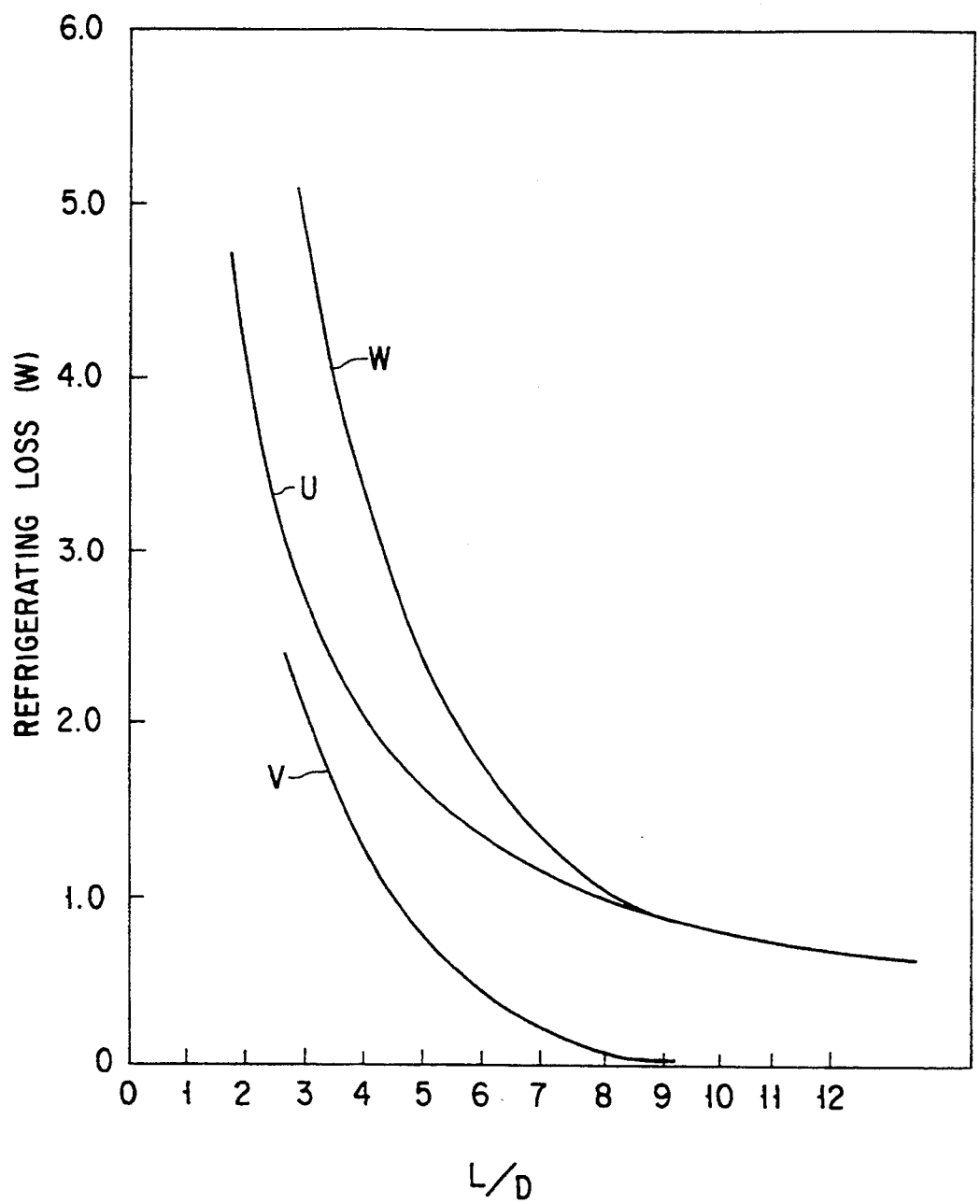
F I G. 41

THERMAL VARIATION OF THE SPECIFIC
HEAT OF ErNi0.6Cu0.4 AND HoNi0.5Cu0.5

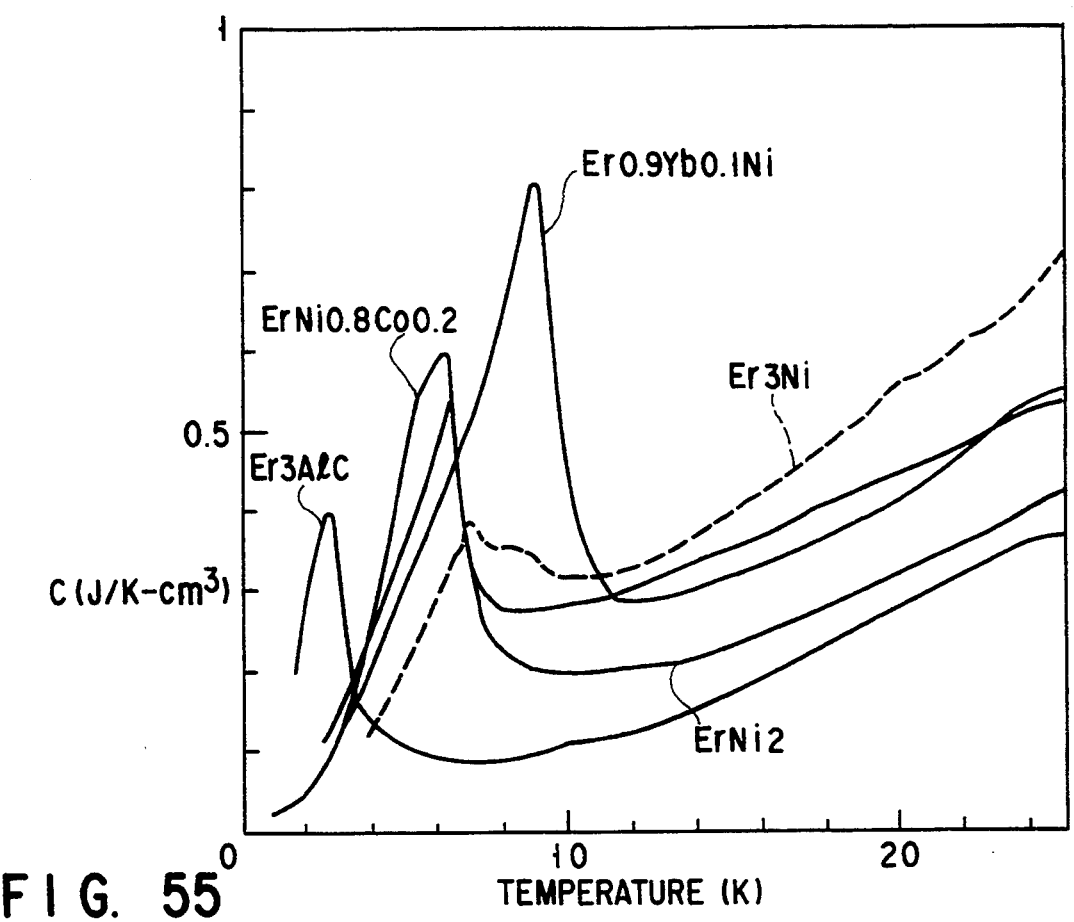
F I G. 55
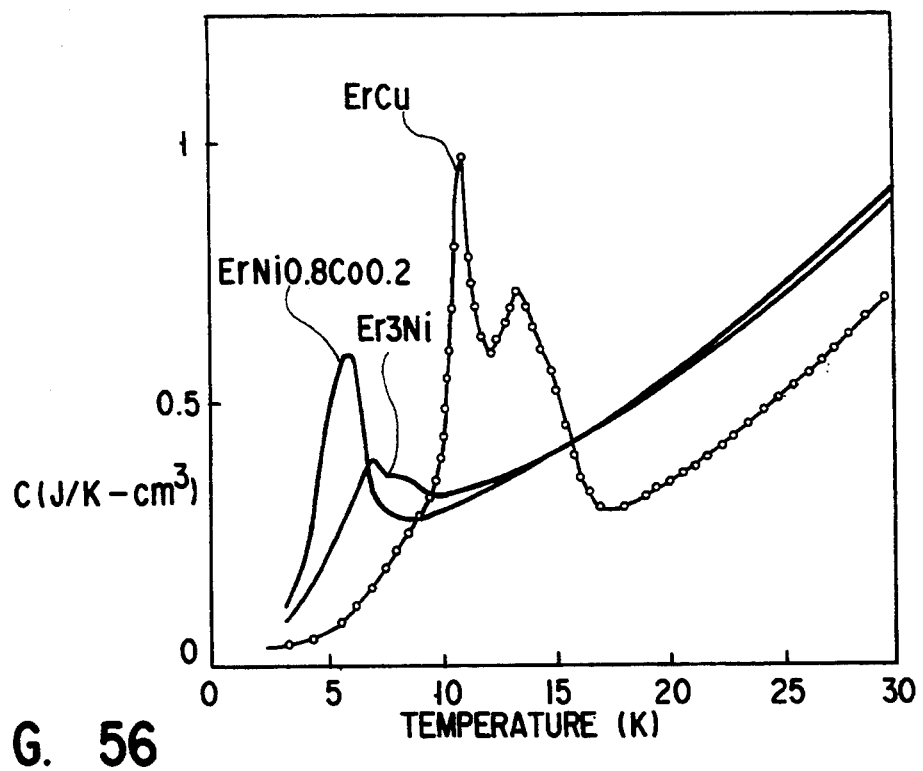
F I G. 56

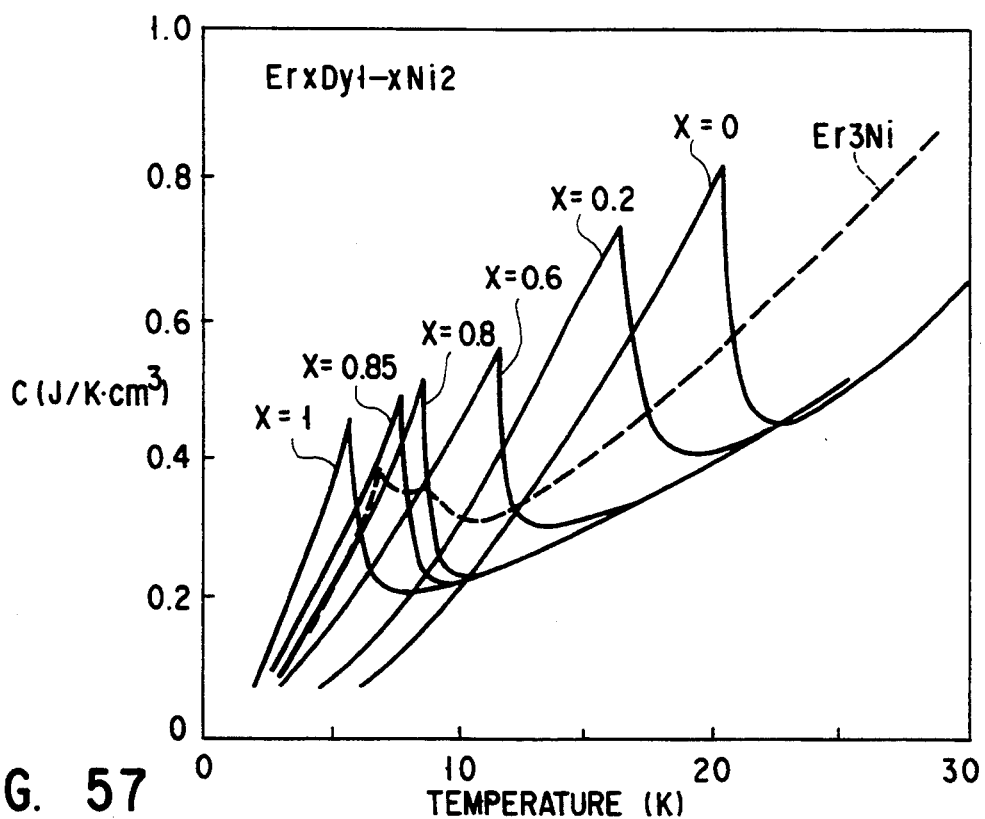
F I G. 57
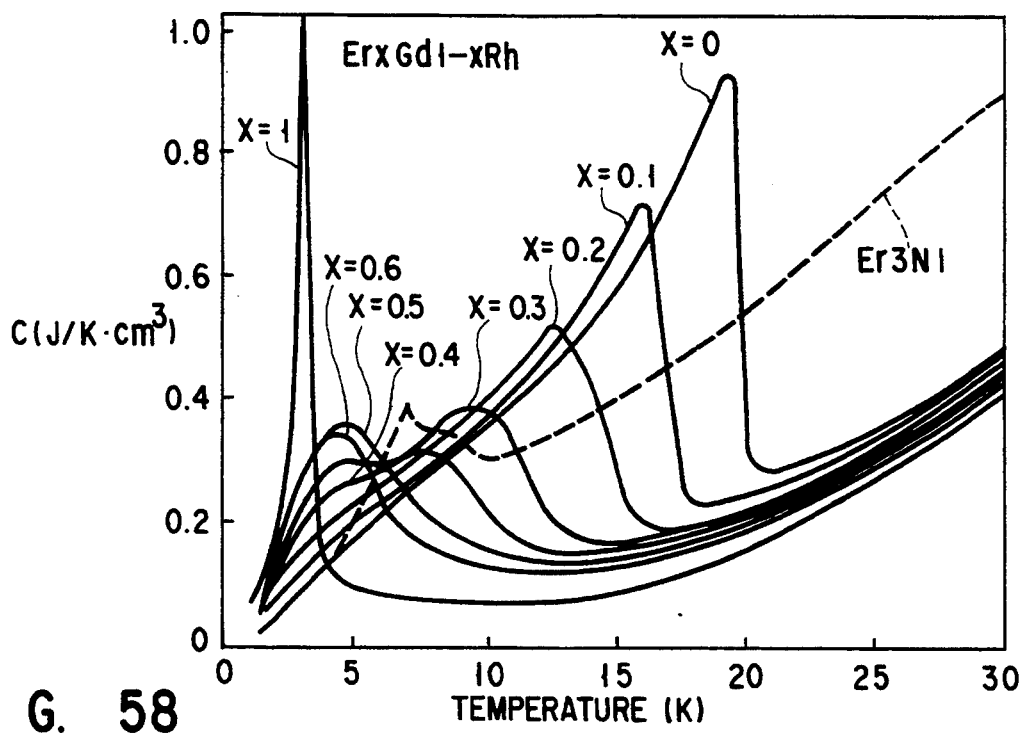
F I G. 58

CRYOGENIC REFRIGERATOR AND REGENERATIVE HEAT EXCHANGE MATERIAL

CROSS-REFERENCES TO THE RELATED APPLICATIONS

This application is a continuation-in-part of U.S. patent application Ser. No. 866,823 filed on Apr. 10, 1992, now abandoned.

BACKGROUND OF THE INVENTION

1. Field of the Invention

The present invention relates to a cryogenic refrigerator of the refrigerant-filled or refrigerating force storage chamber type (regenerator) and, more particularly, it relates to refrigerants filled in a multi-stage cylinder and a seal assembly capable of sealing the space between the cylinder and a piston without using any lubricant.

2. Description of the Related Art

Cryogenic refrigerators of various types are now on the market. The Gifford-McMahon type cryogenic refrigerator is typical of these refrigerators of the refrigerant-filled chamber type. This cryogenic refrigerator of the refrigerant filled chamber type has a cycle. According to the cycle, compressed helium gas is cooled while passing through the refrigerant-filled chamber, expanded to create cold atmosphere at low temperature area, then reversed through the refrigerant-filled chamber to cool the refrigerant therein and finally collected.

The cryogenic refrigerator often has the refrigerant-filled chamber at each of plural stages arranged from normal to low temperature area. Lead refrigerant having high specific heat at low temperatures is usually used in a refrigerant-filled chamber located on the lowest temperature side or at the final stage. Further, the other conventional cryogenic refrigerators of the refrigerant-filled chamber type also have the refrigerant-filled chamber at each of plural stages arranged from normal to low temperature area. Lead refrigerant having high specific heat at low temperatures is also used in the refrigerant-filled chamber located on the lowest temperature side or at the final stage.

However, the above-described cryogenic refrigerators of the refrigerant-filled chamber type in which the lead refrigerant is used in the final stage refrigerant-filled chamber have the following problem. Lead is a material having high specific heat capacity at low temperatures, but when temperature becomes lower than 15 K., its specific heat quickly decreases with the lowering of temperature. When lead is used as the refrigerant in the final stage chamber, therefore, the lowering of heat exchanging efficiency makes it difficult to create cold atmosphere lower than 10 K.

In order to solve this problem, $Er_3Ni$ having a specific heat capacity larger than that of lead at a temperature range lower than 10 K. has attracted attention, these days, as as the refrigerant filled in the final stage chamber.

When $Er_3Ni$ which is a magnetic material is filled in the final stage chamber, temperature can be lowered to 4 K. maximum and a refrigerating capacity of about 0.1 W can be attained at 4.2 K(or boiling point of liquid helium).

Even in the case of the cryogenic refrigerator in which $Er_3Ni$ is filled in the final stage chamber, however, its refrigerating capacity attained at about 4.2 K. is still lower than that actually needed.

Further, it is not desired in some of those refrigerators which use the cylinder and the piston that lubricant (oil etc) is used in the seal assembly. As being typical of these refrigerators, the cryogenic refrigerator in which helium gas is used as coolant can be mentioned.

When lubricant is used at sealing points in this cryogenic refrigerator, helium gas is contaminated and the malfunction of the refrigerator is caused, as well, because the lubricant is frozen. Therefore, no lubricant can he used in the refrigerator.

As shown in FIG. 25, therefore, a clearance 103 between a cylinder 101 and a piston (or displacer) 102 is sealed by a seal assembly 104 of the non-lubricant type in the case of the conventional cryogenic refrigerator, thereby preventing helium gas from being leaked.

As shown in FIGS. 26 and 27, a seal ring 106 is fitted in a annular groove 105 on the outer circumference of the displacer 102. The seal ring 106 is made of resin, having both ends, and it is pressed against the inner circumference of the cylinder 101 by spring ring 107 located inside the seal ring 106.

As shown in FIG. 28, both ends of the seal ring 106 have thickness-reduced portions 108 which are overlap each other.

In the case of the conventional seal assembly 104, however, the thickness-reduced portions 108 of the seal ring 106 closely contacted each other is loosened particularly in the circumferential direction of the cylinder 101, the amount of helium gas leaked through the thickness-reduced portions 108 of the seal ring 106 is thus increased, and temperature is raised at the cooling stage, when the seal ring is thermally shrunk at very low temperatures.

In the case of the conventional seal assembly 104, therefore, the refrigerating efficiency of the refrigerator greatly changes as temperature changes. It is therefore difficult to guess from performance tests of the refrigerator conducted under normal temperature what refrigerating capacity the refrigerator can have at very low temperatures.

When the conventional seal assembly 104 of the non-lubricant type is used particularly at very low temperatures, no sealing capacity can be obtained as desired and the refrigerating capacity of the refrigerator achieved has a limit accordingly.

Further, even when the seal assembly 104 is actually incorporated into the cryogenic refrigerator, the seal ring 106 is thermally shrunk. This causes a clearance between the seal ring 106 and the annular groove 105, thereby making it impossible to reduce the amount of gas leaked to an extent greater than a certain value.

SUMMARY OF THE INVENTION

An object of the present invention is therefore to provide a cryogenic refrigerator of the refrigerant-filled or refrigerating force storage chamber type having a higher refrigerating capacity even at about 4.2 K.

According to an aspect of the present invention, there can be provided a cryogenic refrigerator capable of creating a higher refrigerating capacity by expanding compressed helium gas after it is cooled while being passed firstly through a first refrigerating force storage chamber (regenerator) at a first cooling stage and finally through a final refrigerating force storage chamber (regenerator) at a final cooling stage, the cryogenic refrigerator comprising a first refrigerant filled in the final refrigerating force storage chamber on the high temperature side thereof and consisting essentially of a composition expressed by (a) a formula: $(Er_{(x)}R_{(1-x)})_3Ni_{(y)}Co_{(1-y)}$ wherein $0 \leq x \leq 1$, $0 \leq y \leq 1$ and R represents a rare earth element selected from the group consisting of Y, Pr, Nd, Sm, Eu, Gd, Tb, Dy, Ho, Tm, Yb and Sc, or a composition expressed by (b) a formula: $Er_{(x)}R_{(1-x)}Ni_{(y)}Cu_{(1-y)}$ wherein $0 \leq x \leq 1$, $0 \leq y \leq 1$, and R denotes a rare earth element selected from the group consisting of Y, Pr, Nd, Sm, Eu, Gd, Tb, Dy, Ho, Tm, Yb and Sc, or a composition expressed by (c) a formula: $Er_{(x)}Dy_{(1-x)}Ni_2$ wherein $0 \leq x \leq 0.85$, or a composition position expressed by (d) a formula: $Er_{(x)}Gd_{(1-x)}Rh$ wherein $0 \leq x \leq 0.3$ or a composition expressed by (e) a formula: $Er_{(x)}R_{(1-x)}Ni_{(y)}Co_{(1-y)}$ wherein $0 \leq x \leq 1$, $0 \leq y \leq 1$ and R denotes a rare earth element selected from the group consisting of Gd, Tb, Dy and Ho; a second refrigerant filled in the final refrigerating force storage chamber on the low temperature side thereof and consisting essentially of a composition expressed by (f) a formula: $Er_{(x)}R_{(1-x)}Ni_{(y)}Co_{(1-y)}$ wherein $0 \leq x \leq 1$, $0 \leq y \leq 1$ and R denotes a rare earth element selected from the group consisting of Y, Pr, Nd, Sm, Eu, Gd, Tb, Dy, Ho, Tm, Yb and Sc, or a composition expressed by (g) a formula: $(Er_{(x)}R_{(1-x)})_3AlC_{(y)}$ wherein $0 \leq x \leq 1$, $0 \leq y \leq 1$ and R represents a rare earth element selected from the group consisting of Y, Pr, Nd, Sm, Eu, Gd, Tb, Dy, Ho, Tm, Yb and Sc, or a composition expressed by (h) a formula: $Er_{(x)}Dy_{(1-x)}Ni_2$ wherein $0.85 \leq x \leq 1$, a composition expressed by (i) a formula: $Er_{(x)}Gd_{(1-x)}Rh$ wherein $0.3 \leq x \leq 1$, or a composition expressed by (j) a formula: $(Er_{(x)}R_{(1-x)})(1-y)Ru_{(y)}$ wherein $0.5 \leq x \leq 1$, $0 \leq y \leq 0.7$ and R represents a rare earth element selected from the group consisting of Y, Pr, Nd, Sm, Eu, Gd, Tb, Dy, Ho, Tm, Yb and Sc or a composition expressed (k) a formula: $Er_{(x)}R_{(1-x)}Ni_{(y)}Cu_{(1-y)}$ wherein $0 \leq x \leq 1$, $0 \leq y \leq 1$, and R denotes a rare earth element selected from the group consisting of Y, Pr, Nd, Sm, Eu, Gd, Tb, Dy, Ho, Tm, Yb and Sc; and a partition member for separating the second refrigerant from the first one no to be mixed in the refrigerating force storage chamber.

It is preferable that $Er_3Ni$, $(Er, R)_3Ni$, $Er_3(Ni, Co)$, $(Er, R)_3(Ni, Co)$, $Er(Ni, Cu)$, $Ho(Ni, Cu)$ or $(Er, Ho)(Ni, Cu)$ is filled, as the first refrigerant, in the final refrigerating force storage chamber on the high temperature side thereof. A composition expressed by $Er_{(x)}Dy_{(1-x)}Ni_2$ wherein $0 \leq x \leq 0.85$ or by $Er_{(x)}Gd_{(1-x)}Rh$ wherein $0 \leq x \leq 0.3$ may also be used as the first refrigerant.

It is also preferable that $ErNi$, $(Er, Yb)Ni$, $(Er, Ho)Ni$, $(Er, Gd)Ni$, $(Er, Y)Ni$, $Er_3AlC$, $Er_3AlCo_{.75}$ or $Er_3AlCo_{.5}$ is filled, as the second refrigerant, in the final refrigerating force storage chamber on the low temperature side thereof. A composition expressed by $Er_{(x)}Dy_{(1-x)}Ni_2$ wherein $0.85 \leq x \leq 1$, by $Er_{(x)}Gd_{(1-x)}Rh$ wherein $0.3 \leq x \leq 1$, or by $(Er_{(x)}R_{(1-x)})(1-y)Ru_{(y)}$ wherein $0.5 \leq x \leq 1$ and $0 \leq y \leq 0.7$ may also be used as the second refrigerant.

R represents a rare earth element selected from the group of Y, Pr, Nd, Sm, Eu, Gd, Tb, Dy, Ho, Tm, Yb and Sc. La, Ce and Pm are intendedly excluded from the above group of rare earth elements from which the refrigerants are selected, because it has been found that La and Ce are so active as to be easily oxidized, that they cannot be therefore used for industrial purposes, and that Pm cannot be obtained as a stable element under circumstances.

The first and second refrigerants are formed as pellets each having an appropriate size. The partition member is arranged in the final refrigerating force storage chamber to separate the first refrigerant pellets from the second ones or not to mix them with one another therein. This enables them to occupy so right areas in the chamber as to attain peaks of their specific heats. The refrigerating efficiency of the refrigerator can be thus remarkably increased.

It is preferable that the second refrigerant is filled in the final refrigerating force storage chamber, occupying 10-90% of the total volume. The first refrigerant is filled in the remaining volume of the chamber in this case.

Au, Ag, Cu, Pd, Pt, Ru, Rh, Zr, Y, In, Ga or Al may be added to any of the first and/or second refrigerants. when they are added to both of the refrigerants, magnetic phase transition temperature of the first and/or second refrigerants can be finely changed, peak positions of their specific heats can be micro-adjusted, and their heat transmitting characteristics can be enhanced. When Cu and Y are added to $ErNi$ which is used as the second refrigerant on the low temperature side of the chamber, for example, the magnetic phase transition temperature of the second refrigerant can be lowered.

When either or both of x and y in the formulas is or are selected, the first refrigerant can create a specific heat larger than or equal to the specific heat of $Er_3Ni$ in a region higher than 10 K. in temperature. When either or both of x and y in the formulas are selected, the second refrigerant can also create a specific heat larger than the specific heat of $Er_3Ni$ in a region lower than 10 K. in temperature. When the second refrigerant is filled in the final refrigerating force storage chamber on the low temperature side thereof, therefore, the refrigerating capacity of the cryogenic refrigerator can be increased to a greater extent at a temperature of 4.2 K. or more or less.

It will be considered how the first and second refrigerants filled in the final refrigerating force storage chamber on the high and low temperature sides thereof are combined with each other.

Let us imagine that the composition expressed by the formula $Er_{(x)}R_{(1-x)}Ni_{(y)}Cu_{(1-y)}$ is used as the first refrigerant and that the composition expressed by the formula $Er_{(x)}R_{(1-x)}Ni_{(y)}Co_{(1-y)}$ is used as the second refrigerant. Providing that y be 1, both of the compositions can be expressed by $Er_{(x)}R_{(1-x)}Ni$ but they are not necessarily same in composition. More particularly, when Gd is selected as R and x is 0.9, the composition can be expressed by $Er_{0.9}Gd_{0.1}Ni$. When $Er_{0.9}Gd_{0.1}Ni$ is used as the first refrigerant, $ErNi$ can be selected as the second refrigerant. When $Er_{0.9}Gd_{0.1}Ni$ is used as the second refrigerant, $Er_3Co$ can be selected as the first one.

It will be further described referring to FIG. 48. When $ErNi$ is used as the second refrigerant, $Er_{0.95}Gd_{0.05}Ni$, $Er_{0.9}Gd_{0.1}Ni$, $Er_{0.85}Gd_{0.15}Ni$ or $Er_{0.75}Gd_{0.25}Ni$ can be selected as the first refrigerant. When $Er_{0.95}Gd_{0.05}Ni$ is used as the second refrigerant, $Er_{0.9}Gd_{0.1}Ni$, $Er_{0.85}Gd_{0.15}Ni$ or $Er_{0.75}Gd_{0.25}Ni$ can be selected as the first refrigerant. When $Er_{0.9}Gd_{0.1}Ni$ is used as the second refrigerant, $Er_{0.85}Gd_{0.15}Ni$ or $Er_{0.75}Gd_{0.25}Ni$ can be selected as the first refrigerant. When $Er_{0.85}Gd_{0.15}Ni$ is used as the second refrigerant, $Er_{0.75}Gd_{0.25}Ni$ can be selected as the first refrigerant.

According to another aspect of the present invention, there can be provided a cryogenic refrigerator capable of creating a higher refrigerating force by expanding compressed helium gas after it is cooled while being passed firstly through a first refrigerating force storage chamber at a first cooling stage and finally through a final refrigerating force storage chamber at a final cooling stage, the cryogenic refrigerator having a first refrigerant filled in the first refrigerating force storage chamber and a second refrigerant filled in the final refrigerating force storage chamber, wherein the first refrigerant comprises lead and copper which have a volume ratio falling within a range of 4:6 to 8:2 and the second refrigerant comprises a magnetic one.

Only Cu or a combination of Cu and Pb is used in the first refrigerant.

It is preferable that a magnetic refrigerant such as $Er_3Ni$ is contained in the second refrigerant.

Lead has a specific heat by far higher than that of copper at temperatures lower than 60 K. When the lead refrigerant is filled in the chamber on the low temperature side thereof, therefore, temperature obtained at a stage head the final one can be lowered. This allows the refrigerant-filled chamber at the final stage to increase the refrigerating capacity of the refrigerator to a greater extent at about 4.2 K.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a sectional view schematically showing the Gifford-McMahon type refrigerator according to the first embodiment of the present invention;

FIG. 6 is a graph showing the comparison of refrigerating capacity obtained by the first refrigerator relative to that obtained by the conventional one;

FIG. 7 is a vertically-sectioned view showing first and second (or final) cooling stages in the refrigerator according to a second embodiment of the present invention;

FIG. 8 is a vertically-sectioned view showing a variation of the second embodiment;

FIG. 10A is a graph showing the relation between the volume rate of Pb refrigerant and temperature $\epsilon$ attained at the final cooling stage;

FIG. 18 is a graph showing how coefficient of heat expansion of various materials change when the inner seal ring is made of one of these materials;

FIG. 21 is a graph showing the relation between the time lapse of the refrigerator operated and the increasing rate of the amount of gas leaked when various kinds of seal rings are used;

FIG. 22 is a graph showing the relation between the time lapse of the refrigerator operated and the increasing rate of the amount of gas leaked when the inner circumference of the cylinder is variously finished;

FIG. 23 is a vertically-sectioned view partly showing a seal means at the final stage of the refrigerator according to a fourth embodiment of the present invention;

FIG. 24 is a vertically-sectioned view showing seal rings of the seal assembly assembled in the fourth refrigerator;

FIG. 25 is a vertically-sectioned view partly showing the cooling stage of the conventional refrigerator;

FIG. 32 partly shows a strip coil spring of the seal assembly;

FIG. 33 is a plan showing a receiver ring;

FIG. 34 is a side view showing both ends of each seal ring;

FIG. 35 is a graph showing curves theoretically calculated of temperature changes at each cooling stages, said temperature changes being caused when gas is leaked through the seal assembly;

FIG. 40 shows a temperature distribution at the final cooling stage in the longitudinal direction thereof;

FIG. 41 is a graph showing the relation between ratio L/D and refrigeration loss;

FIG. 55 is a graph showing specific heat characteristics of various refrigerants which are suitable for being filled in the final refrigerating force storage chamber on the low temperature side thereof;

FIG. 56 is a graph showing specific heat characteristics of various refrigerants which are suitable for being filled in the final refrigerating force storage chamber on the low temperature side thereof;

FIG. 57 is a graph showing specific heat characteristics of the refrigerant expressed by the formula $Er_{(x)}Dy_{(1-x)}Ni_2$, said characteristics being obtained when x in the formula is replaced by 0, 0.2, 0.6, 0.8, 0.85 and 1;

FIG. 58 is a graph showing specific heat characteristics of the refrigerant expressed by the formula $Er_{(x)}Gd_{(1-x)}Rh$, said characteristics being obtained when x in the formula is replaced by 0, 0.1, 0.2, 0.3, 0.4, 0.5, 0.6 and 1;

DETAILED DESCRIPTION OF THE PREFERRED EMBODIMENTS

Some embodiments of the present invention will be described with reference to the accompanying drawings.

Figure 1:
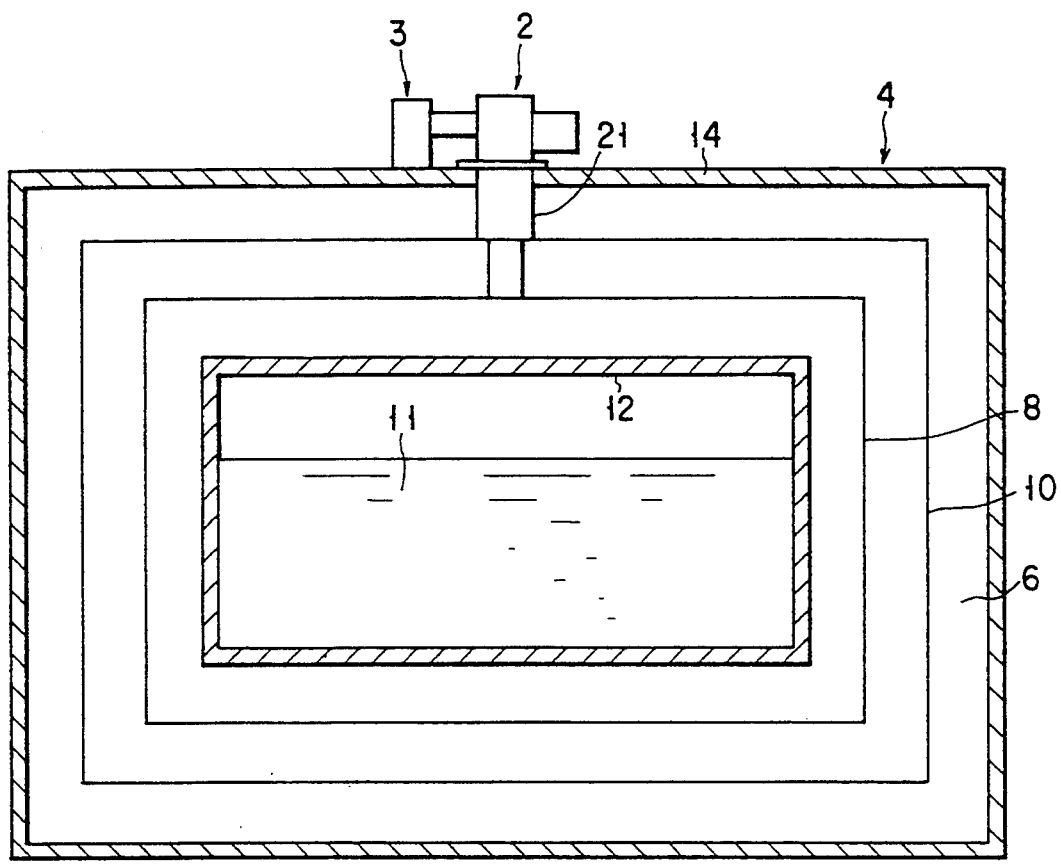
FIG. 1 is a sectional view schematically showing the cryostat to which the cyrogenic refrigerator according to a first embodiment of the present invention is attached.
Figure 3:
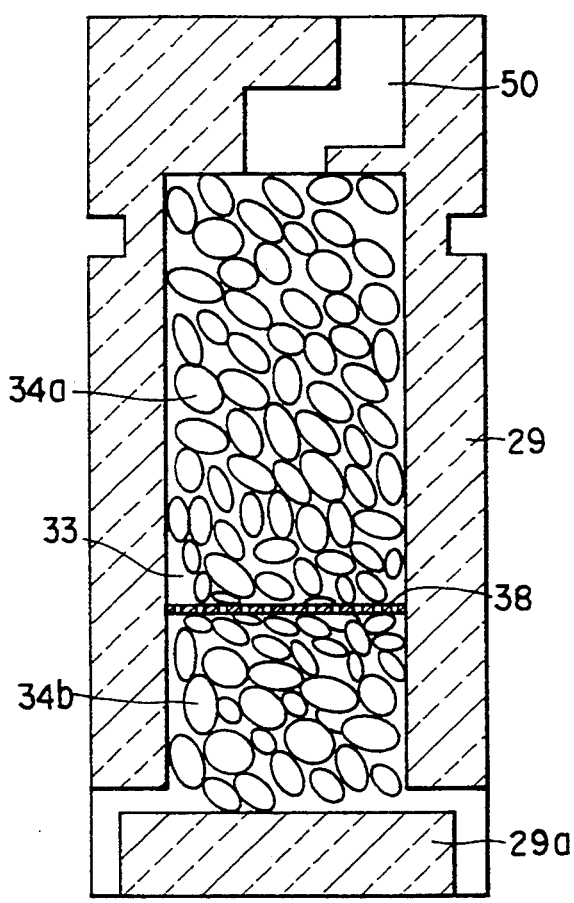
FIG. 3 is a vertically-sectioned view showing a final cooling stage in the refrigerator.

As shown in FIG. 1, a cooling cylinder 21 of the cryogenic refrigerator according to an embodiment of the present invention is arranged in an heat insulating layer 6 of a cryostat 4. The cryostat 4 is made of metal or a compound material such as fiber-reinforce plastic. An inner container 12 is located in the center of the cryostat 4 and it contains therein liquid helium having a temperature of 4.2 K. An outer container 14 encloses the inner one 12. The superinsulation layer 6 which serves mainly as a vacuum heat insulating layer is formed between the inner 12 and the outer container 14.

Double radiated-heat shielding plates 8 and 10 each made of aluminium, for example, are arranged in the superinsulation layer 6, enclosing the inner container 12. In order to enable the superinsulation layer 6 to have excellent heat insulating characteristic, it is needed that the inner shielding plate 8 is kept at a temperature of about 15 K. and that the outer shielding plate 10 is kept at a temperature of about 40 K.

In the case of the cryostat 4 shown in FIG. 1, helium gas is lead into change and out discharge of a cold head 2 of the cryogenic refrigerator through a coolant gas lead system 3, so that the inner and outer shielding plates 8 and 10 can be controlled to have temperatures of about 15 K. and about 40 K., respectively. The Gifford-McMahon cryogenic refrigerator arranged as described above will be described.

First Embodiment

The Gifford-McMahon type cryogenic refrigerator generally comprises the cold head 2 and the coolant gas lead system 3.

The cold head 2 includes closed cylinder 21 and a piston or displacer 22 made of heat insulating material and freely reciprocated in the cylinder 21. A rod 41 is attached to the top of the displacer 22 at an end thereof and it is further connected to a rotating shaft 42 of a motor 23 at the other end thereof. When the motor 23 is rotated, the displacer 22 is reciprocated up and down in the cylinder 21.

The cylinder 21 comprises a first large cylinder section 24 and a second small cylinder section 25 coaxially connected to the first one 24. Each of the first and second cylinder sections 24 and 25 is usually formed by a thin stainless steel plate, for example.

A first cooling stage 26 is formed at the boundary portion of the first cylinder section 24 with the second one 25. A second cooling stage 27 lower in temperature than the first one 26 is also formed at the bottom wall portion of the second cylinder section 25.

The displacer 22 comprises a first displacer section 28 reciprocated in the first cylinder section 25 and a second displacer section 29 reciprocated in the second cylinder section 25. The first 28 and the second displacer section 29 are connected in series to each other by a coupling assembly 30.

A fluid chamber 31 which serves as a refrigerant-filled chamber is formed in the first displacer section 28 in the axial direction of the section 28. A refrigerant 32 made of like copper or lead meshes is housed in the fluid chamber 31.

Another fluid chamber 33 which serves as a final stage refrigerant-filled chamber is formed in the second displacer section 29. A plurality of ball- or mass-shaped refrigerants 34a and 34b are stored in the fluid chamber 33. These two chambers 31 and 33 are communicated with each other through a space 49 and a passage 50.

As shown in FIG. 2, the fluid chamber 33 is separated into upper and lower sections by a separator 38.

The first refrigerant 34a is filled in the chamber 33 at the upper portion (or on the high temperature side) thereof and the second refrigerant 34b in the chamber 33 at the lower portion (or on the low temperature side) thereof. A composition expressed by the following formulas (a), (b), (c), (d) and (e) is able to be used as the first refrigerant 34a.

(a) $(Er_{(x)}R_{(1-x)})_3Ni_{(y)}Co_{(1-y)}$ wherein $0 \leq x \leq 1$, $0 \leq y \leq 1$ and R represents a rare earth element selected from the group consisting of Y, Pr, Nd, Sm, Eu, Gd, Tb, Dy, Ho, Tm, Yb and Sc;

(b) $Er_{(x)}R_{(1-x)}Ni_{(y)}Cu_{(1-y)}$ wherein $0 \leq x \leq 1$, $0 \leq y \leq 1$ and R denotes a rare earth element selected from the group consisting of Y, Pr, Nd, Sm, Eu, Gd, Tb, Dy, Ho, Tm, Yb and Sc;

(c) $Er_{(x)}Dy_{(1-x)}Ni_2$ wherein $0 \leq x \leq 0.85$;

(d) $Er_{(x)}Gd_{(1-x)}Rh$ wherein $0 \leq x \leq 0.3$; and (e) $Er_{(x)}R_{(1-x)}Ni_{(y)}Co_{(1-y)}$ wherein $0 \leq x \leq 1$, $0 \leq y \leq 1$ and R denotes a rare earth element selected from the group consisting of Gd, Tb, Dy and Ho.

A composition expressed by one of the following formulas (f), (g), (h), (i), (j) and (k) is able to be used as the second refrigerant 34b.

(f) $Er_{(x)}R_{(1-x)}Ni_{(y)}Co_{(1-y)}$ wherein $0 \leq x \leq 1$, $0 \leq y \leq 1$ and R represents a rare earth element selected from the group of Y, Pr, Nd, Sm, Eu, Gd, Tb, Dy, Ho, Tm, Yb and Sc;

(g) $(Er_{(x)}R_{(1-x)})_3AlC_{(y)}$ wherein $0 \leq x \leq 1$, $0 \leq y \leq 1$ and R represents a rare earth element selected from the group of Y, Pr, Nd, Sm, Eu, Gd, Tb, Dy, Ho, Tm, Yb and Sc;

(h) $Er_{(x)}Dy_{(1-x)}Ni_2$ wherein $0.85 \leq x \leq 1$;

(i) $Er_{(x)}Gd_{(1-x)}Rh$ wherein $0.3 \leq x \leq 1$;

(j) $(Er_{(x)}R_{(1-x)})_{(1-y)}Ru_{(y)}$ wherein $0.5 \leq x \leq 1$, $0 \leq y \leq 0.7$ and R denotes a rare earth element selected from the group of Y, Pr, Nd, Sm, Eu, Gd, Tb, Dy, Ho, Tm, Yb and Sc; and (k) $Er_{(x)}R_{(1-x)}Ni_{(y)}Cu_{(1-y)}$ wherein $0 \leq x \leq 1$, $0 \leq y \leq 1$, and R denotes a rare earth element selected from the group consisting of Y, Pr, Nd, Sm, Eu, Gd, Tb, Dy, Ho, Tm, Yb and Sc.

In the case of this embodiment, $Er_3Co$ is used as the first refrigerant 34a and $ErNi_{0.8}Co_{0.2}$ as the second one 34b.

This magnetic refrigerant $Er_{(1-x)}R_{(x)}Ni$ is made by milling sintered rare earth compound in a ball mill. Upon milling the compound in the ball mill, only the sintered compound is put in the mill container and milled in it under inactive atmosphere without using balls. The method of making the magnetic refrigerant $Er_{(1-x)}R_{(x)}Ni$ is disclosed in detail in U.S. patent application Ser. No. 07/804,501 and European Patent Application Ser. No. 89300896.1.

The first and second magnetic refrigerants 34a and 34b are separated by the separator 38 in such a way that they cannot be mixed with each other in the chamber 33. The volume of the second refrigerant 34b occupies, in this case, 30% in the total sum of volumes of the first and second refrigerants 34a and 34b.

Figure 47:
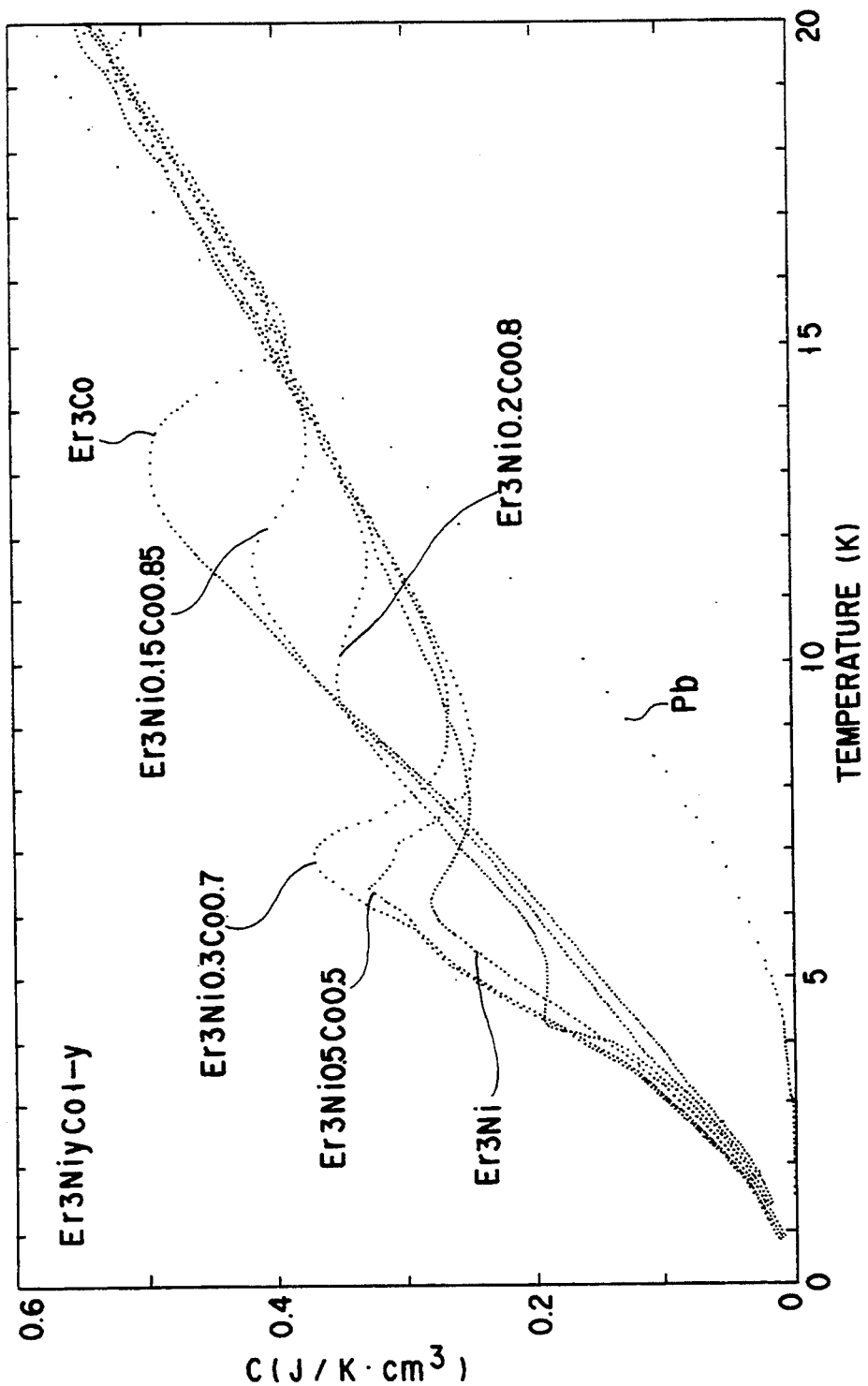
FIG. 47 is a graph showing specific heat characteristics of Pb and the composition expressed by the formula $Er_3Ni_{(y)}Co_{(1-y)}$, said characteristics being obtained when y in the formula is replaced by 0, 0.1, 0.15, 0.2, 0.3, 0.5 and 1.

As shown in FIG. 47, when the composition is expressed by $Er_3Ni_{(y)}Co_{(1-y)}$ and y in the formula is replaced by 0, 0.1, 0.15, 0.2, 0.3, 0.5 and 1, the peak of its specific heat values changes from a temperature of 13 K. to a temperature of 6 K., as shown in FIG. 47. It has been found that the peak of its specific heat values moves to low temperature side as the amount of its Co decreases but the amount of its Ni increases. Generally, peak of specific heat is obtained at magnetic phase transition temperature of refrigerant. Therefore, a temperature of specific heat peak corresponds with the magnetic phase transition temperature. The specific heat characteristic curve of Pb is also shown as a comparison example in FIG. 47.

Figure 48:
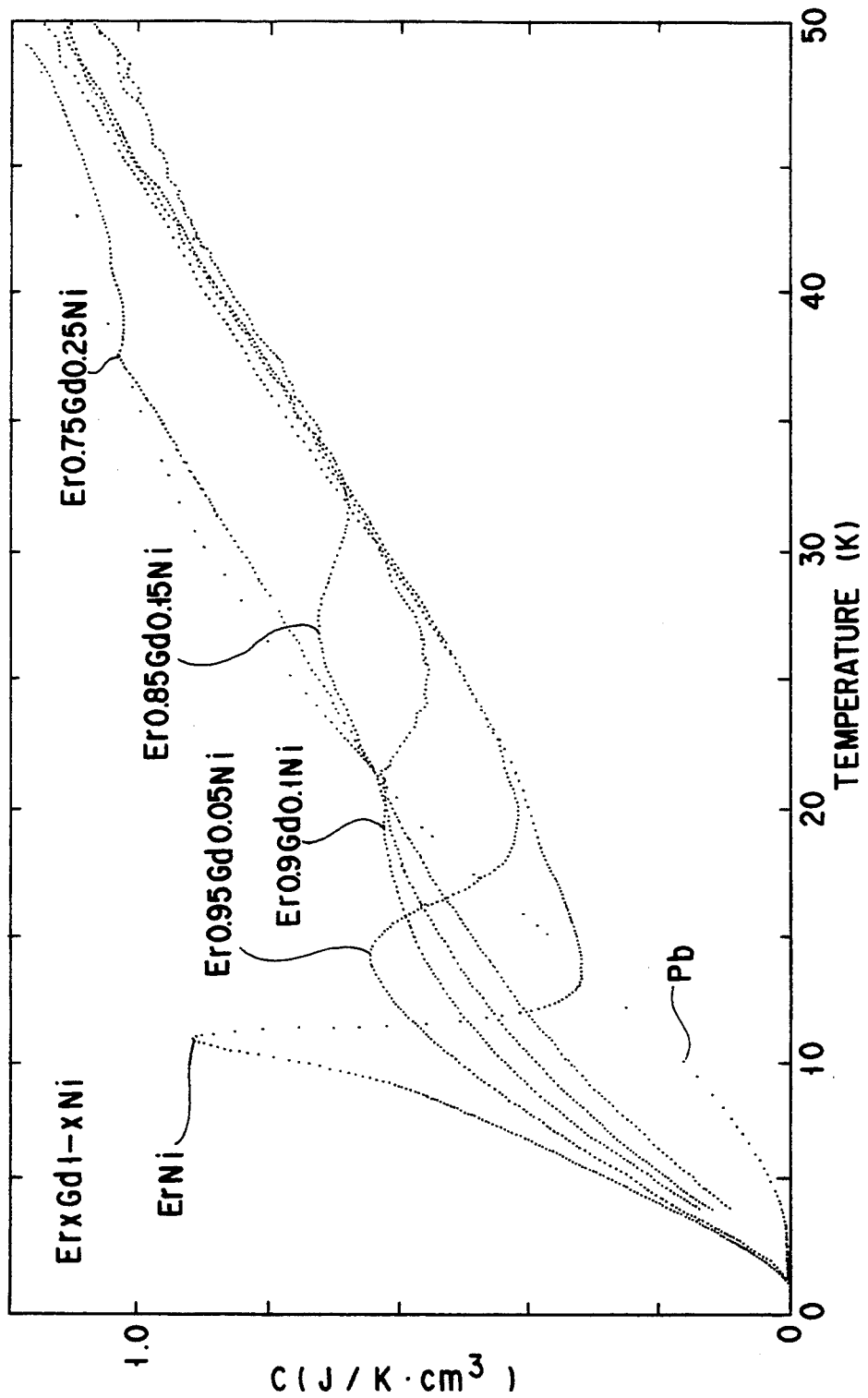
FIG. 48 is a graph showing specific heat characteristics of the composition expressed by the formula $Er_{(x)}Gd_{(1-x)}Ni$, said characteristics being obtained when x in the formula is replaced by 0.75, 0.85, 0.9, 0.95 and 1.

As shown in FIG. 48, when the composition is expressed by $Er_{(x)}Gd_{(1-x)}$ Ni and x in the formula is replaced by 0.75, 0.85, 0.9, 0.95 and 1, the peak of its specific heat values changes from a temperature of 37 K. to a temperature of 10 K. It has been found that the peak of its specific heat values moves to low temperature side as the amount of its Gd decreases but the amount of its Er increases.

Figure 49B:
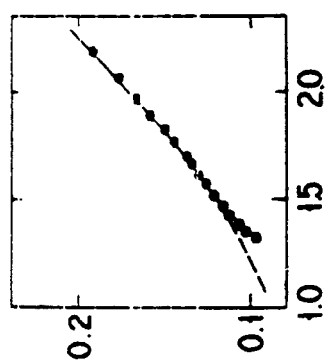
FIG. 49 is a graph showing specific heat characteristics of $ErNi_{0.6}Cu_{0.4}$ and $HoNi_{0.5}Cu_{0.5}$.
Figure 49A:
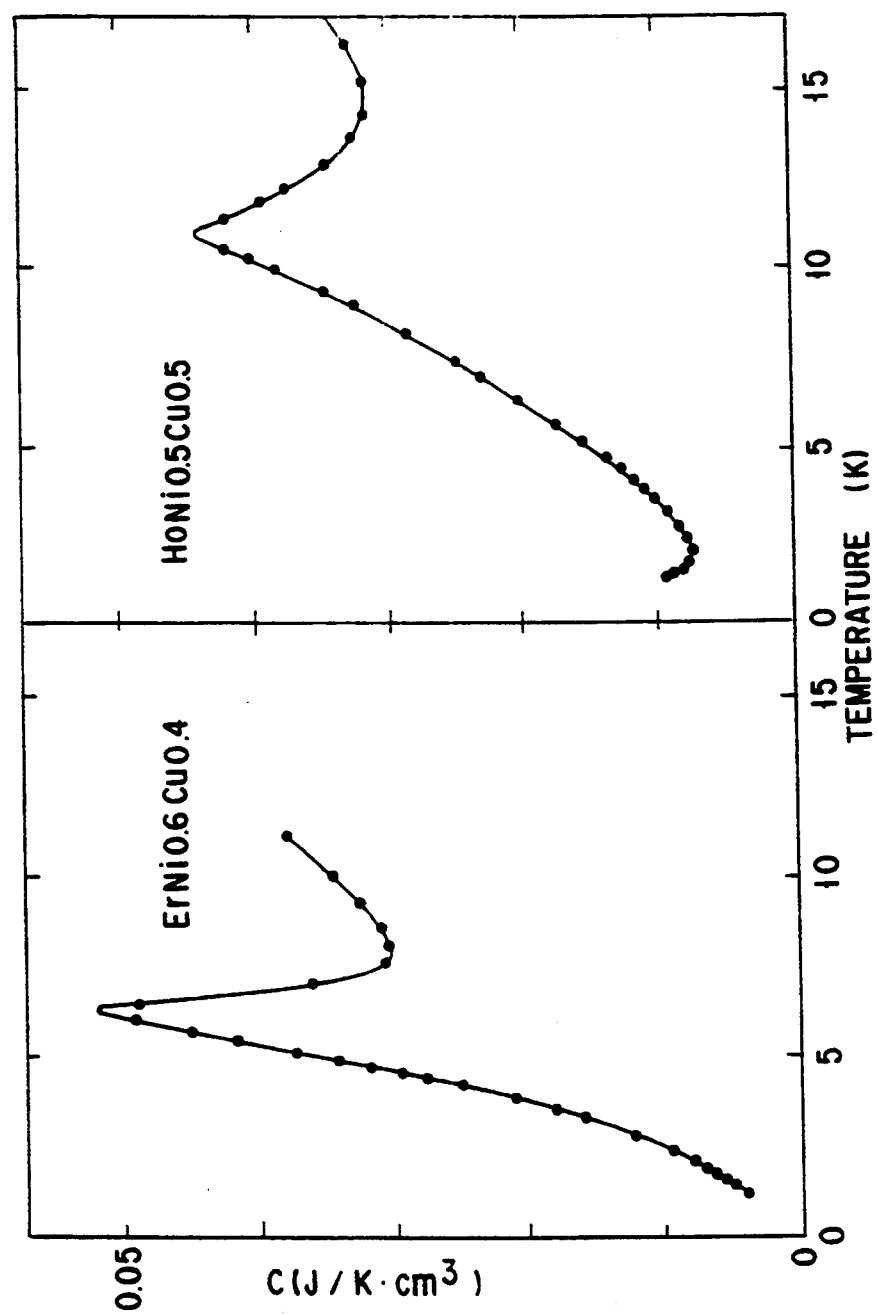

As shown in FIG. 49, the peak of specific heat values of $ErNi_{0.6}Cu_{0.4}$ is at a temperature of 6 K. and that of $HoNi_{0.5}Cu_{0.5}$ at a temperature of 11 K.

Figure 50:
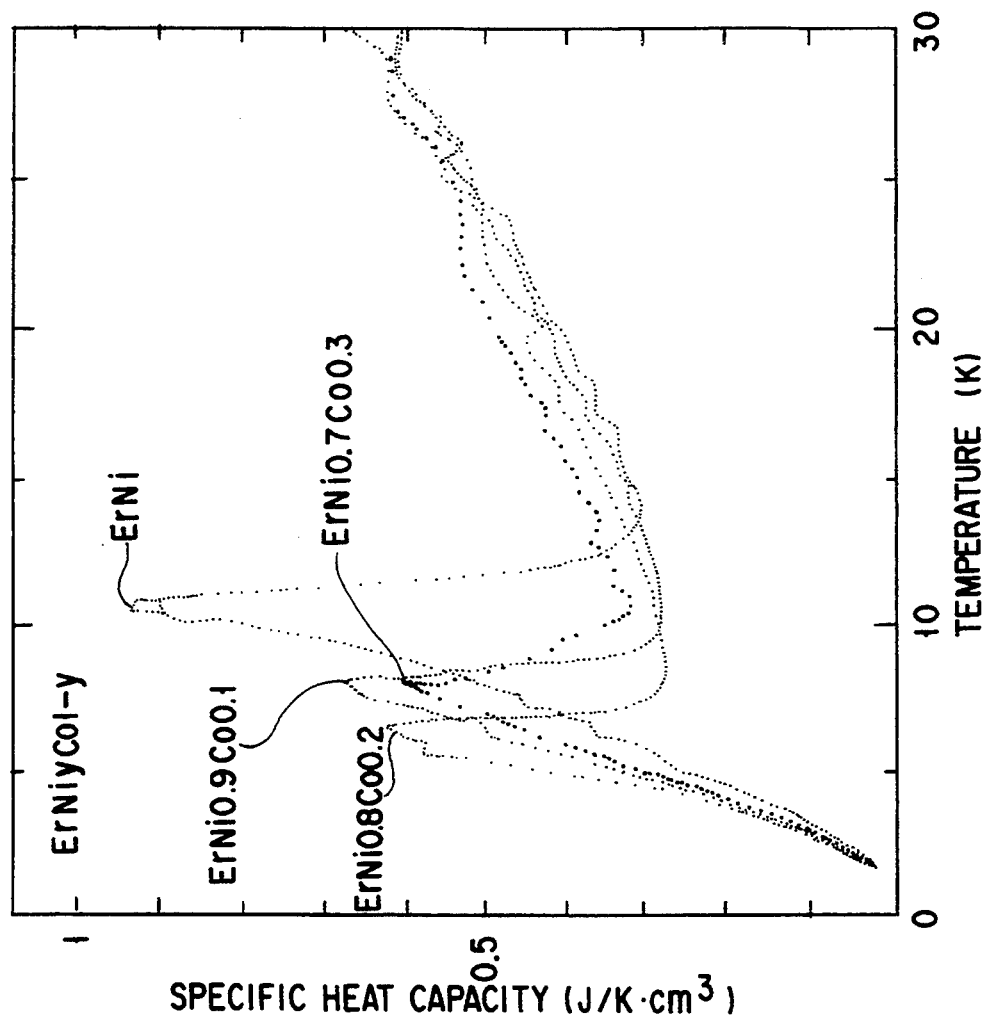
FIG. 50 is a graph showing specific heat characteristics of the composition expressed by the formula $ErNi_{(y)}Co_{(1-y)}$, said characteristics being obtained when y in the formula is replaced by 0.7, 0.8, 0.9 and 1.

As shown in FIG. 50, when the composition is expressed by $ErNi_{(y)}Co_{(1-y)}$ and y in the formula is replaced by 0.7, 0.8, 0.9 and 1, the peak of its specific heat values changes from a temperature of 11 K. to a temperature of 6 or 7 K. It has been found that the peak of its specific heat values moves to low temperature side as the amount of its Ni decreases but the amount of its Co increases.

Figure 51:
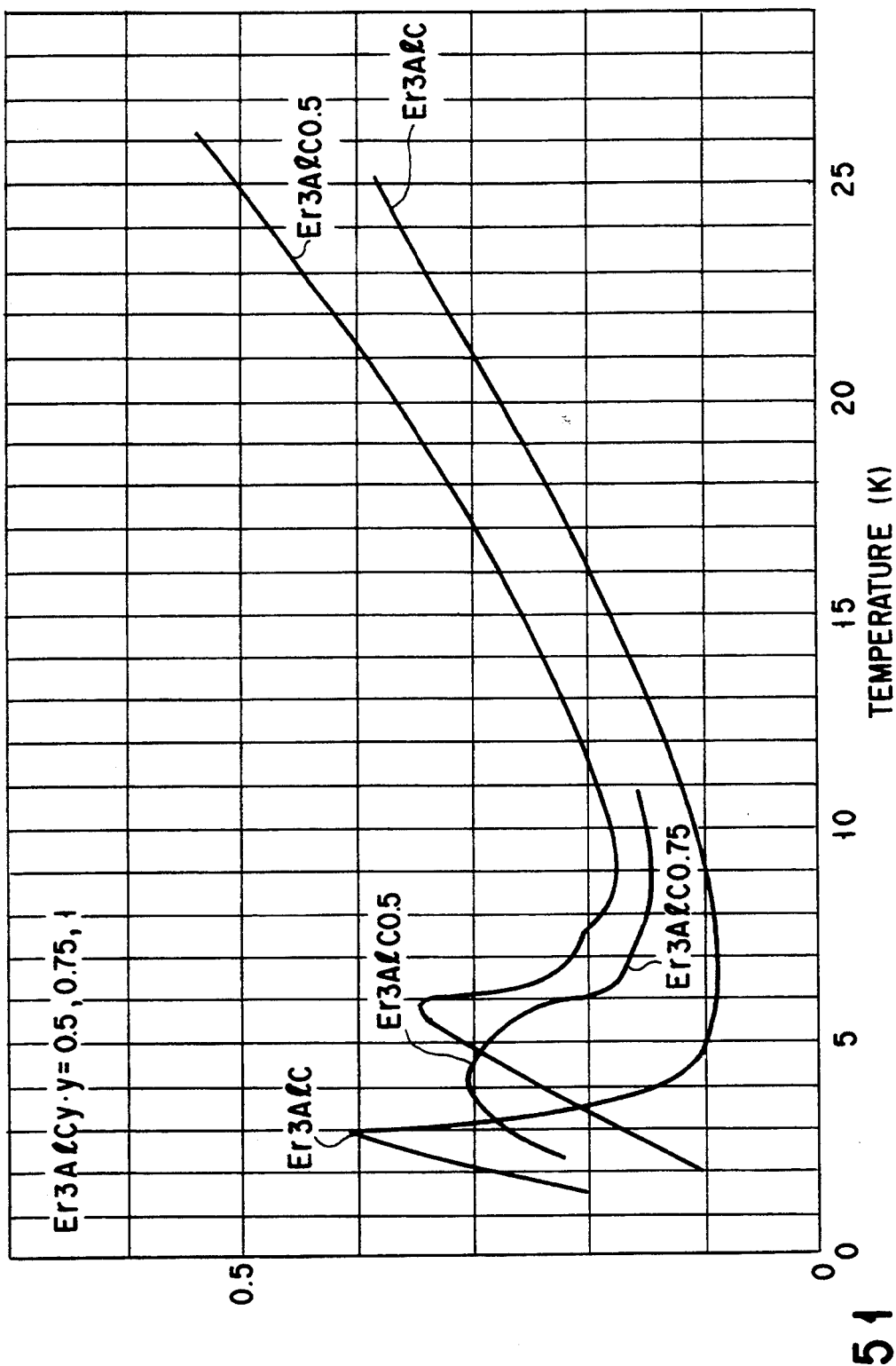
FIG. 51 is a graph showing specific heat characteristics of the composition expressed by the formula $Er_3Al_Cy$, said characteristics being obtained when y in the formula is replaced by 0.5, 0.75 and 1.

As shown in FIG. 51, when the composition is expressed by $Er_3AlC_y$ and y in the formula is replaced by 0.5, 0.75 and 1, the peak of its specific heat values changes from a temperature of 6K to a temperature of 3 K. It has been found that the peak of its specific heat values moves to low temperature as the amount of its carbon increases.

Figure 52:
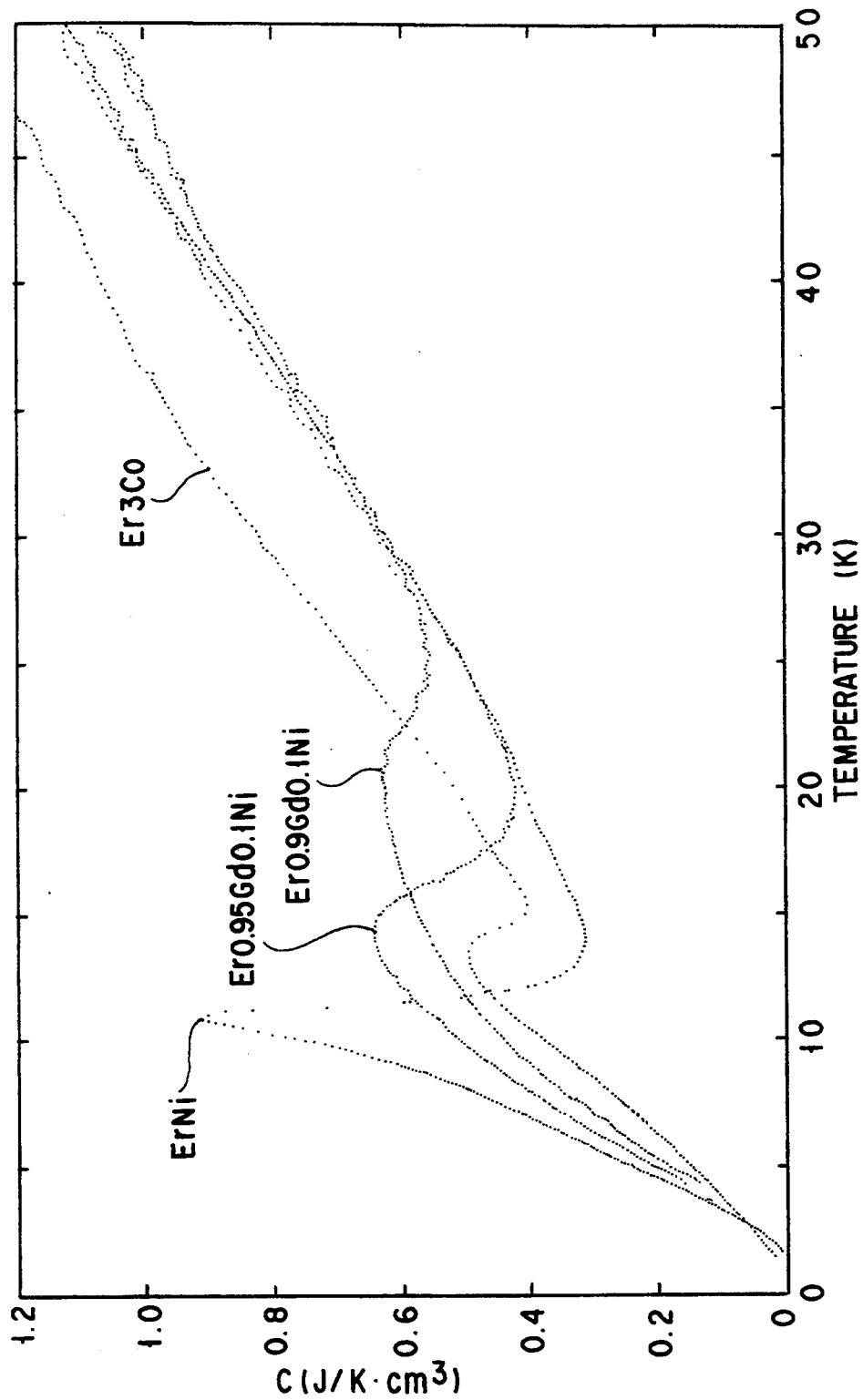
FIG. 52 is a graph showing specific heat characteristics of $ErNi$, $Er_{0.95}Gd_{0.05}Ni$, $Er_{0.9}Gd_{0.1}Ni$ and $Er_3Co$.

FIG. 52 shows specific heat characteristics of ErNi, $Er_{0.95}Gd_{0.05}Ni$, $Er_{0.9}Gd_{0.1}Ni$ and $Er_3Co$. As apparent from FIG. 52, the composition expressed by $Er_{(x)}Gd_{(1-x)}Ni$ can be used in both of high and low temperature sides of the final refrigerating force storage chamber. When $Er_3Co$ is used as the first refrigerant 34a, $Er_{0.95}Gd_{0.05}Ni$ or $Er_{0.9}Gd_{0.1}Ni$ can be used as the second refrigerant 34b. When ErNi is used as the second refrigerant 34b, $Er_{0.95}Gd_{0.05}Ni$ or $Er_{0.9}Gd_{0.1}Ni$ can be used as the first refrigerant 34a.

Figure 53:
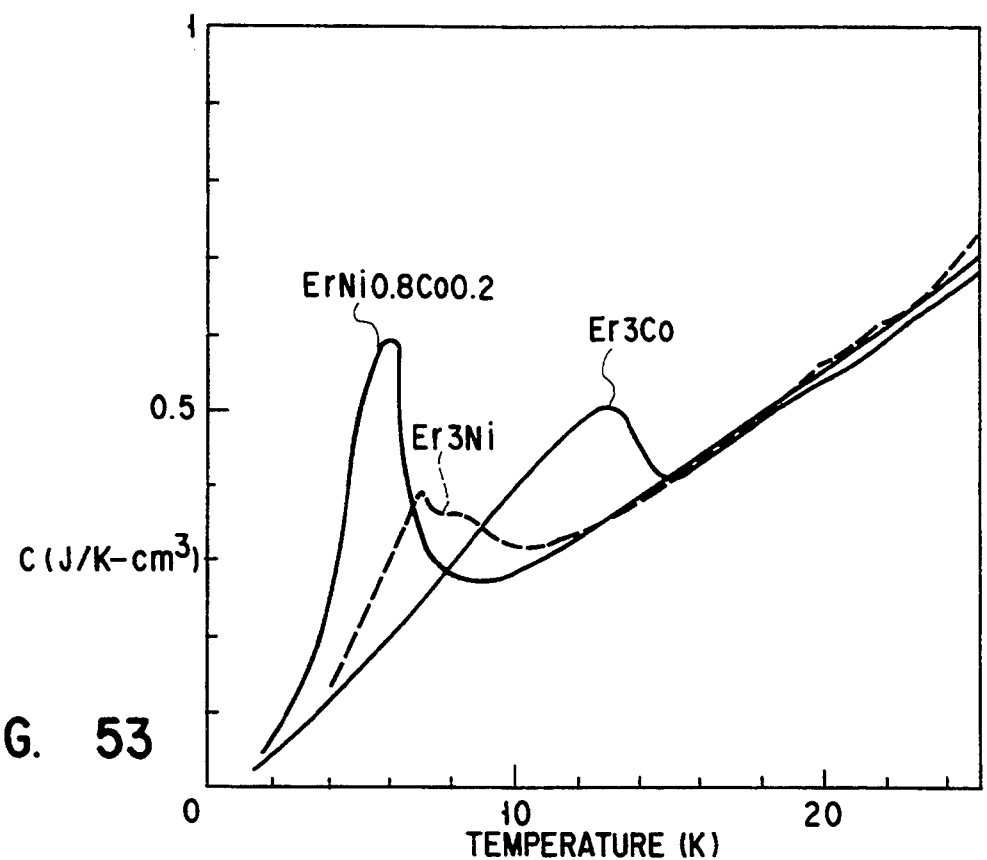
FIG. 53 is a graph showing specific heat characteristics of $ErNi_{0.8}Co_{0.2}$, $Er_3Co$ and $Er_3Ni$.

As shown in FIG. 53, the specific heat of $Er_3Co$ at a temperature of 12 K. is by far larger than those of $ErNi_{0.8}Co_{0.2}$ and $Er_3Ni$. On the other hand, the specific heat of $ErNi_{0.8}Co_{0.2}$ is by far larger than those of $Er_3Co$ and $Er_3Ni$ when the temperature is less than 7 K. The fluid passage 33 has a temperature gradient. When $Er_3Co$ is filled in the chamber on the high temperature side thereof and $ErNi_{0.8}Co_{0.2}$ in the chamber on the low temperature side thereof, therefore, the specific heat characteristic of each of the refrigerants can be used most effectively. The refrigeration efficiency of the cryogenic refrigerator can be thus enhanced at a temperature of about 4.2 K.

Figure 54:
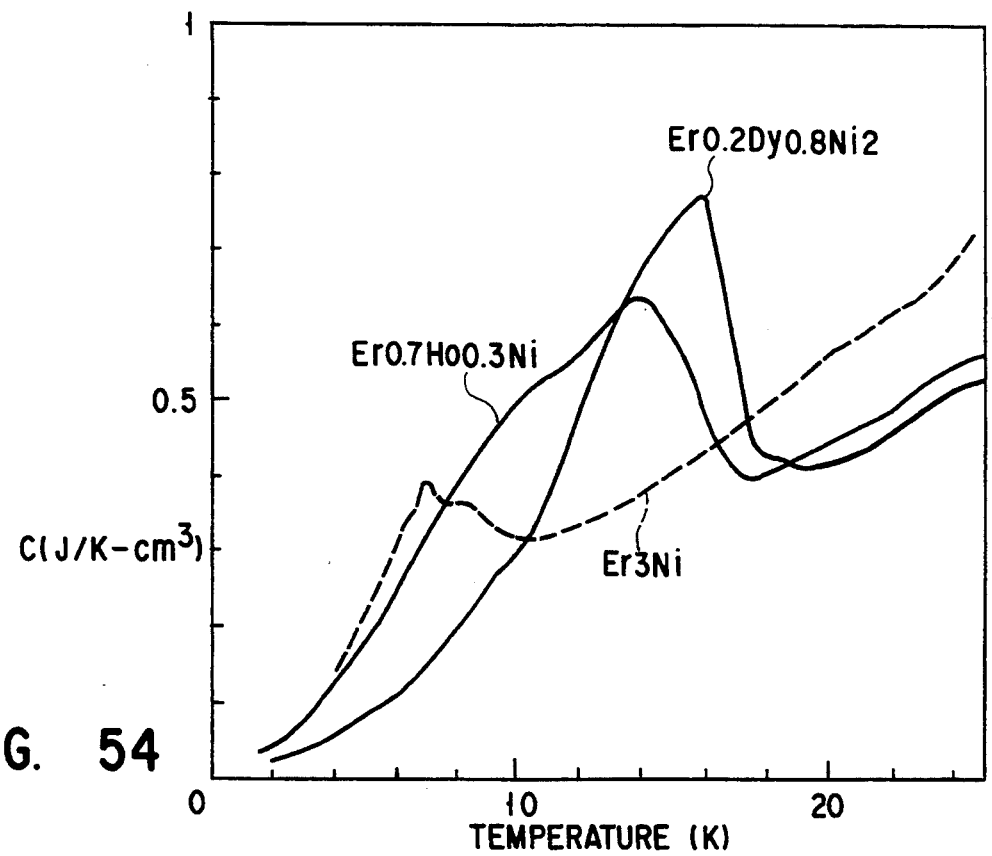
FIG. 54 is a graph showing specific heat characteristics of various refrigerants which are suitable for being filled in the final refrigerating force storage chamber on the high temperature side thereof.

FIG. 54 shows specific heat characteristics of those refrigerants which are suitable for the first refrigerant 34a. FIG. 55 shows specific heat characteristics of those refrigerants which are suitable for the second refrigerant 34b. The specific heat characteristic of $Er_3Ni$ is shown by a broken line in FIGS. 54 and 55.

FIG. 56 shows the specific heat characteristic of ErCu which is suitable for the first refrigerant and that of $ErNi_{0.8}Co_{0.2}$ which is suitable for the second refrigerant.

FIG. 57 shows specific heat characteristics of the composition expressed by $Er_{(x)}Dy_{(1-x)}Ni_2$ and obtained when x in the formula is replaced by 0, 0.2, 0.6, 0.8, 0.85 and 1. As apparent from FIG. 57, this composition becomes suitable for the first refrigerant 34a which is filled in the chamber on the high temperature side thereof, when x in the formula is made smaller than 0.85, and it becomes suitable for the second refrigerant which is filled in the chamber on the low temperature side thereof, when x in the formula is made larger than 0.85. It can be therefore used as the first refrigerant 34a on the high temperature side and also as the second one 34b on the low temperature side.

FIG. 58 shows specific heat characteristics of the refrigerant expressed by $Er_{(x)}Gd_{(1-x)}Rh$ and obtained when x in the formula is replaced by 0, 0.1, 0.2, 0.3, 0.4, 0.5, 0.6 and 1. As apparent from FIG. 58, this composition becomes suitable for the first refrigerant 34a filled in the chamber on the high temperature side thereof, when x in the formula is made smaller than 0.3, and it becomes suitable for the second refrigerant 34b filled in the chamber on the low temperature side thereof when x in the formula is made larger than 0.3. It can be therefore used as the first refrigerant 34a on the high temperature side and also as the second refrigerant 34b on the low temperature side.

Figure 59:
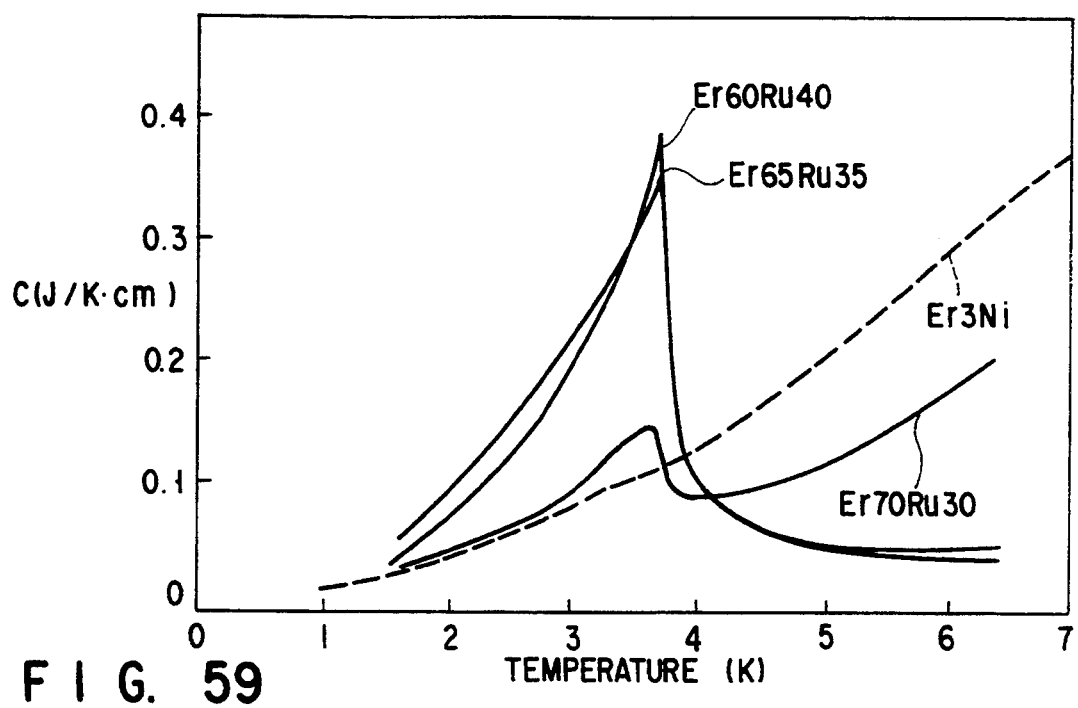
FIG. 59 is a graph showing specific heat characteristics of the refrigerant expressed by the formula $(Er_{(x)}R_{(1-x)})_{(1-y)}Ru_{(y)}$ where R denotes a rare earth element selected from Ho, Gd and Dy, said characteristics being obtained when x in the formula is set 1 and y in it is replaced by 0.6, 0.65 and 0.7.

FIG. 59 shows specific heat characteristics of the refrigerant expressed by $Er_{(x)}R_{(1-x)(1-y)}Ru_{(y)}$ wherein R represents a rare earth element selected from HO, Gd and Dy, said characteristics being obtained when x in the formula is set 1 and y in it is replaced by 0.6, 0.65 and 0.7. As apparent from FIG. 59, this composition shows large specific heat characteristics at a range of temperatures less than 4 K. It is therefore suitable for the second refrigerant filled in the chamber on the low temperature side thereof.

When compositions shown in FIGS. 54–59 are grouped, it has been found that compositions expressed by the formulas (a)–(e) are suitable for the first refrigerant 34a and that compositions expressed by the formulas (f)–(k) are suitable for the second refrigerant 34b.

Elements such as Au, Ag, Cu, Pd, Pt, Ru, Rh, Zr, Y, In, Ga and Al may be added to any of those compositions which are used as the first and second refrigerants 34a and 34b. When these elements are added to them, their magnetic phase transition temperature can be finely changed. In short, peaks of their specific heat values can be micro-adjusted and their heat transmitting characteristics can be enhanced. When Cu and Y are added to ErNi, for example, the magnetic phase transition temperature of ErNi can be lowered.

Figure 60:
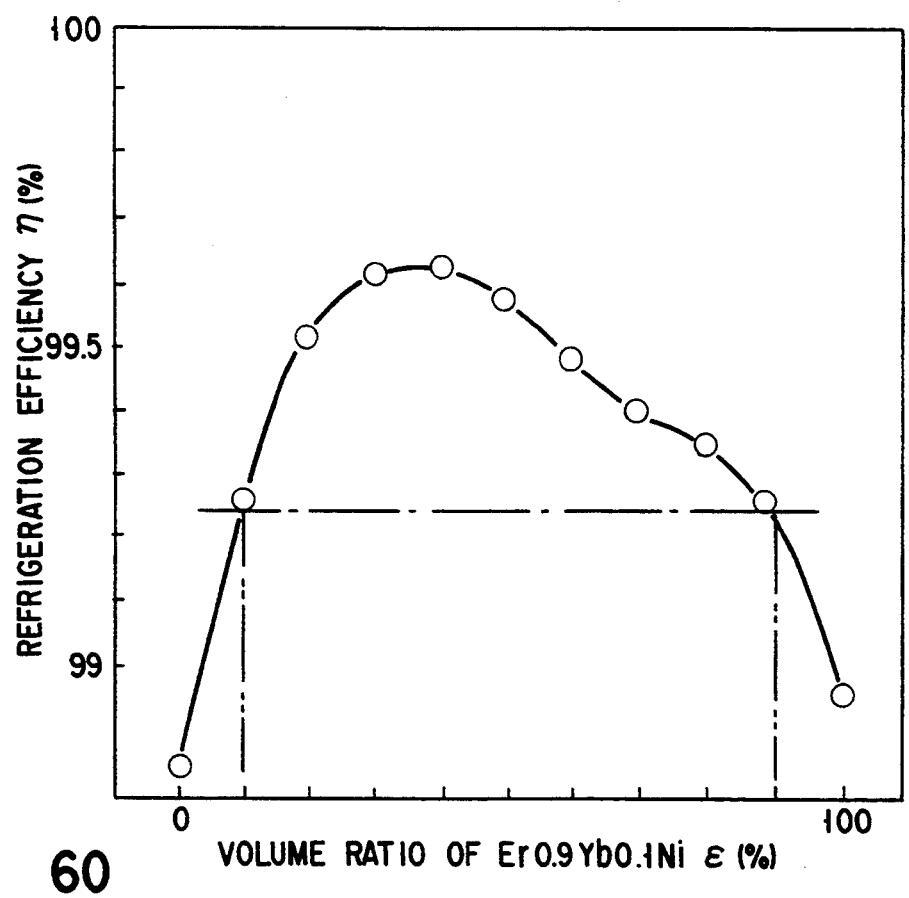
FIG. 60 is a graph showing an example of relations between volume ratios and refrigeration efficiencies of a refrigerant filled in the final refrigerating force storage chamber on the low temperature side thereof.

FIG. 60 shows the correlation of volume ratio and refrigeration efficiency, plotting volume ratios $\epsilon$ (%) of the second refrigerant relative to the first one on the horizontal axis and refrigeration efficiencies $\eta$ (%) on the vertical axis. $Er_3Co$ was used as the first refrigerant 34a and $Er_{0.9}Yb_{0.1}Ni$ as the second refrigerant 34b. Refrigeration efficiencies $\eta$ (%) were calculated under such conditions that the largest temperature in the final refrigerating force storage chamber was 32 K. and that the smallest temperature in it was 4 K. As apparent from FIG. 60, refrigeration efficiencies $\eta$ (%) higher than in the case where only $Er_3Co$ was used (or $\epsilon=0\%$) could be obtained when the volume ratio of $Er_{0.9}Yb_{0.1}Ni$ was in a range of 10–90%. It is because the specific heat of $Er_{0.9}Yb_{0.1}Ni$ is larger than that of $Er_3Co$ when temperature is less than 10 K.

Figure 61:
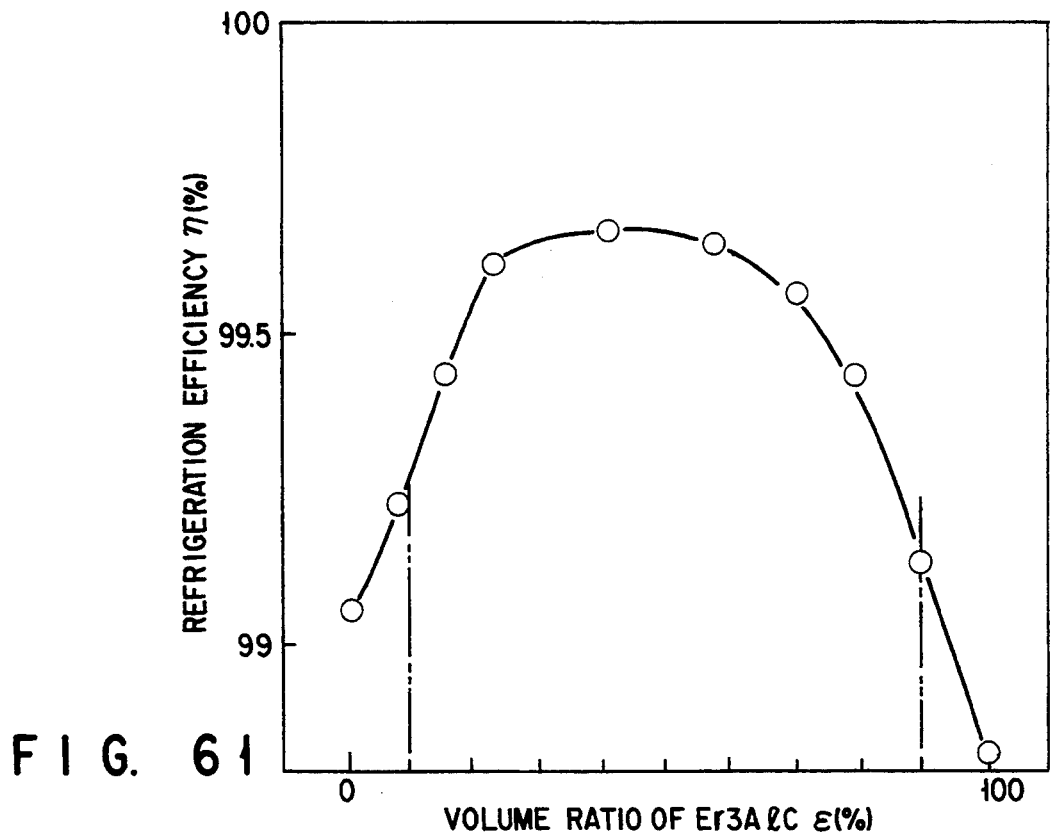
FIG. 61 is a graph showing another example of relations between volume ratios and refrigeration efficiencies of a refrigerant filled in the final refrigerating force storage chamber on the low temperature side thereof.

FIG. 61 shows the correlation of volume ratio and refrigeration efficiency, plotting volume ratios $\epsilon$ (%) of the second refrigerant relative to the first one on the horizontal axis and refrigeration efficiencies $\eta$ (%) on the vertical axis. $Er_{0.7}Ho_{0.3}Ni$ was used as the first refrigerant 34a and $Er_3AlC$ was used as the second one 34b. The temperature conditions were the same as in the above case. As apparent from FIG. 61, refrigeration efficiencies $\eta$ (%) higher than in the case where only $Er_{0.7}Ho_{0.3}Ni$ was used (or $\epsilon=0\%$) could be obtained when the ratio of $Er_3AlC$ was in a range of 10–90%. It is because the specific heat of $Er_3AlC$ is larger than that of $Er_{0.7}Ho_{0.3}Ni$ when the temperature is less than 5 K.

Figure 62:
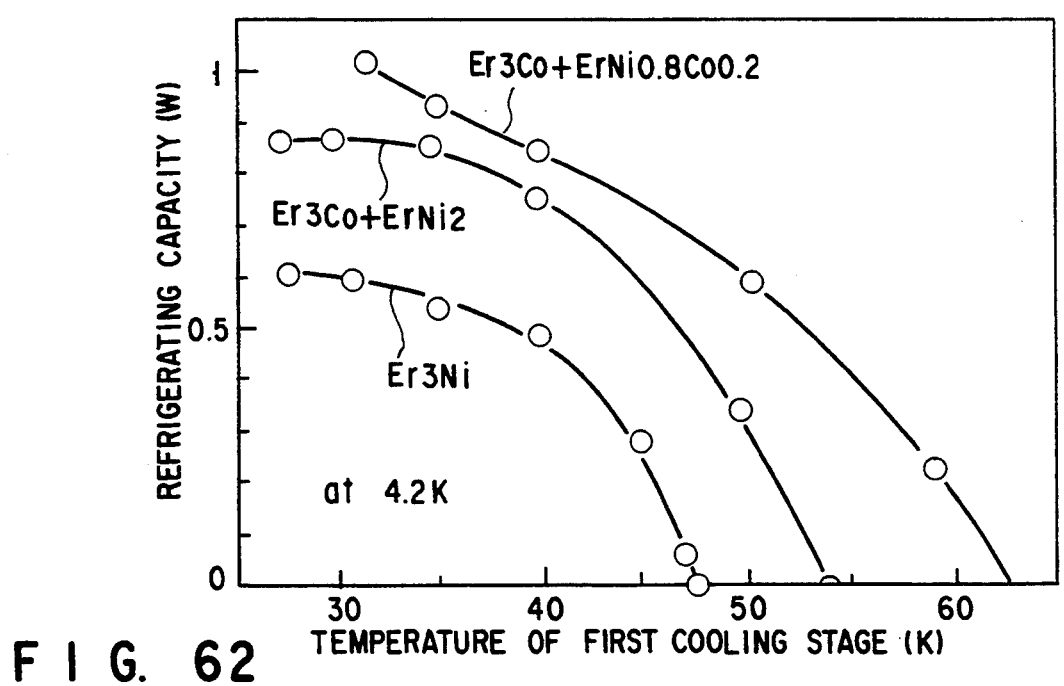
FIG. 62 is a graph showing the relation between kinds and refrigerating capacities of refrigerants filled in the final refrigerating force storage chamber.

FIG. 62 shows the correlation of temperature and refrigerating capacity, plotting temperatures at the first cooling stage on the horizontal axis and refrigerating capacities (W) on the vertical axis. The refrigerating capacity capable of keeping the temperature at the first cooling stage at 4.2 K. was checked using temperatures at the first cooling stage as a parameter.

In a first case, $Er_3Co$ was filled, as the first refrigerant 34a, in the chamber, occupying 50 volume % of the chamber, and $ErNi_{0.8}Co_{0.2}$ was filled, as the second refrigerant 34b, in the chamber, occupying 50 volume % of the chamber. In a second case, $Er_3Co$ was filled, as the first refrigerant 34a, in the chamber, occupying 50 volume % of the chamber, and $ErNi_2$ was filled, as the second refrigerant 34b, in the chamber, occupying 50 volume % of the chamber. In a third case, the chamber was filled with Er$_3$Ni. As apparent from FIG. 62, higher refrigerating capacities (W) could be obtained in the first and second cases than in the third case.

Figure 63:
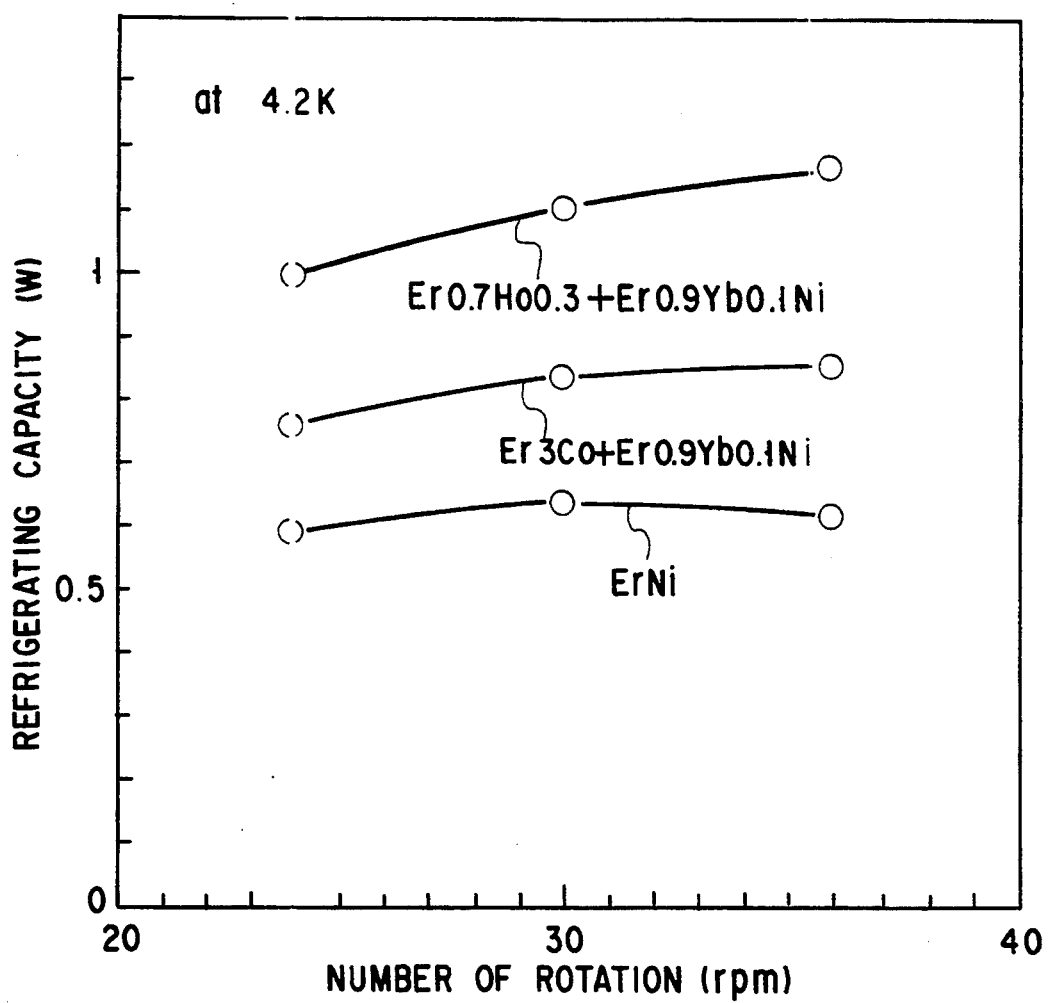
FIG. 63 is a graph showing the relation between kinds and refrigerating capacities of refrigerants filled in the final refrigerating force storage chamber.

FIG. 63 shows the correlation of motor rotation number (or displacer reciprocation) and refrigerating capacity, plotting rotation numbers of the motor 23 (or reciprocations of the displacer 29) on the horizontal axis and refrigerating capacities (W) on the vertical axis. The refrigerating capacity capable of keeping the temperature at the first cooling stage at 4.2 K. was checked, using temperatures at the first cooling stage as a parameter.

In a first case, Er$_{0.7}$Ho$_{0.3}$Ni was filled, as the first refrigerant 34$a$, in the chamber, occupying 50 volume % of the chamber, and Er$_{0.9}$Yb$_{0.1}$Ni was filled, as the second refrigerant 34$b$, in the chamber, occupying 50 volume % of the chamber. In a second case, Er$_3$Co was filled, as the first refrigerant 34$a$, in the chamber, occupying 50 volume % of the chamber, and Er$_{0.9}$Yb$_{0.1}$Ni was filled, as the second refrigerant 34$b$, in the chamber, occupying 50 volume % of the chamber. In a third case, the chamber was filled with Er$_3$Ni. As apparent from FIG. 63, far higher refrigerating capacities (W) could be obtained in the first and second cases than in the third case.

It should be understood that the present invention is not limited to the above-described embodiments. Although the final refrigerating force storage chamber has been divided into high and low temperature areas in the above-described embodiments, it may be divided into three or more areas from the highest to the lowest temperature side thereof and each of these areas may be filled with such a composition that has specific heat characteristic suitable for the temperature in each of the areas.

A seal assembly 35 is interposed between the outer circumference of the first displacer section 28 and the inner circumference of the first cylinder section 24. Another seal assembly 36 is also interposed between the outer circumference of the second displacer section 29 and the inner circumference of the second cylinder section 25.

The top of the first displacer section 28, when viewed in FIG. 2, is connected to the rotating shaft of the motor 23 through the connecting rod 41 and the Scotch yoke or crank shaft 42. When the motor 23 is rotated, therefore, the displacer 22 is reciprocated in directions shown by arrows 43, synchronizing with the rotation of the motor 23.

Coolant gas inlet and outlet 44 and 45 are projected from the upper side of the first cylinder section 24 and they are connected to the coolant gas lead system 3.

The coolant gas lead system 3 forms a helium gas circulation system passing through the cylinder 21. Its portion which extends from the outlet 45 to the inlet 44 includes a low pressure valve 46, a compressor 47 and a high pressure valve 48 in this order. In short, it serves to compress low pressure helium gas (about 5 atm) to high pressure one (about 18 atm) by the compressor 47 and lead it into the cylinder 21. The low and high pressure valves 46 and 48 are opened and closed, as will be described later, relating to the reciprocation of the displacer 22.

It will be described how the above-described refrigerator operates.

Those sections of the refrigerator which serve as cooling areas or faces are the first and second cooling stages 26 and 27.

When the mnotor 23 starts its rotation, the displacer 22 reciprocates between its bottom dead center (point) and its top dead center (point). When it is at its dead center, the high pressure valve 48 is opened to allow high pressure helium gas to flow into the cold head 2. It then moves to its top dead center.

As described above, the seal assembly 35 and 36 are interposed between the outer circumference of the first displacer section 28 and the inner circumference of the first cylinder section 24 and between the outer circumference of the second displacer section 29 and the inner circumference of the second cylinder section 25. When the displacer 22 moves to its top dead center, therefore, the high pressure helium gas is forced to flow from the space 43 into a second expansion chamber 51, passing through the liquid chamber 31, the first expansion chamber 49 and the passage 50. As it flows like this, the high pressure helium gas is cooled by the refrigerants 32 and 34. As the result, it is cooled down to a level of 30 K. when it flows into the first expansion chamber 49 and it is cooled down to a level of 4 K. when it flows into the second expansion chamber 51.

The high pressure valve is closed this time while the low pressure valve 46 is opened. When the low pressure valve 46 is opened, the high pressure helium gas in the first and second expansion chambers 49 and 51 is expanded and further cooled to accept heat through the first and second cooling stages 26 and 27. When the displacer 22 again moves to its bottom dead center, the helium gas is discharged from the first and second expansion chambers 49 and 51. The expanded helium gas cools the refrigerants 32, 34$a$ and 34$b$ while passing through the liquid chambers 31 and 33, and it is finally heated to normal temperature and discharged into the coolant gas lead system 3 through the outlet 45. This compression/expansion cycle of helium gas is then repeated to keep the liquid helium 11 in the inner container 12 at 4.2 K.

In the case of this first embodiment, the upper space of the liquid chamber 33 in the second displacer section 29 is filled with the magnetic refrigerant 34$a$ of Er$_3$Ni while the lower space thereof with the magnetic refrigerant 34$b$ of ErNi compound.

FIG. 4 is a graph showing specific heat characteristics of various magnetic refrigerants, in which temperatures are plotted on the horizontal axis and specific heat capacity at volume on the vertical axis. Solid lines in FIG. 4 denote results obtained of Er$_3$Ni, HoNi and GdNi, a broken line results obtained of ErNi, a dot and dash line results obtained of Er$_{0.9}$Yb$_{0.1}$Ni and two-dot and dash line results obtained of Pb which is shown as a comparison example.

Figure 4A:
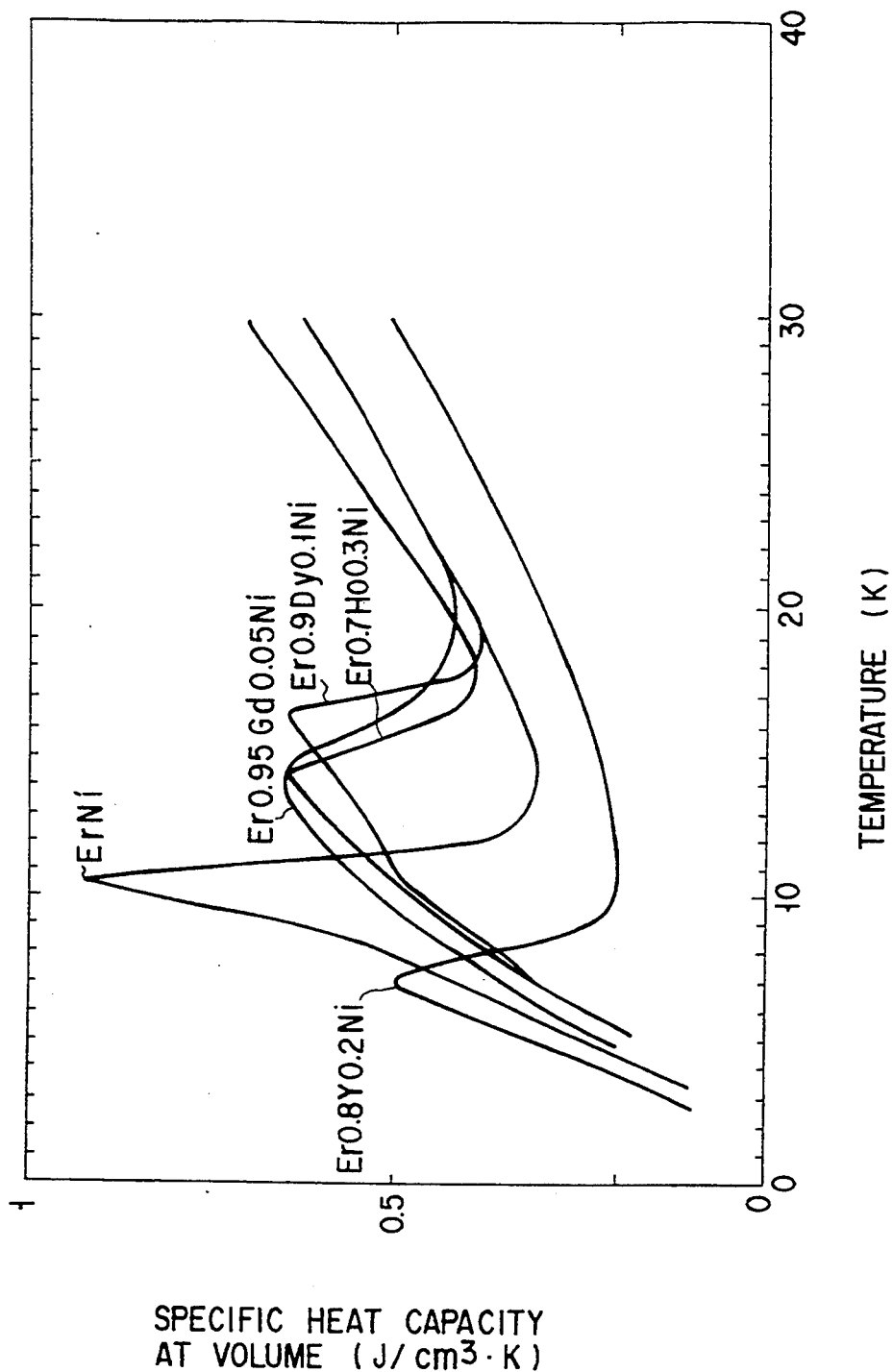
FIGS. 4A, 4B and to 4C are graphs showing specific heat characteristics of various magnetic refrigerants and Pb, respectively.
Figure 4C:
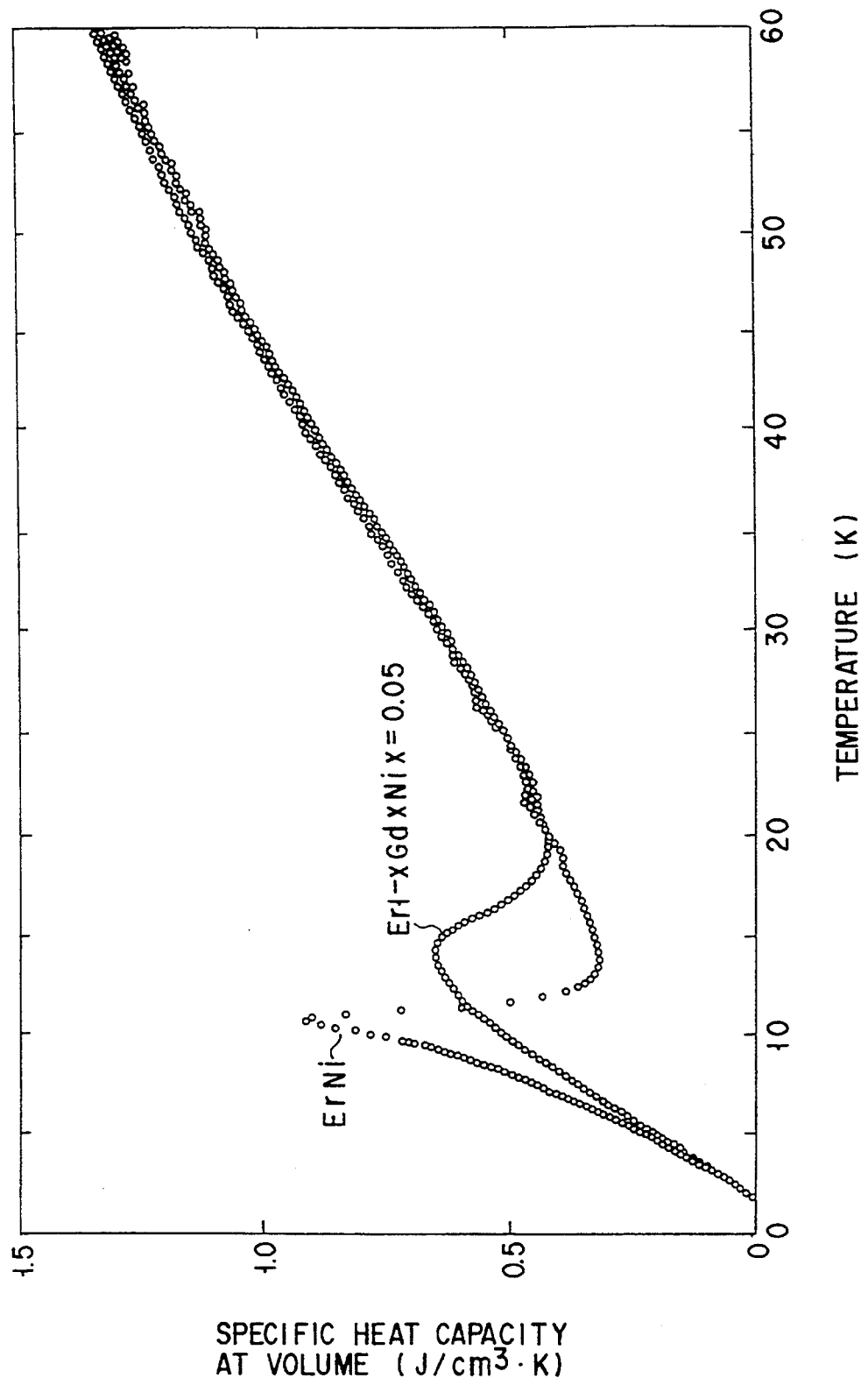

As apparent from FIGS. 4A to 4C, the specific heat capacity of ErNi is larger than that of Er$_{0.95}$Gd$_{0.05}$Ni, Er$_{0.9}$Dy$_{0.1}$Ni, Er$_{0.7}$Ho$_{0.3}$Ni and Er$_{0.8}$Y$_{0.2}$Ni at a temperature range lower than 12 k. when the temperature range becomes higher than 12 K., the specific heat capacity of Er$_{0.95}$Gd$_{0.05}$Ni, Er$_{0.9}$DyNi, Er$_{0.7}$Ho$_{0.3}$Ni becomes larger than that of ErNi.

The liquid chamber 33 has a temperature gradient. When the refrigerant 34$a$ or Er$_3$Ni is filled in the liquid chamber 33 on the high temperature side thereof and the refrigerant 34$b$ or ErNi in it on its low temperature side, therefore, the specific heat characteristic of each of the refrigerants can be most effectively used to enhance its cooling efficiency at around 4.2 K.

Figure 5:
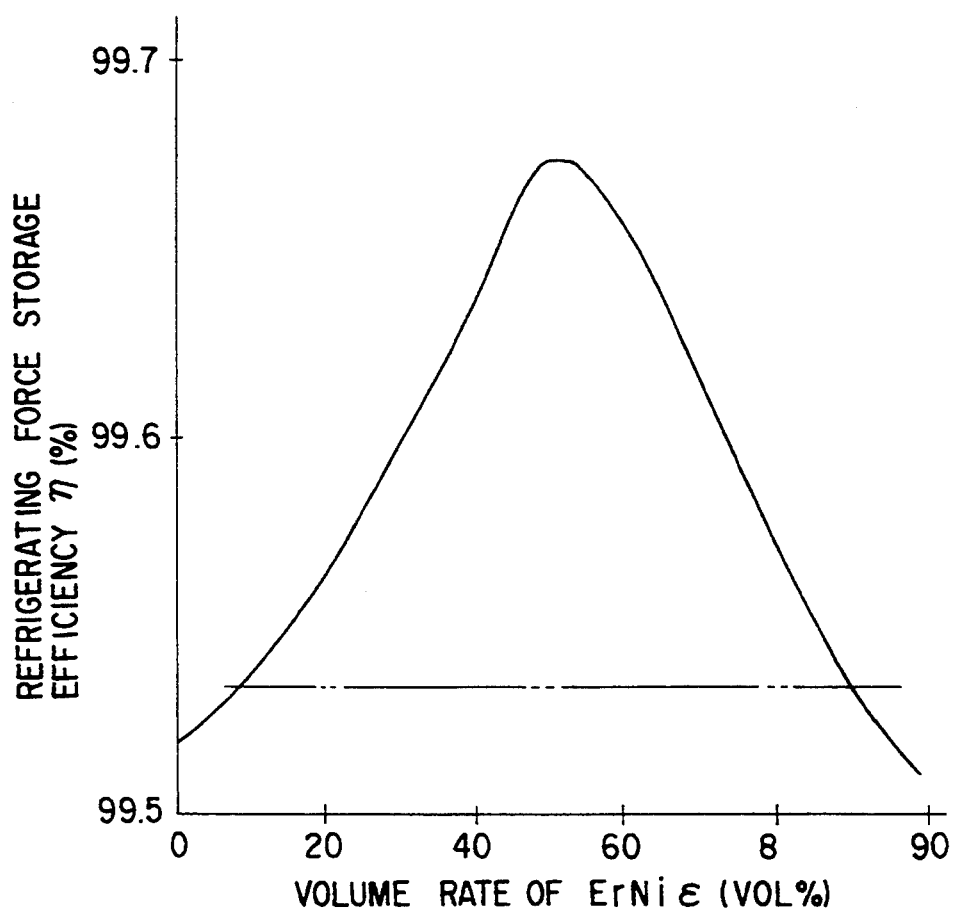
FIG. 5 is a graph showing the relation between the volume rate $\epsilon$ of the magnetic refrigerant ErNi relative to all of refrigerants filled in the chamber on the low temperature side thereof, and refrigerating force storage efficiency.

FIG. 5 is a graph showing results theoretically calculated of the relation between volume ratios of ErNi relative to the total volume of refrigerants filled and cooling efficiencies of ErNi at these volume ratios, in which the volume ratios are plotted on the horizontal axis and the cooling efficiencies on the vertical axis. The upper limit temperature of the refrigerants used for the calculation is 32 K. and the lower limit temperature thereof 4 K. As apparent from FIG. 5, a cooling efficiency higher than in the case only Er$_3$Ni is filled can be achieved when the volume ratio of ErNi is in a range of 10–90. This is because the specific heat of ErNi is larger than that of Er$_3$Ni at the temperature range lower than 12 K.

FIG. 6 is a graph showing the relation between temperatures and cooling capacities, in which temperatures are plotted on the horizontal axis and cooling capacities on the vertical axis. A curve A in FIG. 6 represents cooling capacities obtained when the volume ratio of ErNi is 50% and a curve B those obtained when only Er$_3$Ni is filled. As apparent from FIG. 6, the lowest temperature obtained can be made lower in the case of curve A than in the case of curve B. The cooling or refrigerating capacity of the refrigerator can be thus further enhanced at the temperature level of 4.2 K.

Although ErNi has been used as the magnetic refrigerant having the composition expressed by the formula (1) in the above-described embodiment, HoNi, Er$_{0.9}$Yb$_{0.1}$Ni, or GdNi may be used instead.

Second Embodiment

FIG. 7 shows the main portion of the cryogenic refrigerator of the refrigerant-filled type according to a second embodiment of the present invention. Same components as those in the first embodiment will be represented by same reference numerals and description on these components will be omitted.

The displacer 22 is housed in the cylinder sections 24 and 25 at the cold head 2 of the Gifford-McMahon type refrigerator. The displacer 22 comprises first and second displacer sections 28 and 29 connected to each other by the coupler member 30.

The liquid chamber 31 is formed in the first displacer section 28 and it contains therein a copper refrigerant 32a, which is made of like meshes formed by knitting fine copper wires.

The fluid chamber 33 is formed in the second displacer section 29 and it contains lead refrigerant 34c and magnetic refrigerant 34d therein. The lead and magnetic refrigerants 34c and 34d are divided by the partition 38 not to be mixed with each other. The lead refrigerant 34c is housed in the upper space of the fluid chamber 33 while the magnetic refrigerant 34d in the lower space thereof.

The lead refrigerant 34c is a gathering of many lead balls. The magnetic refrigerant 34d is also a gathering of many balls of Er$_3$Ni. The volume of the magnetic refrigerant 34d occupies 30–40% in the sum of volumes of the lead and magnetic refrigerants 34c and 34d in this case.

FIG. 8 shows the main portion of a variation of the refrigerator.

Copper refrigerant 32a and lead refrigerant 32b are housed in the chamber 31 in the first displacer section 28. The copper refrigerant 32a is made of like meshes formed by knitting fine copper wires, and these meshes are housed in the upper space of the chamber 31. The lead refrigerant 32b is made of like meshes formed by knitting fine lead wires, and these meshes are housed in the lower space of the chamber 31. The volume of the lead refrigerant 32b occupies 50% in the sum of volumes of the copper and lead refrigerants 32a and 32b in this case.

The chamber 33 in the second displacer section 29 is filled with the magnetic refrigerant 34d, which is gathering of many balls of Er$_3$Ni compound.

The coolant gas inlet and outlet 44 and 45 are projected from the upper side of the first cylinder section 24. These inlet and outlet 44 and 45 are communicated with the coolant gas lead system 3. The coolant gas lead system 3 forms a helium gas circulation line, passing through the cylinder 21. The helium gas circulation line extending from the outlet 45 to the inlet 44 includes the low pressure valve 46, the compressor 47 and the high pressure valve 48 in this order.

The coolant gas lead system 3 serves to compress helium gas from low in pressure (about 5 atm) to high in pressure (about 18 atm) by the compressor 47 and send it into the cylinder 21. The low and high pressure valves 46 and 48 are opened and closed, as will be described later, relating to the reciprocation of the displacer 22.

It will be described how the above-described refrigerator operates.

Those sections of this second refrigerator which function as cooling faces are first and second cooling stages 26 and 27.

When the motor 23 is driven, the displacer 22 reciprocates between its upper and its lower dead centers (points). When the displacer 22 is at its lower dead center, the high pressure valve 48 is opened to allow high pressure helium gas to flow into the cold head 2. The displacer 22 then moves to its upper dead center.

When the displacer 22 moves to its upper dead center, the high pressure helium gas is forced into the first expansion chamber 49, passing through the chamber 31, and it is expanded in the first expansion chamber 49. It is further forced into the second expansion chamber 51, passing through the passage 50 of the second cooling stage 27 and the refrigerant-filled chamber 33, and it is expanded in the second expansion chamber 51. As it flows in this manner, the high pressure helium gas is cooled down by the refrigerants 32a, 32b, 34c and 34d. It is therefore cooled to a temperature level of 30 K. when it flows into the first expansion chamber 49 and it is cooled down to a temperature level of 8 K. when it flows into the second expansion chamber 51.

The high pressure valve 48 is closed while the low pressure valve 46 is opened. When the low pressure valve 46 is opened, the high pressure helium gas in the first and second expansion chambers 49 and 51 is expanded. The first cooling stage 26 is thus further cooled and the second cooling stage 27 is also cooled down to a temperature level of 4 K.

When the displacer 22 again moves to its lower dead center, the helium gas in the first and second expansion chambers 49 and 51 is forced to pass through the chambers 31 and 33. The helium gas cools the refrigerants 32a, 32b, 34c and 34d while passing through the chambers 31 and 33. It is thus heated to normal temperature and then discharged into the coolant gas lead system 3. this compression/expansion cycle of helium gas will be thereafter repeated.

Figure 9:
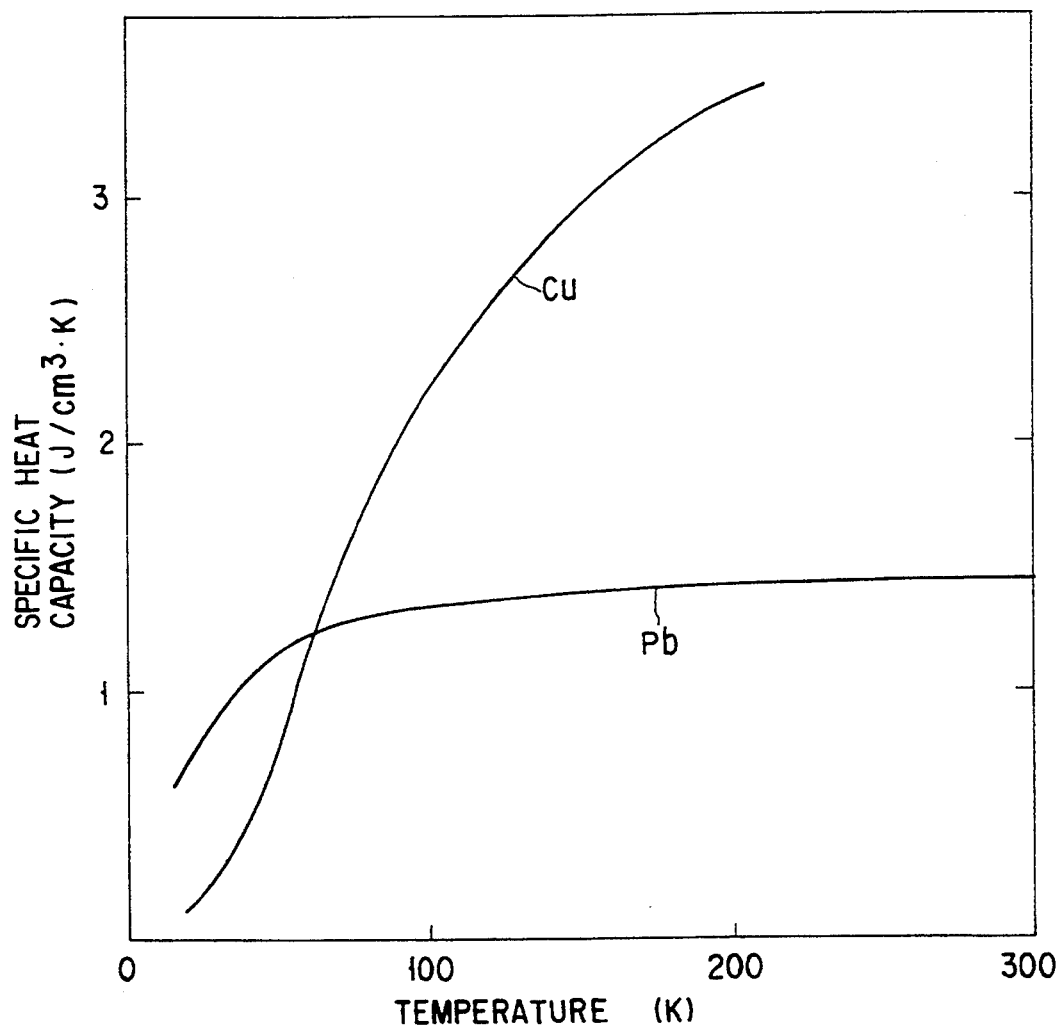
FIG. 9 is a graph showing specific heat characteristics of Cu and Pb.

FIG. 9 is a graph showing specific heat characteristics of copper and lead. As apparent from FIG. 9, the specific heat capacity of lead is larger than that of copper at a temperature range lower than 60 K. However, the specific heat capacity of copper becomes larger than that of lead at a temperature range higher than 60 K.

The chamber 33 has a temperature gradient. When the lead refrigerant 34c is filled in the chamber 33 on the high temperature side thereof and the magnetic one 34d in the chamber 33 on the low temperature side thereof as seen in the second embodiment, therefore, the specific heat characteristic of each of the refrigerants can be used to the most effective extent.

The chamber 31 also has a temperature gradient. When the copper refrigerant 32a is filled in the chamber 31 on the high temperature side thereof and the lead one 32b in the chamber 31 on the low temperature side thereof as seen in the variation of the second embodiment therefore, the specific heat characteristic of each of the refrigerants can be most effectively used.

The temperature of the first cooling stage 26 can be thus lowered to thereby enhance its refrigerating efficiency at the temperature level of 4.2 K.

FIG. 10A is a graph showing results experimentally obtained of the relation between the volume ratio $\epsilon$ of the lead refrigerant filled in the chamber on the low temperature side thereof relative to the total sum of volumes of the refrigerants filled and temperatures obtained at the final stage, in which the volume ratios of the lead refrigerant are plotted on the horizontal axis and temperatures obtained on the vertical axis. The high limit temperature of the refrigerants-filled chamber is 300 K.

As apparent from FIG. 10A, temperatures obtained become lower than in the case only copper is filled ($\epsilon=0$) when the volume ratio $\epsilon$ of lead is in a range of 40–80%, and the temperatures obtained 4 K. or less in the range. This is because the specific heat of lead becomes larger than that of copper at low temperature range.

Figure 11:
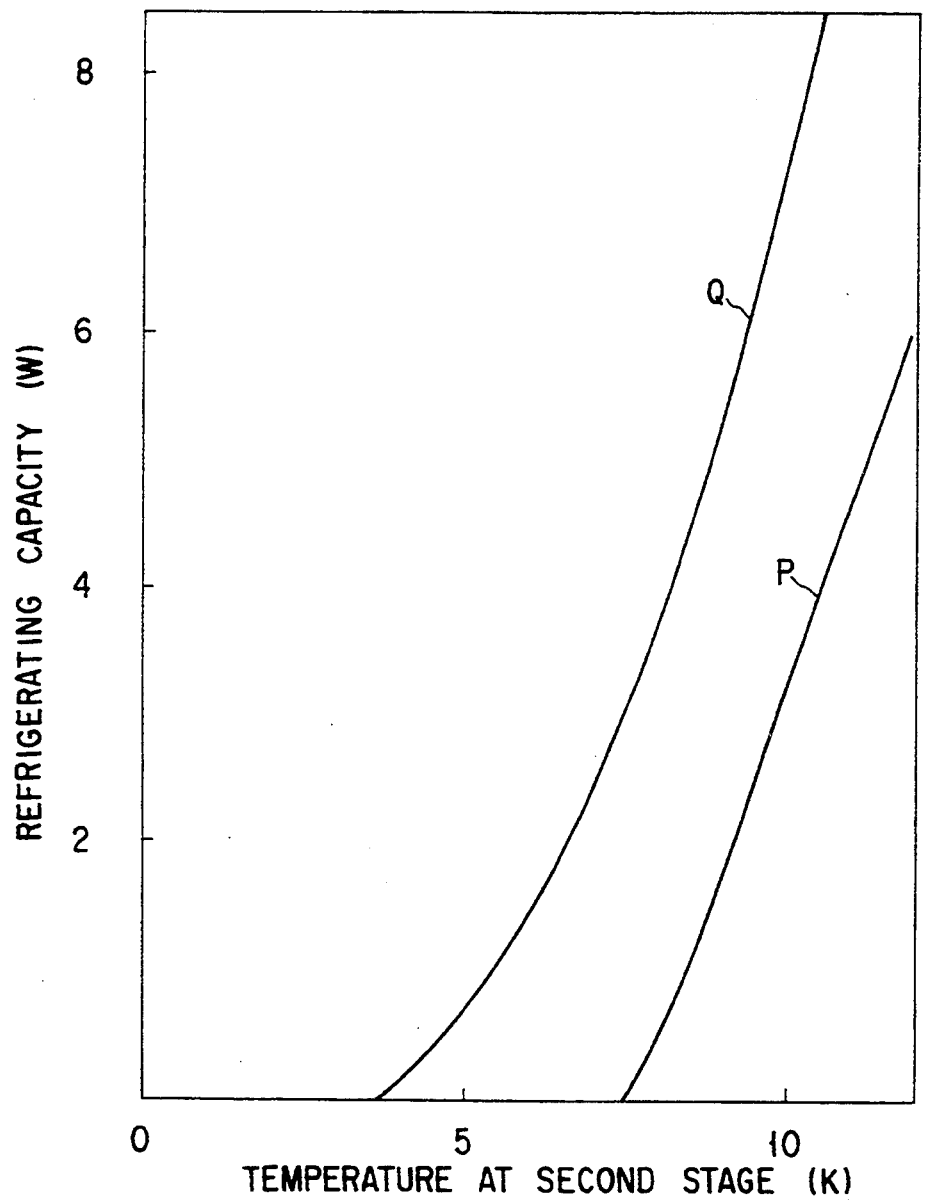
FIG. 11 is a graph showing the relation between temperature and refrigerating capacity at the second cooling stage so as to compare the second embodiment with its variation.

FIG. 11 is a graph showing results obtained of the relation between temperatures and refrigerating capacities of the second cooling stage in both cases of the second embodiment and its variation, in which temperatures are plotted on the horizontal axis and refrigerating capacities on the vertical axis. A curve P in FIG. 11 represents results obtained by the refrigerator (or second embodiment) in which the Cu refrigerant is filled in the chamber at the first cooling stage and the Pb and magnetic refrigerants are filled in the chamber at the second cooling stage. Another curve Q denotes results obtained by the refrigerator (or variation of the second embodiment) in which the Cu and Pb refrigerants are filled in the chamber at the first cooling stage and the magnetic refrigerant is filled in the chamber at the second cooling stage.

As apparent from FIG. 11, the refrigerator (or variation of the second embodiment) in which the Cu and Pb refrigerants are filled in the chamber at the first cooling stage is more excellent in refrigerating capacity at the temperature level of 4.2 K., as compared with the one (or second embodiment) in which only the copper refrigerant is used at the first cooling stage.

The present invention is not limited to the refrigerator of the Gifford-McMahon type, but it can be applied to those of the Stirling, improved Solvay cycle GM and Vuilleumier types. In addition, the refrigerants may be shaped like balls, grains, meshes and others.

According to the present invention, the refrigerating capacity of the refrigerator can be enhanced at the temperature level of about 4.2 K. which is particularly useful for industries.

Third Embodiment

Figure 12:
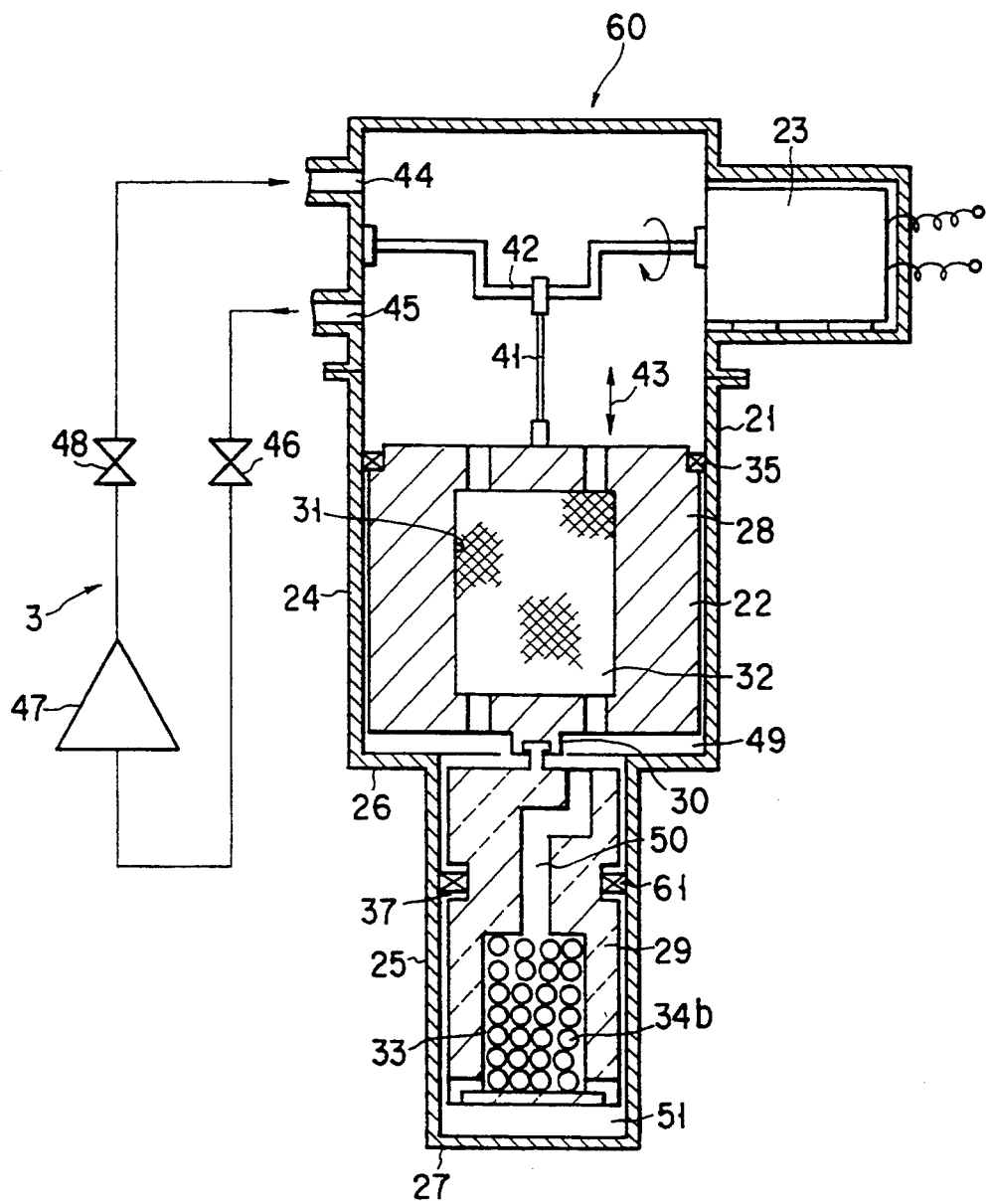
FIG. 12 is a sectional view schematically showing the Gifford-McMahon type refrigerator according to a third embodiment of the present invention.

FIG. 12 is a sectional view schematically showing the cryogenic refrigerator according to a third embodiment of the present invention. The seal means at the second cooling stage is improved in this third refrigerator of the Gifford-McMahon type.

This third refrigerator generally comprises a cold head 60 and the coolant gas lead system 3. The cold head 60 includes the closed cylinder 21, the piston or displacer 22 freely reciprocated in the cylinder 21, and the motor 23 for reciprocating the displacer 22 in the cylinder 21.

The cylinder 21 comprises the first large cylinder section 24 and the second small cylinder section 25 coaxially connected to the first cylinder section 24. The boundary portion of the first cylinder section 24 with the second cylinder section 25 functions as the first cooling stage 26 and the bottom wall portion of the second cylinder section 25 functions as the second cooling stage 27 which is lower in temperature than the first cooling stage 26.

The first and second cylinder sections 24 and 25 are made of material selected from the stainless steel group. Those inner face areas of the first and second cylinder sections 24 and 25 which are contacted with seal rings of seal assemblies 35 and 61, which will be described later, are ionitriding-treated and finished to have a profile irregularity less than 3.2 $\mu$m.

The displacer 22 comprises the first displacer section 28 reciprocated in the first cylinder section 24 and the second displacer section 29 reciprocated in the second cylinder section 25. The first and second displacer sections 28 and 29 are made of a material which is formed by adding polyimide resin to ethylene tetrafluoride.

The first and second displacer sections 28 and 29 are connected to each other in series by the coupling assembly 30. The liquid chamber 31 is formed in the first displacer section 28, extending in the axial direction of the section 28. The mesh-shaped copper refrigerant 32 is housed in the liquid chamber 31. Similarly, the liquid chamber 33 is formed in the second displacer section 29, extending in the axial direction of the section 29. The refrigerant 34 comprising ball-shaped lead and/or ErNi is housed in the liquid chamber 33.

The first seal assembly 35 is interposed between the outer circumference of the first displacer section 28 and the inner circumference of the first cylinder section 24. In addition, the second seal assembly 61 is interposed between the outer circumference of the second displacer section 29 and the inner circumference of the second cylinder section 25.

The second seal assembly 61 will be described with reference to FIGS. 13 through 16.

The seal assembly 61 is arranged in an annular groove 37 on the outer circumference of the second displacer section 29. The seal assembly 61 comprises a pair of other seal rings 62, 63, an inner seal ring 64 and a coil spring ring 65.

The paired outer seal rings 62 and 63 are same in diameter and width and put coaxially one upon the other. The outer circumference of each of the outer seal rings 62 and 63 is contacted with the inner circumference of the cylinder section 25.

The inner seal ring 64 has a height the same as or larger than the sum of heights of the outer seal rings 62 and 63. It is located inside the outer seal rings.

The coil spring ring 65 is located inside the inner seal ring 64 and it is contacted with the bottom of the annular groove 37 at the bottom side thereof.

The outer seal rings 62 and 63 are made of the material which is formed by adding polyimide resin to ethylene tetrafluoride. The inner seal ring 64 is made of polychlorotrifluoroethylene having an coefficient of thermal expansion (contraction) substantially the same as that of phenol resin of which the first and second displacer sections 28 and 29 are made.

The outer and inner seal rings 62, 63 and 64 are finished to have a profile irregularity less than 30 μm at their inner and outer circumferences and at their end faces in their axial direction. The other seal rings 62 and 63 are formed the same in thickness (or height) in their axial direction and also the same in thickness (or width) in their radial direction.

The inner seal ring 64 has a height equal to the sum of heights of the outer seal rings 62 and 63. The height of the inner seal ring 64 is set to have a dimension accuracy of 50 μm, under normal temperature, relative to the width of the annular groove 37 in the axial direction thereof.

Figure 15:
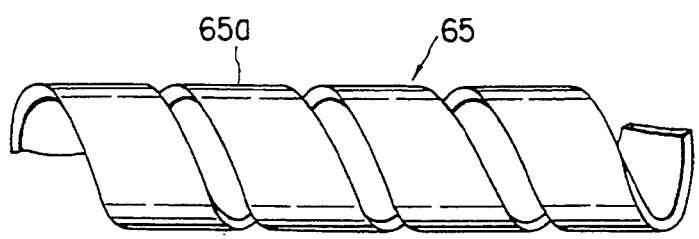
FIG. 15 partly shows a strip coil spring of the seal means.

As shown in FIG. 15, the coil spring ring 65 is formed by spiraling a stainless steel strip 65a. This strip coil spring ring 65 pushes the outer seal rings 62 and 63 against the cylinder 25 through the inner seal ring 64 with a force of 5–60 kgf/cm$^2$.

Figure 13:
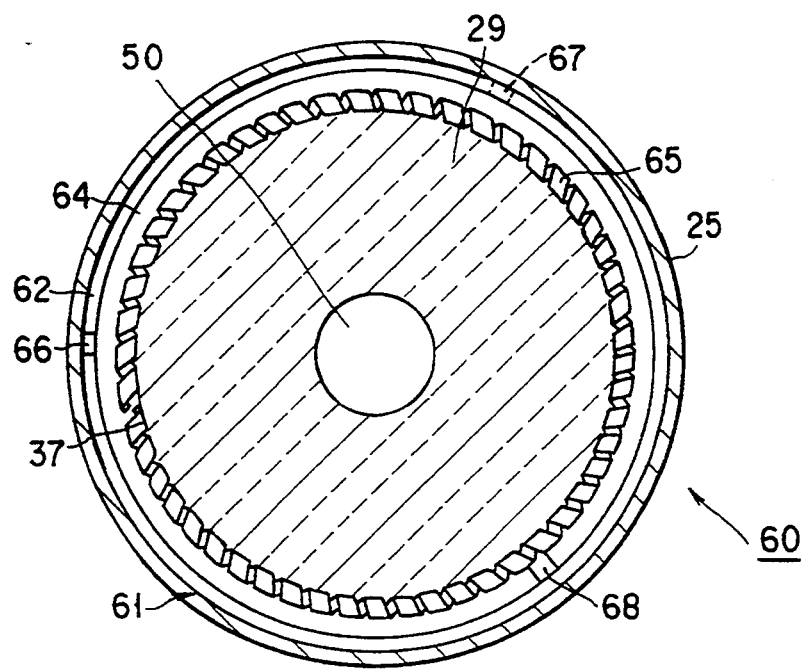
FIG. 13 is a horizontally sectioned view showing a final cooling stage in the third refrigerator.
Figure 16:
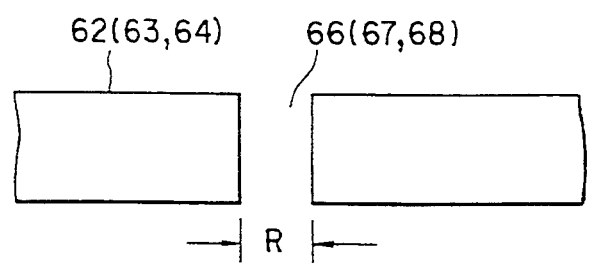
FIG. 16 is a side view showing both ends of each seal ring.

As shown in FIG. 16, each of the outer and inner seal rings 62, 63 and 64 has between its both ends an cut interval 66, 67 or 68 which is denoted by a distance R and cut these intervals 66, 67 and 68 are located relative to one another at an angle of about 120°, as shown in FIG. 13.

The top of the first displacer section 28 is connected to the rotating shaft of the motor 23 through the connecting rod 41 and the Scotch yoke or crank shaft 42, as shown in FIG. 12. When the shaft of the motor 23 is rotated, therefore, the displacer 22 is reciprocated in directions shown by arrows 43, synchronizing with the rotating of the motor.

The coolant gas inlet and outlet 44 and 45 are projected from the upper side of the first cylinder section 24 and they are connected to the coolant gas lead system 3. This coolant gas lead system 3 forms a helium gas circulation system, passing through the cylinder 21. The outlet 45 is communicated with the inlet 44 via the low pressure valve 48. The compressor 47 and the high pressure valve 48. The coolant gas lead system 3, therefore, serves to compress helium gas from low in pressure (about 5 atm) to high in pressure (about 18 atm) by the compressor 47 and lead it into the cylinder 21. The low and high pressure valves 46 and 48 are opened and closed, as will be described later, relating to the reciprocation of the displacer 22 in the cylinder 21.

It will be described how the above-described refrigerator operates.

Those areas of this refrigerator which serve as cooling faces are first and second cooling stages 26 and 27. When no heat is loaded, they are cooled to 30 K. and 8 K., respectively. A temperature gradient ranging from normal temperature (300 K.) to 30 K. is therefore caused between the top and the bottom of the first displacer section 28. A temperature gradient ranging from 30 K. to 8 K. is also caused between the top and the bottom of the second displacer section 29. However, the temperature changes depending upon the heat load added to each of the cooling stages and it is in a range of 30–80 K. at the first cooling stage 26 and it is in a range of 8–20 K. at the second cooling stage 27.

When the motor 23 starts its rotation, the displacer 22 is reciprocated between its upper and its lower dead center. When it is at the lower dead center, the high pressure valve 48 is opened to allow the high pressure helium gas to flow into the cold head 60.

The displacer 22 then moves to the upper dead center. As described above, the seal assemblies 35 and 61 are interposed between the cylinder section 24 and the displacer section 28 and between the cylinder section 25 and the displacer section 29. When the displacer 22 moves to the upper dead center, therefore, the high pressure helium gas is forced into the first expansion chamber 49 through the first refrigerant-filled chamber 31 and it is expanded in the first expansion chamber 49. It is then forced into the second expansion chamber 51, passing through the passage 50 and the second refrigerant-filled chamber 33, and it is expanded in the second expansion chamber 51.

As it flows in this manner, the high pressure helium gas is cooled by the refrigerants 32 and 34b. As the result, the high pressure helium gas is cooled down to about 30 K. when it flows into the first expansion chamber 49 and cooled down to about 8 K. when it flows into the second expansion chamber 51.

The high pressure valve 48 is closed this time while the low pressure one 46 is opened. When the low pressure valve 46 is opened, the high pressure helium gas in the first and second expansion chambers 49 and 51 is expanded and cooled to accept heat through the first and second cooling stages 26 and 27.

When the displacer 22 moves again to the lower dead center, the helium gas in the first and second expansion chambers 49 and 51 is thus forced into the chambers 33 and 31. While passing through the refrigerant-filled chambers 33 and 31, the expanded helium gas cools the refrigerants 32 and 34b in them. It is therefore heated to normal temperature and then discharged into the coolant gas lead system 3. This compression/expansion cycle will be thereafter repeated to carry out refrigerating operation.

In the case of this refrigerator, the lowest temperature obtained and refrigerating efficiency achieved depend greatly upon capacities of the first and second seal assemblies 35, 61. It is assumed, for example, that temperature in the first expansion chamber 49 is 30 K. and that temperature in the second expansion chamber 51 is 10 K. When leakage is caused at the second seal assembly (or seal assembly 61 in this case), helium gas of 30 K. is allowed to flow into the second expansion chamber 51 without contacting the refrigerant 34b in the second displacer section 29. In addition, helium gas of 10 K. is allowed to flow into the first expansion chamber 49. As the result, the temperature of the first cooling stage 26 will be lowered while that of the second cooling stage 27 will be raised.

Figure 17:
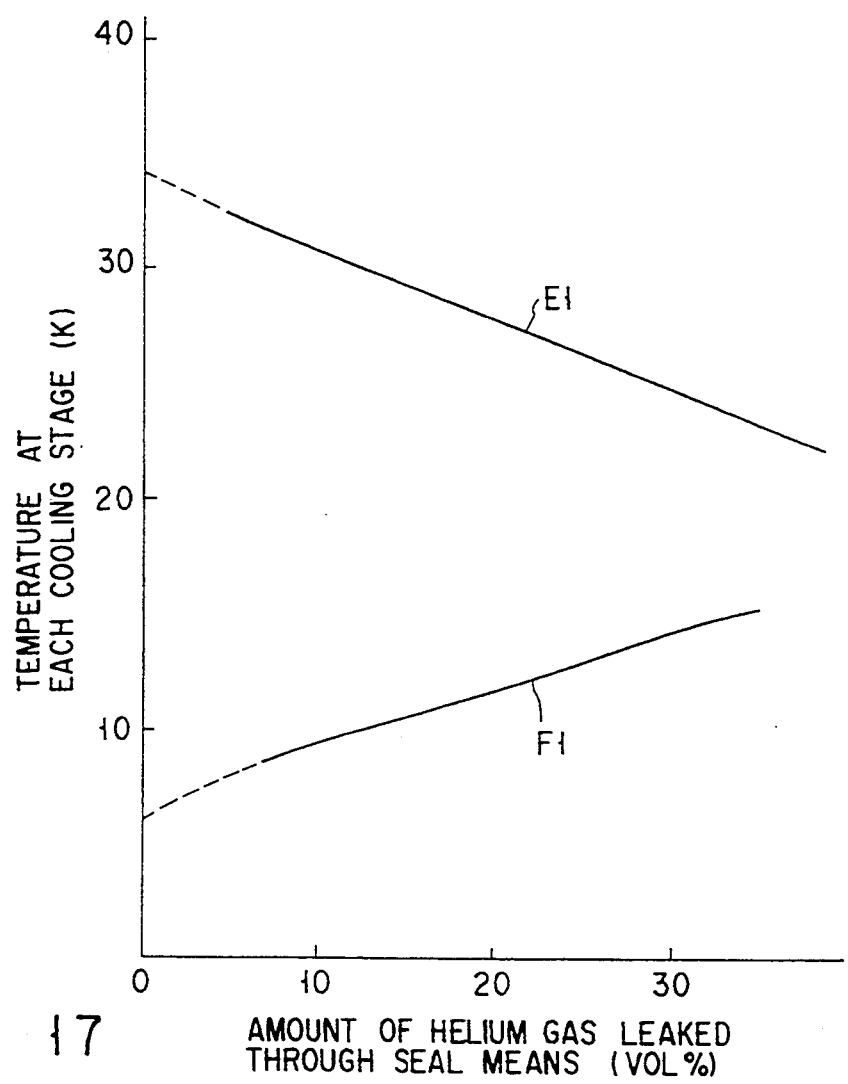
FIG. 17 is a graph showing curves theoretically calculated of temperature changes at each cooling stage, said temperature changes being caused when gas is leaked through the seal assembly.

FIG. 17 is a graph showing results theoretically calculated of the relation between ratios of amount of gas leaked through the second seal assembly 61 (or ratios of amount of helium gas leaked through the second seal means relative to the total amount of helium gas flowing into the second expansion chamber 51) and temperatures obtained at the cooling stages, in which ratios of amount of gas leaked are plotted on the horizontal axis and temperatures on the vertical axis. A curve $E_1$ in FIG. 17 represents change in the amount of gas leaked at the first cooling stage and a curve $F_1$ change in the amount of gas leaked at the second cooling stage.

As apparent from FIG. 17, temperatures at the cooling stages are greatly influenced by the amount of gas leaked through the second seal assembly 61. Same thing can also be said when gas is leaked through the first seal assembly (or seal assembly 35 in this case).

When the seal assemblies 35 and 61 arranged as described above are used, however, the amount of gas leaked can be reduced to a greater extent.

The seal assembly 61 includes three seal rings 62, 63 and 64. The intervals between both ends of the seal rings are therefore totaled to three (66, 67 and 68). When these intervals 66, 67 and 68 are shifted from one another in the circumferential direction of the displacer, however, the seal rings are made not to have any interval as if one seal ring were pushed against the inner circumference of the cylinder. In other words, the paired outer seal rings 62 and 63 can be uniformly pressed against the inner circumference of the cylinder 25 with a force larger than 5 kg/cm² added by the coil spring ring 65.

The inner seal ring 64 in the third embodiment is made of polychlorotrifluoroethylene having a thermal shrinkage coefficient substantially equal to that of phenol resin of which the displacer section 29 is made. In addition, the thickness of the inner seal ring 64 when viewed in the axial direction of the displacer is set to have a dimension accuracy of 50 μm, under normal temperature, relative to the width of the ring-shaped groove 37 when viewed in the axial direction of the displacer. Those intervals of the inner seal ring 64 which are formed relative to top and bottom of the ring-shaped ring 37 when viewed in the axial direction of the displacer can be therefore kept sufficiently small even under a cryogenic temperature of 8 K. to thereby reduce the amount of gas leaked to a greater extent.

FIG. 18 is a graph showing how coefficients of thermal expansion (contraction) of phenol resin and other resins change with temperature, in which temperatures are plotted on the horizontal axis and coefficients of thermal expansion on the vertical axis. A curve M1 in FIG. 18 denotes results obtained of polyethylene, a curve M2 those obtained of ethylene tetrafluoride, a curve M3 those obtained of polystyrene, a curve M4 those obtained of nylon, a curve M5 those obtained of poly-methyl methacrylate. a curve M6 those obtained of polychlorotrifluoroethylene, a curve M7 those obtained of phenol resin, a curve M8 those obtained of stainless steel and a curve M9 those obtained of titanium.

When the coefficient of thermal expansion of phenol resin is regarded as being 1 at a temperature of 25 K., that of ethylene tetrafluoride is 2.8 times, and that of polychlorotrifluoroethylene 1.4 times. When the displacer section 29 is made of phenol resin and the inner seal ring 64 of polychlorotrifluoroethylene as seen in this third embodiment, therefore, those intervals or clearances of the inner seal ring 64 which must be formed relative to the groove 37 on the inner circumference of the displacer section 29 can be reduced to a greater extent of about 1/5, as compared with the conventional case where the displacer section 29 is made of phenol resin and the inner seal ring 64 of tetrafluoroethylene. As the result, the amount of gas leaked through the seal assemblies 35 and 61 can be reduced to a greater extent.

Figure 19:
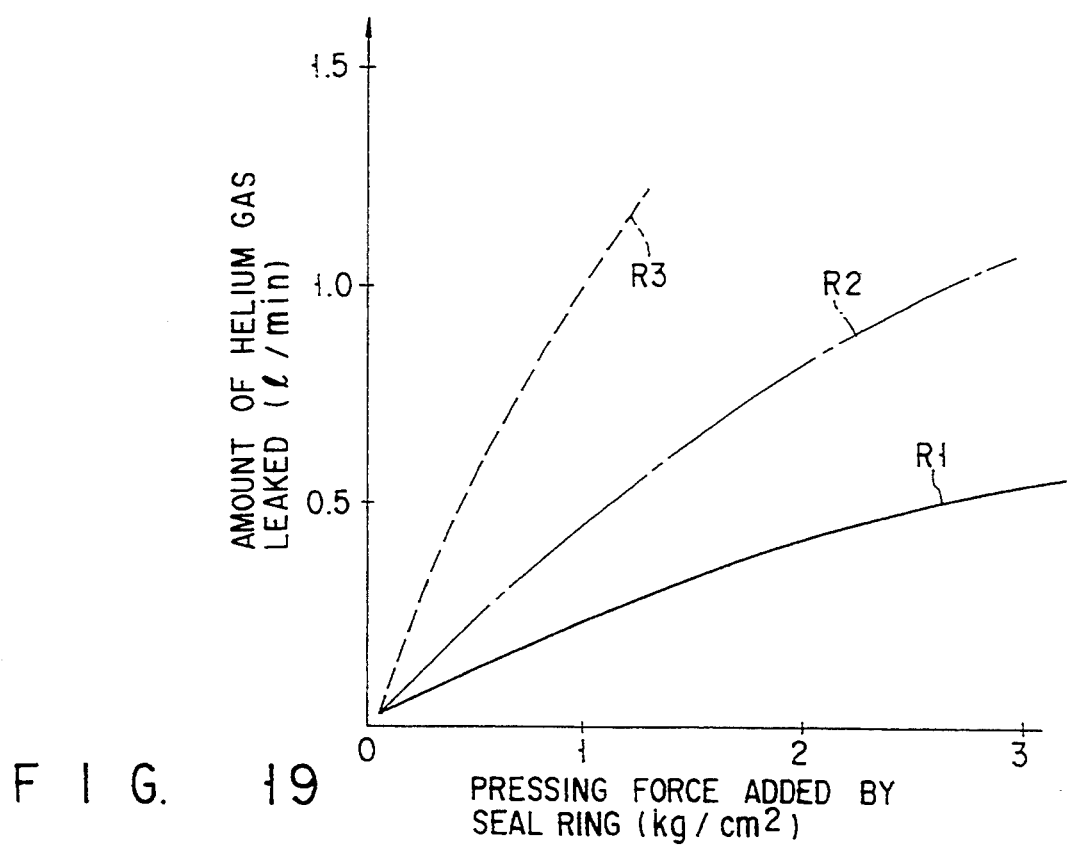
FIG. 19 is a graph showing the relation between pressing force added and the amount of helium gas leaked when various kinds of seal ring are used.

FIG. 19 is a graph showing results obtained of the relation between the pressing force of the seal rings and the amount of helium gas leaked when various spring rings are used, in which the pressing forces are plotted on the horizontal axis and the amounts of helium gas leaked on the vertical axis. A curve $R_1$ in FIG. 19 represents results obtained when the strip coil spring ring 65 is used as seen in the third embodiment, a curve $R_2$ those obtained when a wire coil spring ring is used (as a comparison case) and a curve $R_3$ those obtained when the plate spring ring is used (as the conventional case). Conditions such as profile irregularities of the seal rings, their states arranged, and profile irregularities of the cylinders were made the same in these three cases. In addition, results were obtained under normal temperature.

As understood from the graph in FIG. 19, the amount of gas leaked can be made remarkably smaller in the case of the third embodiment (curve $R_1$). This is because that area of the strip coil spring ring 65 which is face-contacted with the inner seal ring 64 is larger and because almost all of reaction force created when the coil portion of the spring ring 65 is deformed acts in the radial direction of the cylinder.

Figure 14:
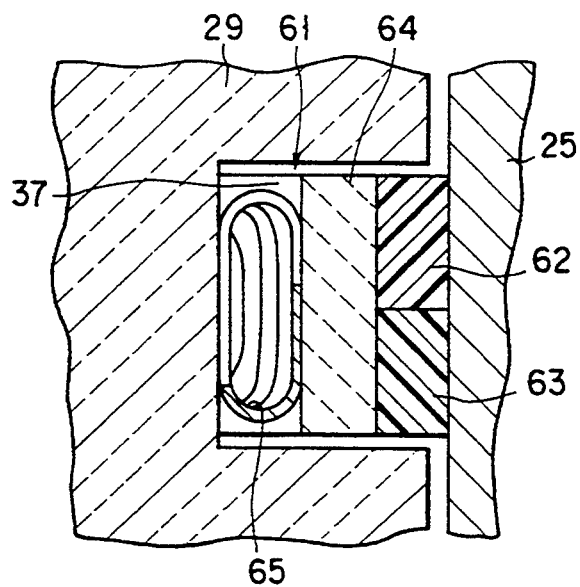
FIG. 14 is a vertically-sectioned view showing a seal means at the final cooling stage.
Figure 20:
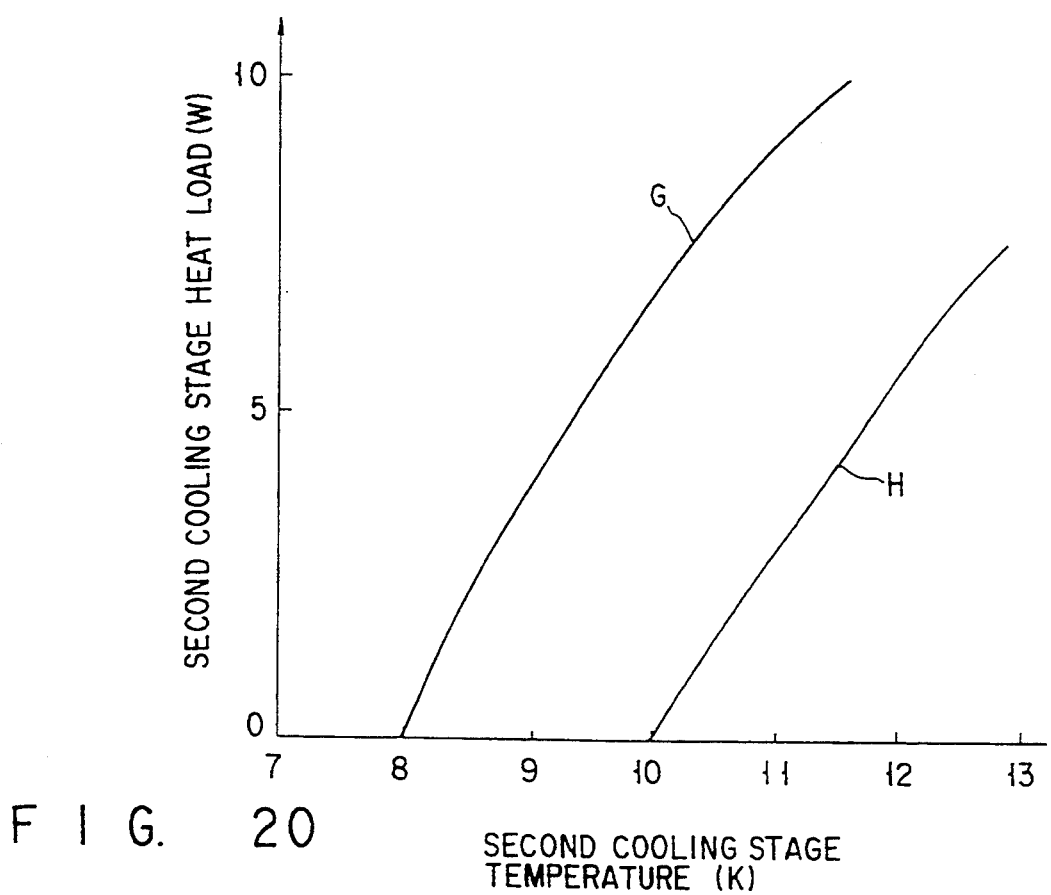
FIG. 20 is a graph showing the relation between temperature and heat load at the second cooling stage so as to compare the seal assembly of the third refrigerator with the conventional one.
Figure 26:
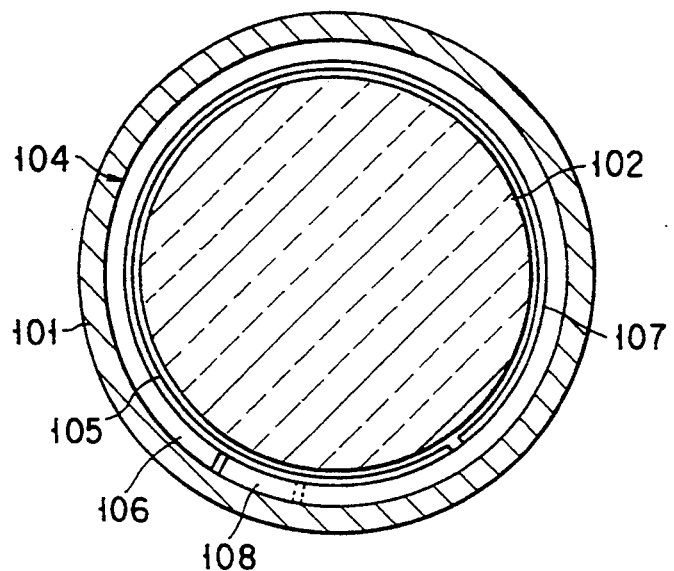
FIG. 26 is a horizontally-sectioned view showing the cooling stage of the conventional refrigerator.
Figure 27:
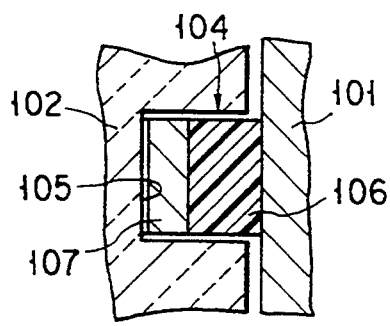
FIG. 27 is a vertically-sectioned view partly showing the seal means of the conventional refrigerator.
Figure 28:
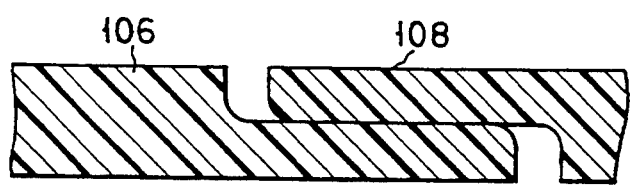
FIG. 28 is a vertically-sectioned view showing the overlapped portions of the seal ring of the seal assembly in the conventional refrigerator.

FIG. 20 is a graph showing the comparison of refrigerating capacity achieved by the refrigerator according to the third embodiment of the present invention with that achieved by the conventional one, in which second cooling stage temperatures are plotted on the horizontal axis and second cooling stage heat loads (W) on the vertical axis. A curve G in FIG. 20 represents results achieved by refrigerator in which the seal assembly shown in FIG. 14 is used, and a curve H those achieved by the refrigerator in which the conventional seal assembly shown in FIG. 27 is used. As apparent from FIG. 20, the refrigerating capacity achieved at same temperature is higher in the case of the third embodiment than in the case of the conventional refrigerator.

The outer seal rings 62 and 63 in the third embodiment are made of ethylene tertrafluoride resin to which polyimide rein is added. The polyimide resin added is extremely useful in enhancing the wear-proofness of the seal rings. Therefore, the amount of gas leaked through the seal assemblies 61 and 35 cannot be quickly increased as the refrigerator is used.

FIG. 21 is a graph showing how the amount of gas leaked is increased when various seal rings are used, in which the time lapse of the refrigerator operated is plotted on the horizontal axis and the increase in the amount of helium gas leaked on the vertical axis. A curve $S_1$ in FIG. 21 denotes results obtained when the seal rings made of polyimide resin-added ethylene tetrafluoride are used, a curve $S_2$ those obtained when the seal rings made of carbon added ethylene tetrafluoride are used, and a curve $S_3$ those obtained when the seal rings made of ethylene tetrafluoride are used.

As apparent from FIG. 21, the amount of helium gas leaked is least increased in the case where the seal rings are made of polyimide resin added ethylene tetrafluoride (curve $S_1$). This is because the polyimide resin added serves to increase the wear-proofness of the seal rings.

Those outer. circumferences of the outer seal rings 62 and 63 which are contacted with the first and second stainless steel-made cylinder sections 24 and 25 are ionitriding-treated in the third embodiment. In addition, they are finished to have profile irregularities less than 3.2 μm. The presence of these ionitriding-treated layers contributes to enhancing the wear-proofness of the outer seal rings and making their life longer.

FIG. 22 is a graph showing how the amount of gas leaked is increased when various cylinders are used, in which the time lapse of the refrigerator operated is plotted on the horizontal axis and the increase in the amount of helium gas leaked on the vertical axis.

A curve $T_1$ in FIG. 22 represents results obtained when the stainless steel-made cylinder having a ceramic coating layer on its inner circumference is used, a curve $T_2$ those obtained when the stainless steel-made cylinder to the inner circumference of which the ionitriding-treatment is applied is used, and a curve $T_3$ those obtained when the cylinder made of only stainless steel is used. As apparent from FIG. 22, amounts of gas leaked are increased at smaller rates in both cases where the ceramic-coated and ionitriding-treated cylinders are used. This is because the ceramic-coated and ionitriding-treated layers contribute to preventing the seal rings from being worn.

The seal rings 62, 63 and 64 which form the seal assembly 35 and 61 are finished, in the third embodiment, to have profile irregularities less than 30 μm at their inner and outer circumferences and at their end faces in the axial direction. In addition, those areas of the first and second cylinder sections 24 and 24 with which the outer seal rings 62 and 63 are contacted are finished to have a profile irregularity less than 3.2 μm. This enables the amount of gas to be by far less leaked between the outer seal rings 62, 63 and the inner circumference of the cylinder and between tops and bottoms of the outer and inner seal rings 62, 63, 64 and those of the annular groove 37 while the refrigerator is being operated.

Although the inner seal ring 64 has been made of polychlorotrifluoroethylene in the third embodiment, same effects can be attained even if the inner seal ring 64 is made of polymethylmethacrylate resin, stainless steel or titanium alloy when the displacer 22 is made of phenol resin. When the inner seal ring 64 is made of metal such as stainless steel, it is desirable that the inner seal ring is divided into a pair of ring members. they can be easily arranged round the displacer when divided into paired ring members in this manner.

FIG. 23 shows a variation of the seal assembly. This seal assembly 71 is incorporated into the Gifford-McMahon refrigerator in the same manner as in the first embodiment. Same components as those in the above described third embodiment will be represented by same reference numerals and description on these components will be omitted accordingly.

The seal assembly 71 includes the outer seal rings 62, 63, an inner seal ring 72 and a coil spring ring 74. The annular groove 37 is formed on the outer circumference of the second displacer section 29. The seal assembly 71 is arranged in this annular groove 37.

The outer seal rings 62 and 63 are same in diameter and width and they are coaxially put one upon the other. The outer circumference of each of the outer seal rings 62 and 63 are contacted with the inner circumference of the second cylinder section 25.

The inner seal ring 72 is located inside the outer seal rings 62 and 63.

The coil spring ring 74 is located inside the inner seal ring 72. The inner side of the coil spring ring 74 is seated on the bottom of the groove 37.

The outer and inner seal rings 62, 63 and 64 are made of polyimide resin to which ethylene tetrafluoride is added. They are finished to have profile irregularities less than 30 μm at their outer and inner circumferences and at their end faces in the axial direction.

The outer seal rings 62 and 63 are same in height, and also same in thickness in their width direction.

The sum of heights of the outer seal rings 62 and 63 are as set to have a dimension accuracy of 50 μm relative to the width of the annular groove 37 in the axial direction thereof.

The height of the inner seal ring 72 is equal to the sum of the heights of the outer seal rings 62 and 63. The thickness of the inner seal ring 72 in the axial direction thereof is set to have a dimension accuracy of 50 μm relative to the width of the annular groove 37.

As shown in FIG. 24, the inner side of the inner seal ring 73 is tilted from an axial line 76 by an angle $\theta$. It is desirable that the angle 8 is set larger than 15 degrees.

The interval or clearance 66, 67 or 77 which is equal to the distance R is provided between both ends of each of the outer and inner seal rings 62, 63 and 72, as shown in FIG. 16. These clearances 66, 67 and 77 are separated from one another by about 120 degrees in their circumferential direction.

The inner circumference of the inner seal ring 72 is tapered as described above. The pressing force added by the coil spring ring 74 is therefore divided into radial and axial directions of the cylinder.

When the friction factor of the inner seal ring 72 relative to the outer seal rings 62 and 63 is denoted by $\mu$, the tapering angle 0 of the inner circumference 73 of the inner seal ring 72 must be set to meet the above-mentioned formula (2). Even if the inner seal ring 72 is heat-shrunk in the axial direction under cryogenic temperatures, therefore, it can be pressed against the top of the ring-shaped groove 37 to thereby enhance the airtightness of the cylinder.

The coil spring ring 74 functions to add the pressing force to the inner seal ring 72 in the radial and axial directions at an appropriate balance.

Although the ionitriding treatment has been applied to the inner circumferences of the first and second cylinder sections 24 and 25 in the third embodiment, it may be applied only to the second cylinder section 25 which provides greater influence when the gas is leaked.

Although the cylinder has been made of stainless steel in the third embodiment, titanium alloy may be used instead. The ionitriding or ceramic coating layer may be formed on the inner circumference of the titanium alloy-made cylinder in this case.

Further, the seal means of the present invention can also be applied to all of those cryogenic refrigerators which need no lubrication.

According to the third embodiment, a more excellent sealing capacity can be achieved over a wide temperature range, particularly under cryogenic temperatures even though the seal means is simpler in structure.

Fourth Embodiment

Figure 29:
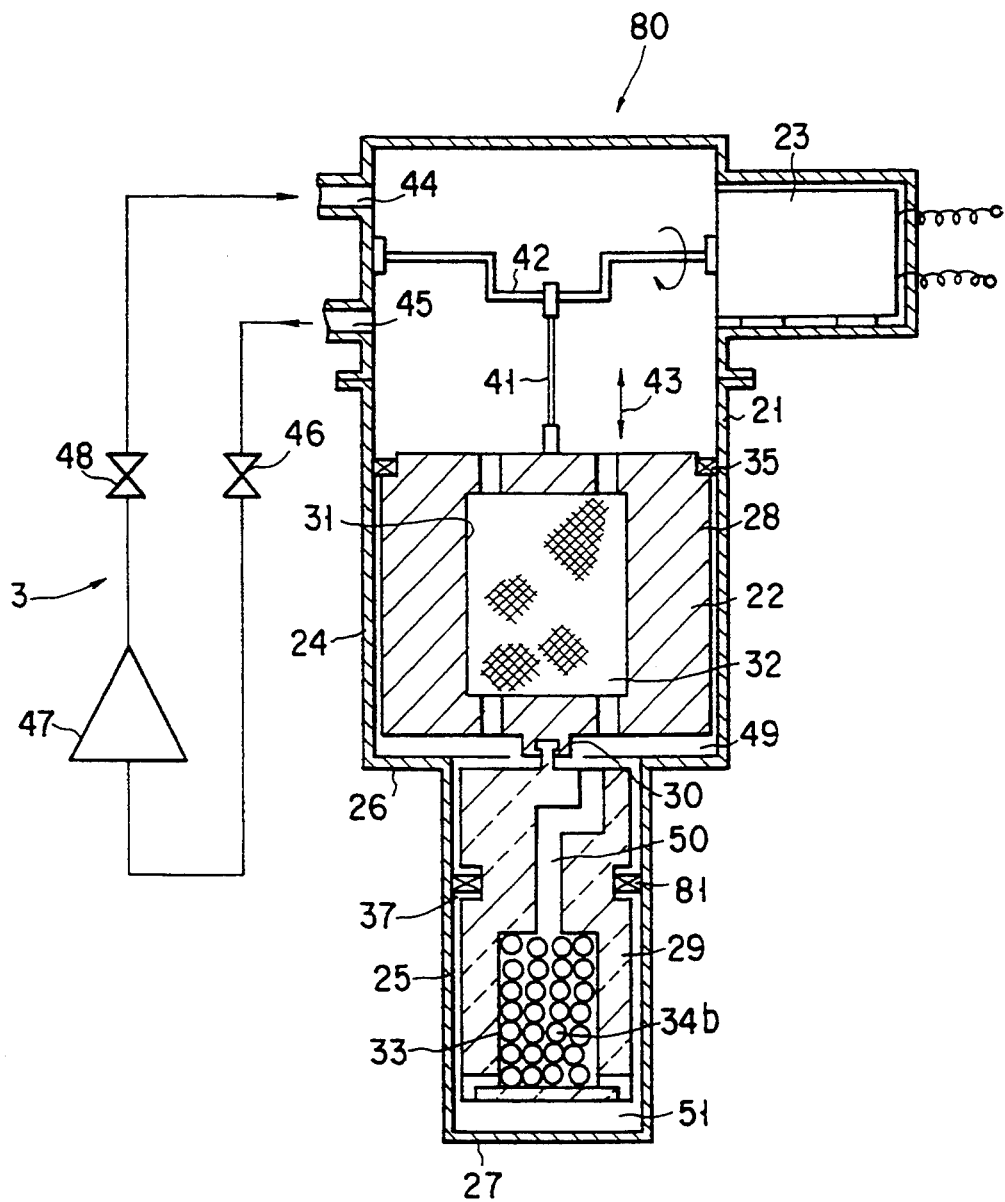
FIG. 29 is a sectional view schematically showing the Gifford-McMahon type refrigerator according to a fifth embodiment of the present invention.

FIG. 29 is a sectional view schematically showing the cryogenic refrigerator according to a fourth embodiment of the present invention. The seal means at the second cooling stage is improved in this fourth Gifford-McMahon type refrigerator.

The refrigerator generally comprises a cold head 80 and the coolant gas lead system 3. The cold head 80 comprises the closed cylinder 21, the piston or displacer 22 reciprocated in the cylinder 21, and the motor 23 for reciprocating the displacer 22 in the cylinder 21.

The cylinder 21 includes the first large cylinder section 24 and the second small cylinder section 25. The boundary wall portion of the first cylinder section 24 with the second cylinder section 25 functions as the first cooling stage 26 and the bottom wall portion of the second cylinder section 25 functions as the second cooling stage 27 lower in temperature than the first one.

The first and second cylinder sections 24 and 25 are made of stainless steel. Those inner circumferences of the first and second cylinder sections 24 and 25 which are contacted with seal assemblies 35 and 81, which will be described later, are ion-nitrification-treated. In addition, they are finished to have a profile irregularity less than 3.2 μm.

The displacer 22 comprises the first displacer section 28 reciprocated in the first cylinder section 24 and the second displacer section 29 reciprocated in the second cylinder section 25. These first and second displacer sections 28 and 29 are made of phenol resin (trade name: Bakelite).

The first and second displacer sections 28 and 29 are connected to each other in series by the coupling assembly 30. The liquid chamber 31 is formed in the first displacer section 28, extending in the axial direction of the section 28. The refrigerant 32 made of like copper meshes is housed in the liquid chamber 31. Similarly, the liquid chamber 33 is formed in the second displacer section 29, extending in the axial direction of the section 29. The magnetic refrigerant 34 of lead or ErNi compound shaped like balls is housed in the liquid chamber 33.

The first seal assembly 35 is interposed between the outer circumference of the first displacer section 28 and the inner circumference of the first cylinder section 24. The seal assembly 81 is interposed between the outer circumference of the second displacer section 29 and the inner circumference of the second cylinder section 25.

The seal assembly 81 will he described referring to FIGS. 30 through 34.

The seal assembly 81 is held in the annular groove 37 on the outer circumference of the second displacer section 29. It comprises a pair of outer seal rings 82 and 83, an inner seal ring 84, a coil spring ring 85 and a receiver ring 86.

The paired outer seal rings 82 and 83 are same in diameter and width and they are coaxially put one upon the other. The outer circumference of each of the outer seal rings 82 and 83 is contacted with the inner circumference of the cylinder section 25.

The height of the inner seal ring 84 is the same as or larger than the sum of heights of the outer seal rings 82 and 83. The inner seal ring 84 is located inside the outer seal rings 82 and 83.

The coil spring ring 85 is located inside the inner seal ring 84.

The outer and inner seal rings 82, 83 and 84 are made of the same material, or polyimide resin-added ethylene tetrafluoride. as the first and second displacer sections 28 and 29 are made of.

The outer and inner seal rings 82, 83 and 84 are finished to have a profile irregularity less than 30 μm at their outer and inner circumferences and at their end faces in the axial direction. The outer seal rings 82 and 83 are same in thickness (or height) in the axial direction and also same in thickness (or width) in the radial direction.

The height of the inner seal ring 84 is equal to the sum of heights of the outer seal rings 82 and 83. The sum of heights of the outer seal rings 82 and 83 is set to have a dimension accuracy of 50 μm relative to the width of the annular groove 37 in the axial direction.

As shown in FIG. 32, the coil spring ring 85 is formed by spiraling a stainless steel strip 85a. This strip coil spring ring 85 presses the outer seal rings 82 and 83 against the cylinder section 25 through the inner seal ring 84 with a force of 5–60 kgf/cm².

As shown in FIG. 33, the receiver ring 86 is a combination of paired semi-circular members 86a and 86b. It is made of the same material, or stainless steel, as the cylinder section 25 is made of.

Figure 30:
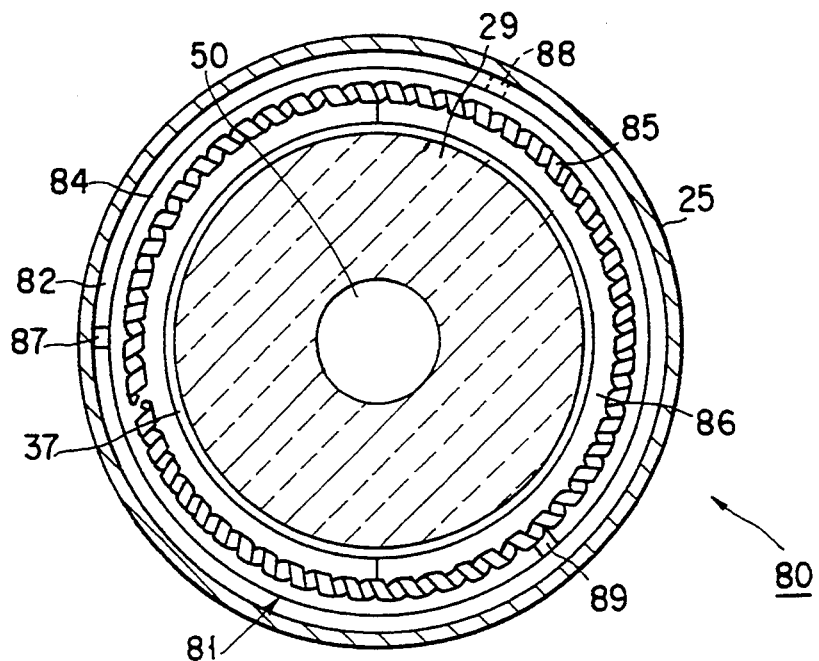
FIG. 30 is a horizontally-sectioned view showing a final cooling stage of the fifth refrigerator.

A clearance 87, 88 or 89 having the distance R is provided between both ends of each of the outer and inner seal rings 82, 83 and 84, as shown in FIG. 34. These clearances 87, 88 and 89 are separated from one another in the circumferential direction of the rings by about 120 degrees, as shown in FIG. 30.

As shown in FIG. 29, the top of the first displacer section 28 is connected to the rotating shaft of the motor 23 through the connecting rod 41 and the Scotch or crank shaft 42. When the shaft of the motor 23 is rotated, therefore, the displacer 22 is reciprocated in both directions shown by arrows 43, synchronizing with the rotation of the motor shaft.

The coolant gas inlet 44 and outlet 45 are projected from the upper side of the first cylinder section 24 and they are connected to the coolant gas lead system 3.

The coolant gas lead system 3 forms a helium gas circulation line, passing through the cylinder 21. The outlet 45 is communicated with the inlet 44 via the low pressure valve 46, the compressor 47 and the high pressure valve 48. The coolant gas lead system 3 serves to compress the helium gas from low in pressure (about 5 atm) to high in pressure (about 18 atm) and lead it into the cylinder 21. The low and high pressure valves 46 and 48 are opened and closed, as will be described later, relating to the reciprocation of the displacer 22.

Those portions of the refrigerator which function as cooling faces are the first and second cooling stages 26 and 27. They are cooled to about 30 K. and 8 K., respectively, when no heat load is added to them. Therefore, a temperature gradient ranging from normal temperature (300 K.) to 30 k. exists between the top and the bottom of the first displacer section 29 and a temperature gradient ranging from 30 k. to 8 k. exists between the top and the bottom of the second displacer section 29. However, the temperature of each of the cooling stages changes depending upon the heat load added to each of these cooling stages. The temperature of the first cooling stage 26 is therefore usually in a range of 30–80 K. while that of the second cooling stage 27 is in a range of 8–20 K.

When the motor 23 starts its rotation, the displacer 22 is reciprocated between the upper and the lower dead center. When the displacer 22 is at the lower dead center, the high pressure valve 48 is opened to allow the high pressure helium gas to flow into the cold head 80.

The displacer 22 then moves to the upper dead center. The seal assemblies 35 and 81 are interposed between the cylinder section 24 and the displacer section 28 and between the cylinder section 25 and the displacer section 29, respectively, as described above. When the displacer 22 moves to the upper dead center, therefore, the high pressure helium gas is forced into the first expansion chamber 49 through the first refrigerant-filled chamber 31 and expanded there. It is further force into the second expansion chamber 51 through the passage 50 and the second refrigerant-filled chamber 33 and expanded there.

As it flows in this manner, the high pressure helium gas is cooled by the refrigerants 32 and 34b. As the result, it is cooled to about 30 K. When it flows into the first expansion chamber 49 and it is cooled to about 8 K. When it flows into the second expansion chamber 51.

The high pressure valve 48 is closed this time while the low pressure valve 46 is opened. when the low pressure valve 46 is opened, the high pressure helium gas in the first and second expansion chambers 49 and 51 are expanded and cooled to accept heat through the first and second cooling stages 26 and 27.

When the displacer 22 moves again to the lower dead center, the helium gas in the first and second expansion chambers 49 and 51 is forced into the coolant gas lead system. The expanded helium gas cools the refrigerants 32 and 34b in this case while passing through the refrigerant-filled chambers 31 and 33. It is therefore heated to normal temperature and then discharged into the coolant gas lead system. This compression/expansion cycle will be thereafter repeated to keep the refrigerator operated.

The lowest temperature and refrigerating efficiency achieved depend greatly upon capacities of the first and second seal assembly in the case of this type refrigerator. It is assembly, for example, that the temperature of the first expansion chamber 49 is 30 K. and that the temperature of the second expansion chamber 51 is 10 K. When it is leaked through the second seal assembly (or seal assembly 81 in the fourth embodiment), the helium gas of 30 K. is allowed to flow into the second expansion chamber 51 without contacting the refrigerant 34b in the second displacer section 29. On the other hand, the helium gas of 10 K. is allowed to flow into the first expansion chamber 49. As the result, the temperature of the first cooling stage 26 is lowered while that of the second cooling chamber 27 is raised.

FIG. 35 is a graph showing results theoretically calculated of the relation between the amount of the gas leaked through the second seal means (or amount of the helium gas leaked through the second seal means relative to the total amount of the helium gas flowing into the second expansion chamber 49) and the temperature of each of the cooling stages, in which amounts of the gas leaked are plotted on the horizontal axis and temperatures of the cooling stages on the vertical axis. A curve $E_2$ in FIG. 35 represents change in the amount of the leaked gas at the first cooling stage and a curve $F_2$ denotes change in the amount of the leaked gas at the second cooling stage.

As apparent from FIG. 35, the amount of the gas leaked through the second seal means (which corresponds to the seal assembly 81 in the fourth embodiment) adds great influence to the temperature of each of the cooling stages. Same thing can be said about the amount of the gas leaked through the first seal means (which corresponds to the seal assembly 35 in the fourth embodiment).

When the seal assemblies 35 and 81 in the fourth embodiment are used, however, the amount of the gas leaked can be reduced to a greater extent.

The seal assembly 81 includes three seal rings 82, 83 and 84. The clearances 87, 88 and 89 of these rings are therefore totaled to three. However, these clearances 87, 88 and 89 are shifted from one another in the circumferential direction of the rings. The rings 82, 83 and 84 can be therefore pressed against the inner circumference of the cylinder as if they were one ring unit. The paired outer rings 82 and 83 can be thus uniformly pressed against the inner circumference of the cylinder section 25 through the inner ring 84 with a force, larger than 5 kg/cm$^2$, added by the coil spring ring 85.

Figure 36:
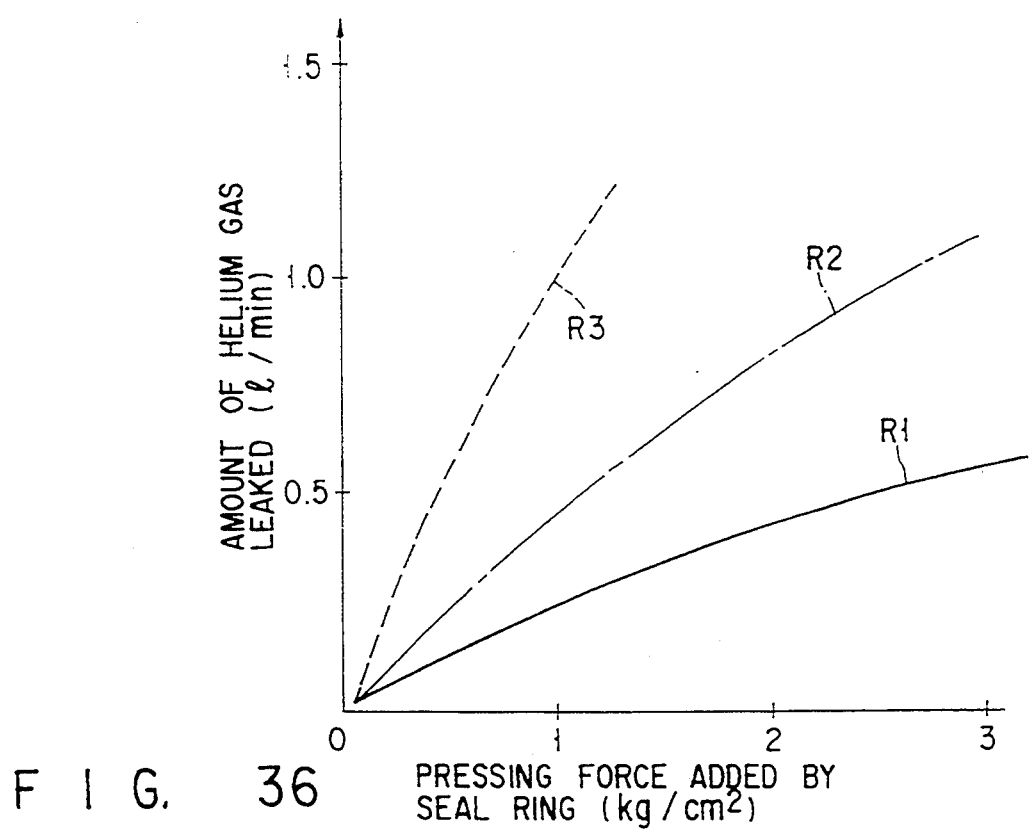
FIG. 36 is a graph showing the relation between ring pressing force added and the amount of helium gas leaked when various kinds of seal rings are used by the seal assembly.

FIG. 36 is a graph showing results checked of the relation between the pressing force added by the seal rings and the amount of helium gas leaked when various spring rings are used, in which pressing forces are plotted on the horizontal axis and amounts of helium gas leaked on the vertical axis. A curve $R_1$ denotes results obtained when the strip coil spring ring 85 is used (fourth embodiment), a curve $R_2$ those obtained when the wire coil spring ring is used (comparison case) and a curve $R_3$ those obtained when the plate spring ring is used (conventional case). Various conditions such as profile irregularities of the seal rings and states of their being arranged and the profile irregularity of the cylinder were made same. These conditions were measured under normal temperature.

As apparent from FIG. 36, the amount of gas leaked is made remarkably smaller in the case of the fourth embodiment as represented by the curve $R_1$. This is because that area of the strip coil spring ring 85 which is face-contacted with the inner seal ring 84 can be made larger. This is also because almost all of reaction force created as the coil portion of the spring ring 85 is deformed acts in the radial direction of the cylinder.

Figure 31:
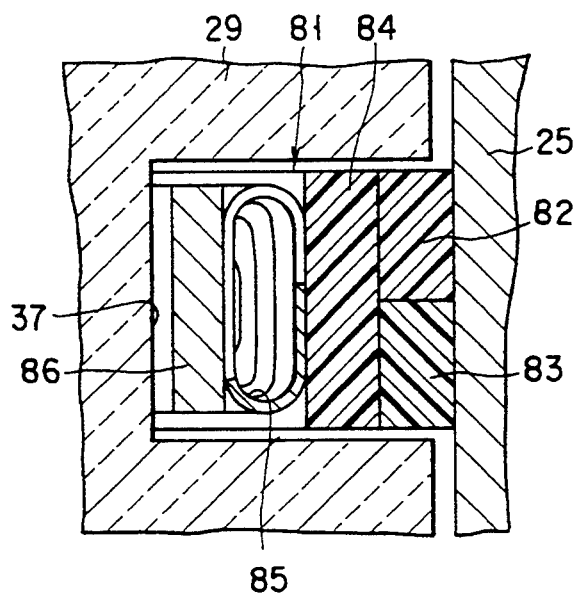
FIG. 31 is a vertically-sectioned view partly showing a seal means at the final cooling stage.
Figure 37:
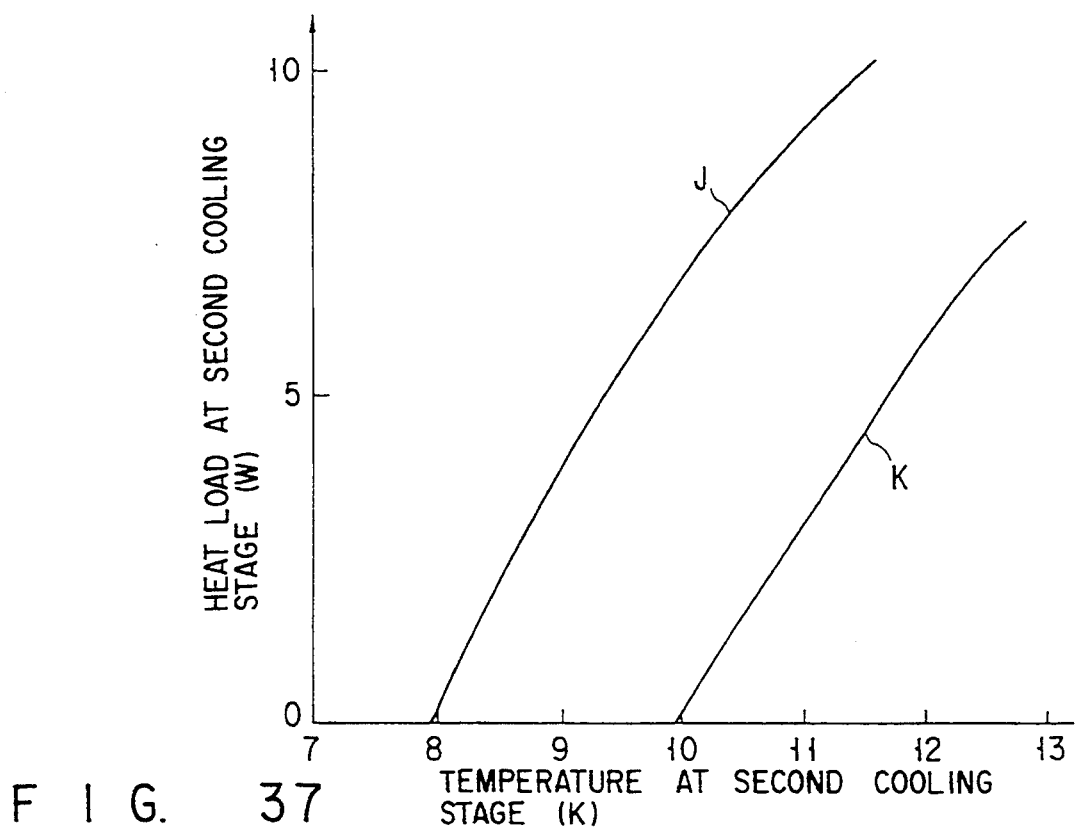
FIG. 37 is a graph showing the relation between temperature and heat load at the second cooling stage so as to compare the seal assembly of the fifth refrigerator and that of the conventional one.

FIG. 37 is a graph showing the comparison of refrigerating capacity achieved by the fourth refrigerator with that achieved by the conventional one, in which temperature of the second cooling stage are plotted on the horizontal axis and heat loads (W) added to the second cooling stage on the vertical axis. A curve J in FIG. 37 represents results obtained by the refrigerator in which the seal means in the fourth embodiment shown in FIG. 31 is used, and a curve K those obtained by the refrigerator in which the conventional seal means shown in FIG. 27 is used. As understood from FIG. 37, the refrigerating capacity achieved under same temperature is higher in the case of the fourth refrigerator than in the case of the conventional one.

The receiver ring 86 made of same material as that of the first and second cylinder sections 24 and 25 is located inside the coil spring ring 85 in the fourth embodiment. The sealing capacity of the seal means under cryogenic temperatures can be therefore accurately guessed from that of the seal means under normal temperature. In short, no difference is caused between the thermal shrinkage of the receiver ring 86 and those of the cylinder sections 24, 25 even under cryogenic temperatures. Therefore, the amount of distortion added to the coil spring ring 85 while assembling the seal means under normal temperature can be held even under cryogenic temperature and the sealing capacity confirmed under normal temperature can also be achieved even under cryogenic temperatures.

The outer and inner seal rings 82, 83 and 84 are made of polyimide resin-added tetrafluoroethylene in the fourth embodiment. The polyimide resin thus added is extremely useful for enhancing the wear-proofness of each of the seal rings. Therefore, the amount of gas leaked through the seal assembly 81 cannot be quickly increased as the refrigerator is operated.

Figure 38:
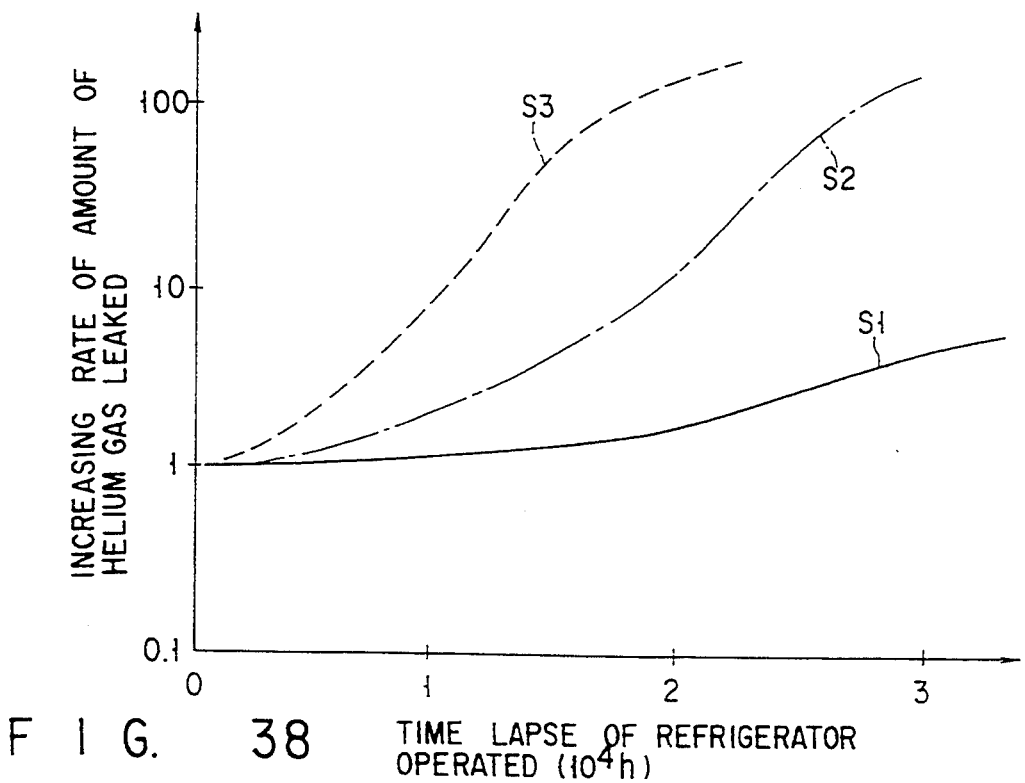
FIG. 38 is a graph showing the relation between the time lapse of the refrigerator operated and the increasing rate of the amount of gas leaked when various kinds of the seal rings are used.

FIG. 38 is a graph showing how the amount of gas leaked is increased when various seal rings are used, in which time lapse of the refrigerator operated are plotted on the horizontal axis and increases in the amount of helium gas leaked on the vertical axis. A curve $S_1$ in FIG. 38 represents results obtained when the seal ring made of polyimide resin-added tetrafluoroethylene is used, a curve $S_2$ those obtained when the seal ring made of carbon-added tetrafluoroethylene is used and a curve $S_3$ those obtained when the seal ring made of tetrafluoroethylene is used.

As apparent from FIG. 38, the increase in the amount of gas leaked can be most excellently suppressed when the seal ring is made of polyimide resin-added tetrafluoroethylene (as shown by the curve $S_1$). This is because the polyimide resin added enhances the wear-proofness of the seal ring.

According to the fourth embodiment, those outer circumferences of the outer seal rings 82 and 83 which are contacted with the first and second stainless steel-made cylinder sections 24 and 25 are ion-nitrification-treated. In addition, these circumferences are finished to have a profile irregularity less than 3.2 $\mu$m. The presence of this ion-nitrifying layer can contribute to enhancing the wear-proofness of each of the outer seal rings 82 and 83 and also making the life of these rings longer.

Figure 39:
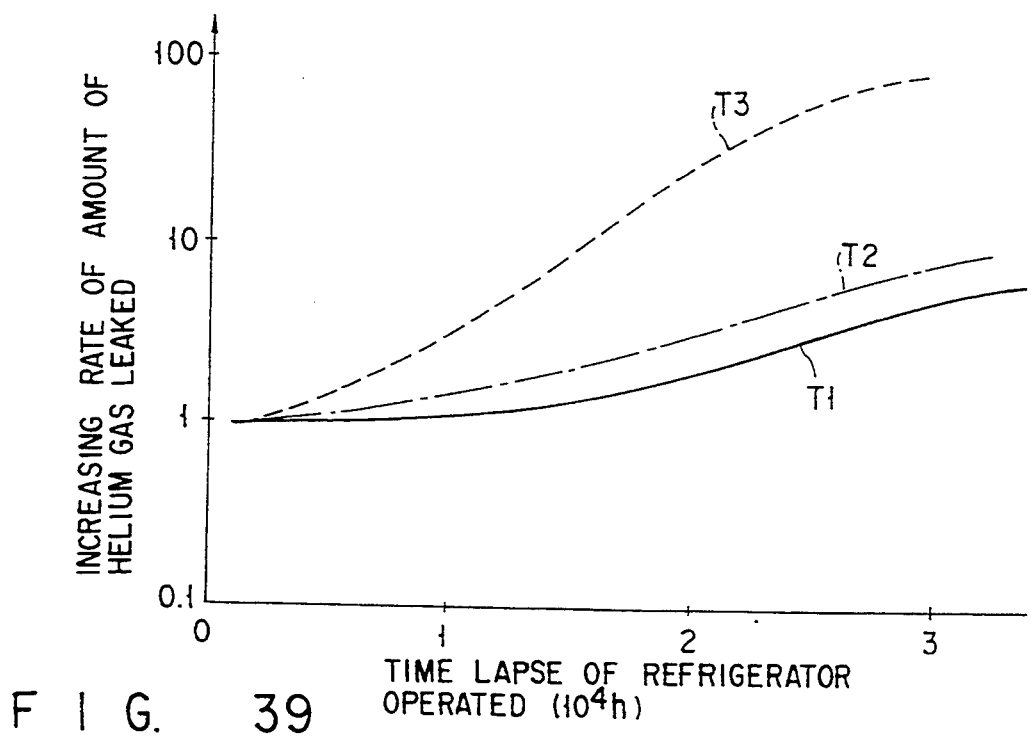
FIG. 39 is a graph showing the relation between the time lapse of the refrigerator operated and the increasing rate of the amount of gas leaked when the inner circumference of the cylinder is variously finished.

FIG. 39 is a graph showing how the amount of gas leaked is increased when various cylinders are used, in which time lapses of the refrigerator operated are plotted on the horizontal axis and increases in the amount of gas leaked on the vertical axis. A curve $T_1$ in FIG. 39 represents results obtained when the stainless steel-made cylinder having a ceramic coating layer on its inner circumference is used, a curve $T_2$ those obtained when the stainless steel-made cylinder to the inner circumference of which the ionitriding treatment is applied is used, and a curve $T_3$ those obtained when the cylinder made of only stainless steel is used. As seen in FIG. 39, the increase in the amount of gas leaked can be made quite smaller in both cases where the ceramic-coated and ionitriding-treated cylinders are used (as shown by the curves $T_1$ and $T_2$). This is because the ceramic coating and ionitriding layers contribute to preventing the seal rings from being worn.

According to the fourth embodiment, the seal rings 82, 83 and 84 which form the seal assembly 81 are finished to have a profile irregularity less than 30 $\mu$m at their outer and inner circumferences and at their end faces in the axial direction. In addition, those areas of the first and second cylinder sections 24 and 25 which are contacted with the outer seal rings 82 and 83 are finished to have a profile irregularity less than 3.2 $\mu$m. These enable the amount of gas to be by far less leaked between the outer seal rings 82, 83 and the inner circumference of the cylinder and between both end faces of each of the outer and inner seal rings 82, 83, 84 and the top and the bottom of the annular groove 37.

Although the inner seal ring 84 has been made of polychlorotrifluoroethylene in the above-described embodiment, same effects can be attained even if the inner seal ring 84 is made of polymethylmethacrylate resin, stainless steel or titanium alloy when the displacer 22 is made of phenol resin. When the inner seal ring 84 is made of metal such as stainless steel in this case, it is desirable that the ring 84 is divided into paired ring members. This makes it easier for the ring 84 to be arranged round the displacer.

In addition, the rings 82, 83 and 84 are made of same material as that of the displacer 22. Therefore, thermal shrinkages of the displacer 22 and of the rings 82, 84, 84 in the axial direction can be made practically same, thereby preventing the amount of gas leaked from being increased.

The present invention is not limited to the above described fourth embodiment. Although the seal rings 82, 83 and 84 have been made of same material, or polyimide resin-added tetrafluoroethylene, as that of the displacer 22 in the above-described embodiment, they may be made of one of materials, having same thermal shrinkage rate as the polyimide resin-added tetrafluoroethylene has, such as ethylene tetrafluoride, carbon- or glass fibers-added tetrafluoroethylene.

Further, it is not needed that the whole of the displacer is made of one of the above-mentioned materials. Only that area of the displacer on which the ring-shaped groove 37 is formed may be made of one of the above mentioned materials. Similarly, it is not needed that the receiver ring 86 is made of same material as that of the cylinder section 25. It may be made of any material having same thermal expansion rate as that of the material of which the cylinder is made.

Furthermore, the ion-nitrification-treatment is applied to inner circumferences of the first and second cylinder sections 24 and 25, but it may be applied only to the inner circumference of the second cylinder section 25 which will add greater influence to the increase in the amount of gas leaked.

Still further, the material of which the cylinder sections 24 and 25 are made is not limited to stainless steel, but titanium alloy may be used instead. The inner circumference of the cylinder may be ion-nitrification-treated or ceramic-coated in this case.

Still further, it is also effective that those inner circumferences of the cylinder sections 24 and 25 which are contacted with the seal means are made of ceramic. Still further, the seal means of the present invention can be applied to all of those refrigerators which need no lubrication.

According to the present invention, more excellent sealing capacity can be attained over a wide temperature range even though the seal means is simpler in structure. Particularly when the coil spring ring is formed by spiraling a strip member, the seal rings can be more uniformly pressed against the inner circumference of the cylinder with a larger force, thereby enabling the sealing capacity of the seal means to be enhanced to a greater extent.

Fifth Embodiment

FIG. 40 shows a temperature distribution seen when the final cooling stage of the cryogenic refrigerator according to a fifth embodiment of the present invention has a section as shown in FIG. 40. In the case of this fifth Gifford-McMahon type refrigerator, the slenderness ratio L/D of the final cooling stage is defined to be in a certain range to reduce refrigeration loss at the final cooling stage. This slenderness ratio L/D represents a ratio obtained when the inner diameter D of the cylinder section is related to the length L thereof at not the uniform temperature area but the gradual temperature area of the final cooling stage.

The second (or final) cooling stage 27 is located under the first cooling stage 26. A flange 24a is arranged round the bottom portion of the outer circumference of the cylinder section 24 at the first cooling stage 26. This flange 24a is intended to fix the refrigerator to another member.

A bottom member 52 is attached to the bottom of the cylinder section 25 at the second cooling stage 27. The cylinder section is made of stainless steel and the bottom member 25 of pure copper.

The bottom member 25 has a sleeve 53, by which the bottom portion of the cylinder section 25 is covered over a certain length from below to above. This bottom portion of the cylinder section 25 which is covered by the sleeve 53 is called the "uniform temperature area". The cylinder section 25 and the sleeve 35 are soldered to each other.

The other area of the cylinder section 25 where the uniform temperature area is not included is called the "gradual temperature area". The displacer section 29 is housed in the cylinder section 25 at the gradual temperature area thereof. The passage 50 and the refrigerant-filled chamber 33 are formed in the displacer section 29. The chamber 33 is filled with a magnetic refrigerant.

when helium gas flows into the expansion chamber 49 through the chamber 31 at the first cooling stage 26, it is heat-insulated and expanded. Its temperature is thus lowered. It further flows from the expansion chamber 49 into the refrigerant-filled chamber 33 at the second cooling stage 27, passing through the passage 50. The magnetic refrigerant in the chamber 33 is thus cooled.

As shown in FIG. 40, the second cooling stage 27 has the temperature distribution in its longitudinal direction, showing 30 K. at its top (or at the underside of the flange 24a), a range of 30 K.–4.2 K. at its gradual temperature area, and 4.2 K. at its uniform temperature area. The bottom member 52 is by far more excellent in heat conductivity than the cylinder section 25. That area of the cylinder section 25 which is covered by the sleeve 53 of the bottom member 52 is therefore kept equal in temperature or 4.2 K.

The true refrigerating capacity of the GM refrigerator can be obtained by subtracting refrigeration loss from that ideal refrigerating capacity which is readily determined by the expansion/compression cycle of the refrigerator. The "refrigeration loss" is the sum of entering heat and loss in refrigerating force storage.

The "entering heat" represents the amount of heat inputting from environmental atmosphere into the cooling stage. Most of this entering heat consists of heat conducted between the cylinder and the displacer and of shuttle heat loss.

The "loss in refrigerating force storage" denotes the chill of the coolant gas not absorbed by the refrigerant during heat exchange but lost together with the gas exhausted. The refrigerating force storage loss is determined by the ratio of the heat capacity of the refrigerant relative to the flow rate of the coolant gas. The refrigerating force storage loss is reduced as the amount of the refrigerant is increased, and when it is increased to an extent greater than a certain value, the refrigerating force storage loss becomes zero.

The ideal refrigerating capacity can be obtained by multiplying the product of the expanded volume of the coolant gas and of pressure difference at coolant gas compression/expansion times by a correcting factor. This correcting factor is based on a value of matter property inherent to helium gas. The expanded volume of the coolant gas can be obtained by the inner diameter of the cylinder and the stroke length of the displacer.

When the cylinder is made long, pressure at the entrance of the cylinder (or pressure on the high pressure side) becomes lower than the high pressure of the compressor because of pressure loss, while pressure at the exit of the cylinder (or pressure on the low pressure side) becomes higher than the low pressure of the compressor. Pressure difference at compression/expansion times becomes small accordingly, thereby causing the refrigerating capacity of the refrigerator to be lowered.

As apparent from the above, the refrigeration loss is increased when the slenderness ratio L/D of the cylinder is made too small. The refrigerating capacity of the refrigerator is thus lowered. When the slenderness ratio L/D of the cylinder is made too large, the ideal refrigerating capacity is lowered, thereby causing the refrigerating capacity of the refrigerator to be lowered. It is therefore believed that the cylinder or cylinder section has an optimum range of the slenderness ration suitable for enhancing the refrigerating capacity of the temperature.

FIG. 41 is a graph showing the relation between the slenderness ratio L/D of the cylinder and the refrigeration loss (W), in which slenderness ratios L/D are plotted on the horizontal axis and refrigeration losses on the vertical axis. A curve U in FIG. 41 represents change in the entering heat, a curve V change in the refrigerating force storage loss, and a curve a change in total refrigeration loss including the entering heat and the refrigerating force storage loss. The inner diameter D of the cylinder section 25 is 32 mm in the case of this fifth embodiment. Even if the refrigerator uses cylinder sections having various inner diameters D, it becomes substantially similar to this fifth embodiment when ratio L/D is adjusted.

As apparent from FIG. 41, the refrigeration loss quickly becomes small when the slenderness ratio L/D exceeds 3, but it is kept almost unchanged when L/D exceeds 10.

Figure 42:
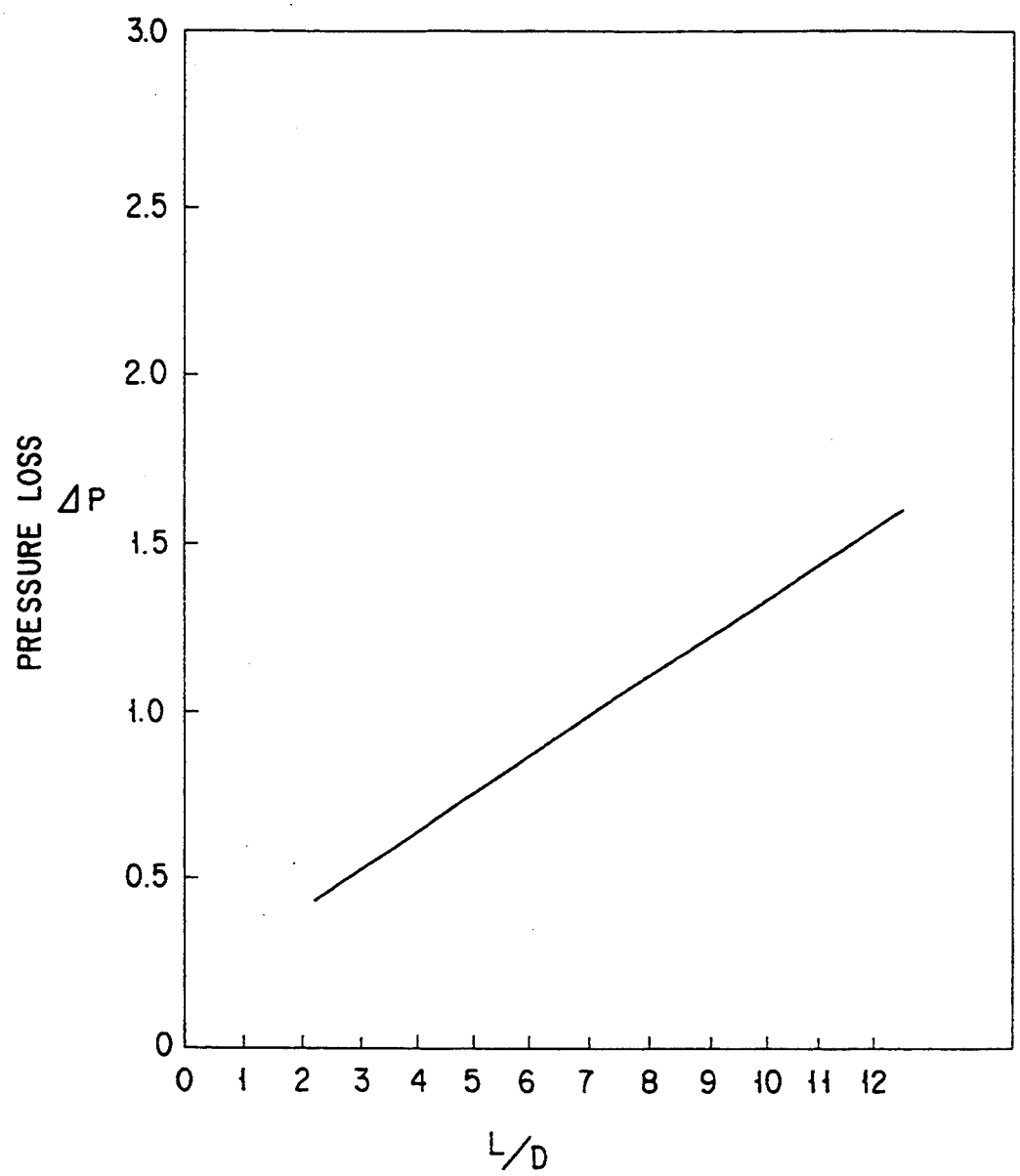
FIG. 42 is a graph showing the relation between ratio L/D and pressure loss.

FIG. 42 is a graph showing the relation between the slenderness ratio L/D of the cylinder and pressure loss P, in which slenderness ratios are plotted on the horizontal axis and pressure losses on the vertical axis. As seen in FIG. 42, pressure loss $\Delta P$ is increased as slenderness ration L/D increases, and when it becomes larger than 8, pressure loss $\Delta P$ is increased to such an extent that cannot be ignored.

Figure 43:
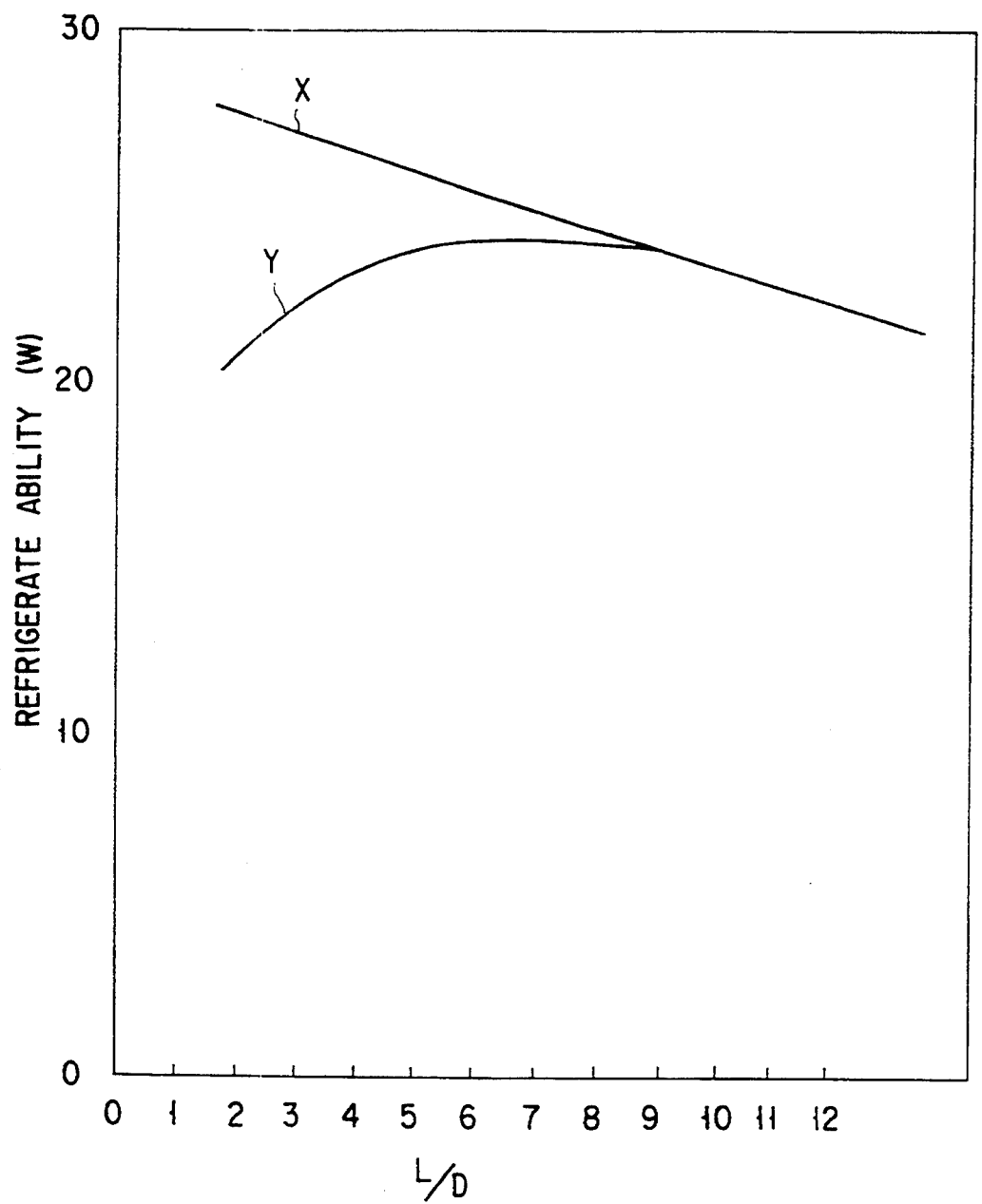
FIG. 43 is a graph showing the relation between ratio L/D and the amount refrigerated.

FIG. 43 is a graph showing the relation between the slenderness ratio L/D of the cylinder and refrigerating capacity, in in which slenderness ratios are plotted on the horizontal axis and refrigerating capacities on the vertical axis. A curve X in FIG. 43 denotes the ideal refrigerating capacity and a curve Y the true refrigerating capacity.

As apparent from the graph in FIG. 43, the true refrigerating capacity is increased when slenderness ratio L/D is smaller than 8, but it is lowered when L/D becomes larger than 8. This is because the ideal refrigerating capacity lowers.

Sixth Embodiment

Figure 44:
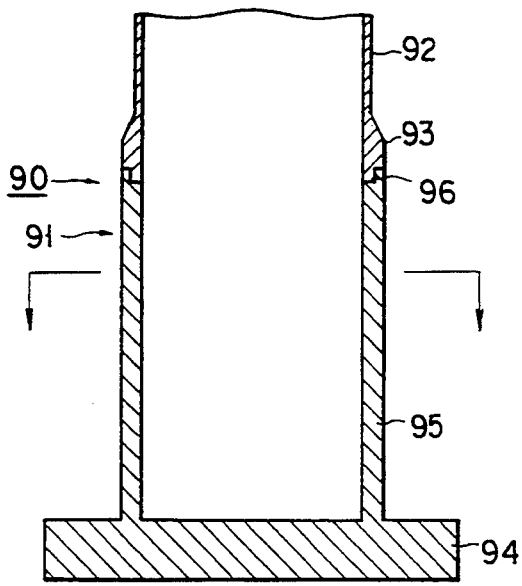
FIG. 44 is a vertically-sectioned view showing a cylinder at the final cooling stage of the refrigerator according to a sixth embodiment of the present invention.

FIG. 44 is a sectional view showing a cylinder used at the final cooling stage of the refrigerator according to a sixth embodiment of the present invention. Description on same components as those in the above-described embodiments will be omitted.

The cylinder 91 at the final cooling stage 90 has a hollow portion same in the inner diameter from top to bottom, and it houses therein the displacer (not shown), which has the chamber filled with the magnetic refrigerant.

The cylinder 91 comprises an upper cylinder section 92 located on high pressure side and a lower cylinder section 95 located on low pressure side and butted against the bottom of the upper cylinder section 92 at the top thereof. The upper cylinder section 92 corresponds to the temperature gradient-existing area and the lower cylinder section 95 to the equally heated area. This uniform temperature area is cooled to 4.2 K.

The upper cylinder section 92 is a thin cylinder made of stainless steel of the austenite group. It may be made of stainless steel of the ferrite group, pure titanium or titanium alloy.

The lower cylinder section 95 is a thin cylinder closed at the bottom end thereof and made of pure copper. The cylindrical portion of the lower cylinder section 95 is made integral to a bottom section 94. The outer diameter of the bottom section 94 is from 1.2 to 2.0 times that of the cylindrical portion of the lower cylinder section 95. The lower cylinder section 95 may be made of copper alloy, pure aluminium or aluminium alloy.

Figure 45:
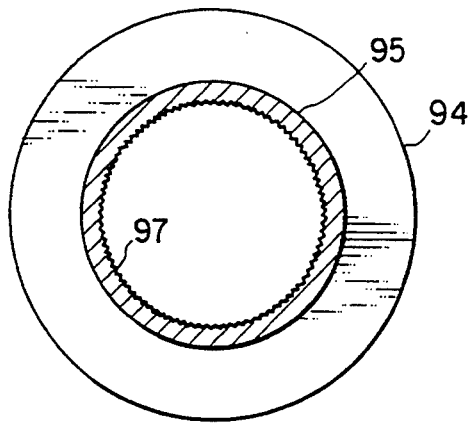
FIG. 45 is a horizontally-sectioned view showing another cylinder at the final cooling stage of the sixth refrigerator.

As shown in FIG. 45, a plurality of narrow grooves 97 are formed all over the inner circumference of the lower cylinder section 95. These narrow grooves 97 are intended to make as large as possible the area for accepting heat at the cooling stage. Each of them may be shaped like a v, U, arc or rectangle. They may also be formed spiral, eccentric, matrix-like or parallel.

The thickness (1 mm, for example) of the main portion of the upper cylinder section 92 is smaller than that (2.5 mm, for example) of the cylindrical portion of the lower cylinder section 95. A bottom end portion 93 of the upper cylinder section 92 which is butted against the top of the lower cylinder section 95 is made same in thickness as the cylindrical portion of the lower cylinder section 95, thereby making it easy to connect both of the upper and lower cylinder sections 92 and 95 to each other.

Both of the upper and lower cylinder sections 92 and 95 are connected to each other by the electronic beam welding (or EB welding). After they are welded, the inner circumference of the cylinder 91 is polish-finished. They may be welded to each other by the friction-welding.

Figure 46:
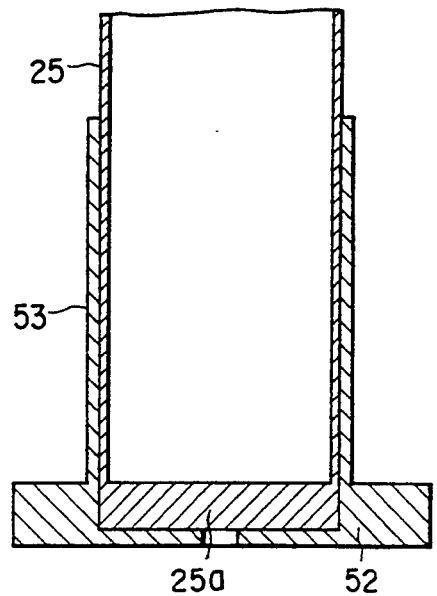
FIG. 46 is a vertically-sectioned view showing the cylinder at the final cooling stage of the conventional refrigerator.

FIG. 46 is a sectional view showing the cylinder used at the final cooling stage of the conventional GM refrigerator. This conventional cylinder comprises the upper and lower cylinder sections 25 and 52, in which the sleeve 53 of the lower cylinder section 52 is fitted onto the lower portion of the upper cylinder section 25 and welded to it by the soldering. The lower end of the upper cylinder section 25 is closed by a bottom plate 25a. A hole in the bottom center of the lower cylinder section 52 is intended to escape gas caused at the soldering time through it. The upper cylinder section 25 is made of stainless steel and the lower one 52 of pure copper.

In the case of this conventional cylinder, however, the layer of solder is present between the stainless steel-made cylinder section 25 and the pure copper-made sleeve 53 and it serves to resist heat conductivity between the upper and the lower cylinder section. In addition, only the stainless steel-made cylinder section 25 contacts directly the coolant gas, but the pure copper-made cylinder section 52 and sleeve 53 exchange heat indirectly with the coolant gas. The heat conductivity at the final cooling stage is thus made low, thereby making it difficult to obtain a refrigerating capacity as high as desired.

On the contrary, the sixth refrigerator according to the present invention has no matter such as the solder layer to resist against the heat conductivity as the final cooling stage 90. In addition, the pure copper-made cylinder section 9 also contacts directly the coolant gas. A higher refrigerating capacity can be thus attained.

Additional advantages and modifications will readily occur to those skilled in the art. Therefore, the invention in its broader aspects is not limited to the specific details, representative devices, shown and described herein. Accordingly, various modifications may be made without departing from the spirit or scope of the general inventive concept as defined by the appended claims and their equivalents.

What is claimed is:

1. A cryogenic refrigerator capable of creating a higher refrigerating capacity by expanding compressed helium gas after it is cooled while being passed firstly through a first refrigerating force storage chamber at a first cooling stage and finally through a final refrigerating force storage chamber at a final cooling stage, said cryogenic refrigerator comprising:

a first refrigerant filled in the final refrigerating force storage chamber on a high temperature side thereof and consisting of a composition expressed by:
(a) a formula: $(Er_{(x)}R_{(1-x)})_3Ni_{(y)}Co_{(1-y)}$ wherein $0 \leq x \leq 1$, $0 \leq y \leq 1$ and R represent a rate earth element selected from the group consisting of Y, Pr, Nd, Sm, Eu, Gd, Tb, Dy, Ho, Tm, Yb and Sc,
(b) a formula: $Er_{(x)}R_{(1-x)}Ni_{(y)}Cu_{(1-y)}$ wherein $0 \leq x \leq 1$, $0 \leq y \leq 1$, and R denotes a rare earth element selected from the group consisting of Y, Pr, Nd, Sm, Eu, Gd, Tb, Dy, Ho, Tm, Yb and Sc,
(c) a formula: $Er_{(x)}Dy_{(1-x)}Ni_2$ wherein $0 \leq x \leq 0.85$, or
(d) a formula: $Er_{(x)}R_{(1-x)}Ni_{(y)}Co_{(1-y)}$ wherein $0 \leq x \leq 1$, $0 \leq y \leq 1$ and R denotes a rare earth element selected from the group consisting of Gd, Tb, Dy and Ho, a second refrigerant filled in the final refrigerating force storage chamber on a low temperature side thereof and consisting of a composition expressed by:
(e) a formula: $Er_{(x)}R_{(1-x)}Ni_{(y)}Co_{(1-y)}$ wherein $0 \leq x \leq 1$, $0 \leq y \leq 1$ and R denotes a rare earth element selected from the group consisting of Y, Pr, Nd, Sm, Eu, Gd, Tb, Dy, Ho, Tm, Yb and Sc,
(f) a formula: $(Er_{(x)}R_{(1-x)})_3AlC_{(y)}$ wherein $0 \leq x \leq 1$, $0 \leq y \leq 1$ and R represents a rare earth element selected from the group consisting of Y, Pr, Nd, Sm, Eu, Gd, Tb, Dy, Ho, Tm, Yb and Sc,
(g) a formula: $Er_{(x)}Dy_{(1-x)}Ni_2$ wherein $0.85 \leq x \leq 1$,
(h) a formula: $(Er_{(x)}R_{(1-x)})_{(1-y)}Ru_{(y)}$ wherein $0.5 \leq x \leq 1$, $0 \leq y \leq 0.7$ and R represents a rare earth element selected from the group consisting of Y, Pr, Nd, Sm, Eu, Gd, Tb, Dy, Ho, Tm, Yb and Sc, or
(i) a formula: $Er_{(x)}R_{(1-x)}Ni_{(y)}Cu_{(1-y)}$ wherein $0 \leq x \leq 1$, $0 \leq y \leq 1$, and R denotes a rare earth element selected from the group consisting of Y, Pr, Nd, Sm, Eu, Gd, Tb, Dy, Ho, Tm, Yb and Sc; and a partition member for separating the second refrigerant from the first refrigerant so as not to be mixed in the final refrigerating force storage chamber.

2. The cryogenic refrigerator according to claim 1, wherein said second refrigerant filled in the final refrigerating force storage chamber occupies 10–90 vol % relative to all of refrigerants filled in the final refrigerating force storage chamber.

3. The cryogenic refrigerator according to claim 1, wherein said first refrigerant consists essentially of a composition expressed by a formula $(Er_{(x)}R_{(1-x)})_3Ni$ in which $0 \leq x \leq 1$ and R represents a rare earth element selected from the group consisting of Y, Pr, Nd, Sm, Eu, Gd, Tb, Dy, Ho, Tm, Yb and Sc.

4. The cryogenic refrigerator according to claim 3, wherein said first refrigerant consists essentially of a composition expressed by $Er_3Ni$.

5. The cryogenic refrigerator according to claim 1, wherein said first refrigerant consists essentially of a composition expressed by the formula $(Er_{(x)}R_{(1-x)})_3Ni_{(y)}Co_{(1-y)}$ in which $0 \leq x \leq 1$, $0 \leq y \leq 1$ and R denotes a rare earth element selected from the group consisting of Y, Pt, Nd, Sm, Eu, Gd, Tb, Dy, Ho, Tm, Yb and Sc.

6. The cryogenic refrigerator according to claim 5, wherein said first refrigerant consists essentially of a composition expressed by the formula $(Er_{(x)}R_{(1-x)})_3Ni_{(y)}Co_{(1-y)}$ in which $0 \leq x \leq 1$, y is one of 0, 0.1, 0.15, 0.2, 0.3, 0.5 and 1, and R represents a rare earth element selected from the group consisting of Y, Pr, Nd, Sm, Eu, Gd, Tb, Dy, Ho, Tm, Yb and Sc.

7. The cryogenic refrigerator according to claim 5, wherein said first refrigerant consists essentially of a composition expressed by $Er_3Ni_{(y)}Co_{(1-y)}$ in which $0 \leq y \leq 1$.

8. The cryogenic refrigerator according to claim 7, wherein said first refrigerant consists essentially of at least one of a composition selected from the group consisting of $Er_3Co$, $Er_3Ni_{0.15}Co_{0.85}$, $Er_3Ni_{0.2}Co_{0.8}$, $Er_3Ni_{0.3}Co_{0.7}$ and $Er_3Ni_{0.5}Co_{0.5}$.

9. The cryogenic refrigerator according to claim 1, wherein said first refrigerant consists essentially of a composition expressed by $(Er_{(x)}R_{(1-x)})Ni_{(y)}Cu_{(1-y)}$ in which $0 \leq x \leq 1$, $0 \leq y \leq 1$ and R represents a rare earth element selected from the group consisting of Y, Pt, Nd, Sm, Eu, GD, Tb, Dy, Ho, Tm, Yb and Sc.

10. The cryogenic refrigerator according to claim 9, wherein said first refrigerant consists essentially of a composition expressed by $(Er_{(x)}R_{(1-x)})Ni_{(y)}Cu_{(1-y)}$ in which $0 \leq x \leq 1$, y is 0.5 or 0.6, and R denotes a rare earth element selected from the group consisting of Y, Pr, Nd, Sm, Eu, Gd, Tb, Dy, Ho, Tm, Yb and Sc.

11. The cryogenic refrigerator according to claim 9, wherein said first refrigerator consists essentially of a composition expressed by $(Er_{(x)}R_{(1-x)})Ni$ in which x is one of 0.6, 0.75, 0.8, 0.85, 0.9, 0.95 and 1 and R denotes a rare earth element selected from the group consisting of Y, Gd, Dy, Ho and Yb.

12. The cryogenic refrigerator according to claim 11, wherein said first refrigerant consists essentially of at least one of a composition selected from the group consisting of ErNi, $Er_{0.9}Yb_{0.1}Ni$, $Er_{0.7}Ho_{0.3}Ni$, $Er_{0.75}Gd_{0.25}Ni$, $Er_{0.85}Gd_{0.15}Ni$, $Er_{0.9}Gd_{0.1}Ni$, $Er_{0.95}Gd_{0.05}Ni$, $Er_{0.9}Dy_{0.1}Ni$, $Er_{0.9}Y_{0.1}Ni$, $Er_{0.8}Y_{0.2}Ni$ and $Er_{0.6}Y_{0.4}Ni$.

13. The cryogenic refrigerator according to claim 9, wherein said first refrigerant consists essentially of a composition expressed by $ErNi_{0.6}Cu_{0.4}$.

14. The cryogenic refrigerator according to claim 9, wherein said first refrigerant consists essentially of a composition expressed by $HoNi_{0.5}Cu_{0.5}$.

15. The cryogenic refrigerator according to claim 1, wherein said first refrigerant consists essentially of a composition expressed by $Er_{(x)}Dy_{(1-x)}Ni_2$ in which $0 \leq x \leq 0.85$.

16. The cryogenic refrigerator according to claim 15, wherein said first refrigerant consists essentially of a composition expressed by $Er_{(x)}Dy_{(1-x)}Ni_2$ which x is at least one of number selected from the group consisting of 0, 0.2, 0.6, 0.8 and 0.85.

17. The cryogenic refrigerator according to claim 1, wherein said second refrigerant consists essentially of a composition expressed by $Er_{(x)}R_{(1-x)}Ni_{(y)}Co_{(1-y)}$ in which $0 \leq x \leq 1$, $0 \leq y \leq 1$, and R denotes a rare earth element selected from the group consisting of Y, Pt, Nd, Sm, Eu, Gd, Tb, Dy, Ho, Tm, Yb and Sc.

18. The cryogenic refrigerator according to claim 17, wherein said second refrigerant is a composition expressed by $(Er_{(x)}R_{(1-x)})Ni$ in which x is at least one of number selected from the group consisting of 0.6, 0.75, 0.8, 0.85, 0.9, 0.95 and 1, and R denotes a rare earth element selected from Y, Gd, Dy, Ho and Yb.

19. The cryogenic refrigerator according to claim 18, wherein said second refrigerant consists essentially of at least one of a composition selected from the group consisting of ErNi, $Er_{0.9}Yb_{0.1}Ni$, $Er_{0.7}Ho_{0.3}Ni$, $Er_{0.75}Gd_{0.25}Ni$, $Er_{0.85}Gd_{0.15}Ni$, $Er_{0.9}Gd_{0.1}Ni$, $Er_{0.95}Gd_{0.05}Ni$, $Er_{0.9}Dy_{0.1}Ni$, $Er_{0.9}Y_{0.1}Ni$, $Er_{0.8}Y_{0.2}Ni$ and $Er_{0.6}Y_{0.4}Ni$.

20. The cryogenic refrigerator according to claim 17, wherein said second refrigerant consists essentially of a composition expressed by $ErNi_{(y)}Co_{(1-y)}$ in which y is at least one of number selected from the group consisting of 0.7, 0.8, 0.9 and 1.0.

21. The cryogenic refrigerator according to claim 17, wherein said second refrigerant consists essentially of a composition expressed by $Er_{(x)}R_{(1-x)}Ni_{(y)}Co_{(1-y)}$ in which x is at least one of number selected from the group consisting of 0.6, 0.75, 0.8, 0.85, 0.9, 0.95 and 1.0, y is at least one of number selected from the group consisting of 0.7, 0.8, 0.9 and 1.0, and R represents a rare earth element selected from the group consisting of Y, Gd, Dy, Ho and Yb.

22. The cryogenic refrigerator according to claim 1, wherein said second refrigerant consists essentially of a composition expressed by $(Er_{(x)}R_{(1-x)})_3AlC_{(y)}$ in which $0 \leq x \leq 1$, $0 \leq y \leq 1$, and R represents a rare earth element selected from the group consisting of Y, Pt, Nd, Sm, Eu, Gd, Tb, Dy, Ho, Tm, Yb and Sc.

23. The cryogenic refrigerator according to claim 22, wherein said second refrigerant consists essentially of one of a composition selected from the group consisting of $Er_3AlC_{0.5}$, $Er_3AlC_{0.75}$ and $Er_3AlC$.

24. The cryogenic refrigerator according to claim 1, wherein said second refrigerant consists essentially of a composition expressed by $Er_{(x)}Dy_{(1-x)}Ni_2$ in which $0.85 \leq x \leq 1$.

25. The cryogenic refrigerator according to claim 24, wherein said second refrigerant consists essentially of one of a composition selected from the group consisting of $Er_{0.85}Dy_{0.15}Ni_2$ and $ErNi_2$.

26. The cryogenic refrigerator according to claim 1, wherein said second refrigerant consists essentially of a composition expressed by $(Er_{(x)}R_{(1-x)})_{(1-y)}Ru_{(y)}$ in which $0.5 \leq x \leq 1$, $0 \leq y \leq 0.7$, and R denotes a rare earth element selected from the group consisting of Y, Pt, Nd, Sm, Eu, Gd, Tb, Dy, Ho, Tm, Yb and Sc.

27. The cryogenic refrigerator according to claim 26, wherein said second refrigerant consists essentially of one of a composition selected from the group consisting of $Er_{0.7}Ru_{0.3}$, $Er_{0.65}Ru_{0.35}$ and $Er_{0.60}Ru_{0.40}$.

28. A cryogenic refrigerator capable of creating a higher refrigerating capacity by expanding compressed helium gas after it is cooled while being passed firstly through a first refrigerating force storage chamber at a first cooling stage and finally through a final refrigerating force storage chamber at a final cooling stage, said cryogenic refrigerator comprising:

a first refrigerant filled in the final refrigerating force storage chamber; and plural kinds of second refrigerants filled in the final refrigerating force storage chamber, and a partition member for separating one of the second refrigerants from the other of the second refrigerants so as to not be mixed in the final refrigerating force storage chamber, wherein one of said second refrigerants is constituted by at least one composition selected from compositions expressed by the following formulas (a)–(g);

(a) a formula: $(Er_{(x)}R_{(1-x)})_3Ni_{(y)}Co_{(1-y)}$ wherein $0 \leq x \leq 1$, $0 \leq y \leq 1$ and R represents a rate earth element selected from the group consisting of Y, Pr, Nd, Sm, Eu, Gd, Tb, Dy, Ho, Tm, Yb and Sc, (b) a formula: $Er_{(x)}R_{(1-x)}Ni_{(y)}Cu_{(1-y)}$ wherein $0 \leq x \leq 1$, $0 \leq y \leq 1$, and R denotes a rare earth element selected from the group consisting of Y, Pr, Nd, Sm, Eu, Gd, Tb, Dy, Ho, Tm, Yb and Sc, (c) a formula: $Er_{(x)}Dy_{(1-x)}Ni_2$ wherein $0 \leq x \leq 0.85$, (d) a formula: $Er_{(x)}R_{(1-x)}Ni_{(y)}Co_{(1-y)}$ wherein $0 \leq x \leq 1$, $0 \leq y \leq 1$ and R denotes a rare earth element selected from the group consisting of Y, Pr, Nd, Sm, Eu, Gd, Tb, Dy, Ho, Tm, Yb and Sc, (e) a formula: $(Er_{(x)}R_{(1-x)})_3AlC_{(y)}$ wherein $0 \leq x \leq 1$, $0 \leq y \leq 1$ and R represents a rare earth element selected from the group consisting of Y, Pr, Nd, Sm, Eu, Gd, Tb, Dy, Ho, Tm, Yb and Sc, (f) a formula: $Er_{(x)}Dy_{(1-x)}Ni_2$ wherein $0.85 \leq x \leq 1$, or (g) a formula: $(Er_{(x)}R_{(1-x)})_{(1-y)}Ru_{(y)}$ wherein $0.5 \leq x \leq 1$, $0 \leq y \leq 0.7$ and R represents a rare earth element selected from the group consisting of Y, Pr, Nd, Sm, Eu, Gd, Tb, Dy, Ho, Tm, Yb and Sc, one composition is filled on a high temperature side of the final refrigerating force storage chamber, the other compositions are filled on a low temperature side of the final refrigerating force storage chamber, and a magnetic phase transition temperature of said one composition is higher than a magnetic phase transition temperature of said other compositions.

29. The cryogenic refrigerator according to claim 1, wherein said first and second refrigerants are granular.

30. The cryogenic refrigerator according to claim 28, wherein said first and second refrigerants are granular.

* * * * *